(12) United States Patent
Ito et al.

(10) Patent No.: US 7,140,642 B2
(45) Date of Patent: Nov. 28, 2006

(54) FUEL TANK DISPOSITION STRUCTURE OF VEHICLE

(75) Inventors: Akira Ito, Hiroshima (JP); Kazue Sumida, Hiroshima (JP); Fumio Okana, Hiroshima (JP); Hirotaka Kusu, Hiroshima (JP); Naomune Moriyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/049,083

(22) Filed: Feb. 3, 2005

(65) Prior Publication Data

US 2005/0211496 A1  Sep. 29, 2005

(30) Foreign Application Priority Data

| Feb. 12, 2004 | (JP) | ............................. 2004-034390 |
| Feb. 13, 2004 | (JP) | ............................. 2004-035853 |
| Feb. 16, 2004 | (JP) | ............................. 2004-037962 |
| Mar. 5, 2004 | (JP) | ............................. 2004-061857 |
| Mar. 5, 2004 | (JP) | ............................. 2004-061858 |
| Mar. 9, 2004 | (JP) | ............................. 2004-064997 |

(51) Int. Cl.
*B60K 15/03* (2006.01)

(52) U.S. Cl. .................................... 280/834
(58) Field of Classification Search ............... 280/830, 280/834
See application file for complete search history.

(56) References Cited

U.S. PATENT DOCUMENTS 4,545,589 A * 10/1985 Watanabe et al. ........... 280/834

2002/0145307 A1 * 10/2002 Fujita .......................... 296/193
2005/0046170 A1 * 3/2005 Uhara et al. ................. 280/834
2005/0046236 A1 * 3/2005 Nakamura et al. ...... 296/193.07

FOREIGN PATENT DOCUMENTS

| DE | 7138987 | | 10/1971 |
| GB | 2 404 639 A | | 2/2005 |
| JP | 58049519 | | 3/1983 |
| JP | 59-078131 | | 5/1984 |
| JP | 08244479 A | * | 9/1996 |
| JP | 2000-085382 | | 3/2000 |
| JP | 2001180304 A | * | 7/2001 |
| JP | 2003237390 A | * | 8/2003 |

* cited by examiner

*Primary Examiner*—Kevin Hurley
(74) *Attorney, Agent, or Firm*—Nixon Peabody LLP; Donald R. Studebaker

(57) ABSTRACT

There is provided the fuel tank disposition structure of the vehicle, in which a plurality of passenger seats are disposed longitudinally in the cabin, comprising the tunnel portion provided so as to project upward toward the inside of the cabin at the central portion of the floor panel forming the lower face of the cabin, the tunnel portion including the wide portion and the narrow portions, the fuel tank disposed in the tunnel portion below the floor panel, the fuel tank including the wide portion and the narrow portion so as to correspond to the tunnel portion, wherein the front seat is disposed above the wide portion of the tunnel portion, and the rear seat is disposed above the narrow portions.

41 Claims, 51 Drawing Sheets

FUEL TANK DISPOSITION STRUCTURE OF VEHICLE

BACKGROUND OF THE INVENTION

The present invention relates to a fuel tank disposition structure of a vehicle in which a plurality of passenger seats are disposed longitudinally in a cabin.

Conventionally, the following structure is known as such a fuel tank disposition structure of a vehicle. Namely, there is provided a tunnel portion which projects upward toward an inside of the cabin at a central portion of a floor panel forming a lower face of the cabin in a vehicle width direction. And, there are further provided a central projecting portion which further projects upward from the above-described tunnel portion between a driver seat and a assistant seat, and a pair of side projecting portions which respectively project upward from portions of the floor panel below respective seat cushions of the driver and assistant seats. Herein, the side projecting portions are formed so as to extend in the vehicle width direction between the tunnel portion and side sills, and a fuel tank is disposed below the central projecting portion and the right and left side projecting portions so as to extend in the vehicle width direction (see Japanese Patent Laid-Open Publication No. 2000-85382).

In this conventional structure, since the fuel tank is disposed effectively by utilizing a dead space below the front seat (driver seat and assistant seat), there is an advantage that a roomy cabin can be ensured even for a compact car. However, this structure has a problem that since the fuel tank is disposed so as to extend in the vehicle width direction, some measures against a vehicle side crash may be necessary and protecting the fuel tank with frames enclosing the fuel tank may cause a weight increase of the vehicle.

Generally, by raising the seat cushion of the assistant seat toward the seat back in its upright position and then sliding the seat cushion and the seat back forward together, a space for a luggage or the like can be created at a portion where the assistant seat was located originally. Herein, in the above-described structure, the side projection portions might prevent such a proper luggage space to be created. Thus, this conventional structure has another problem that a proper utilization of space during a seat arrangement of the vehicle may not be attained.

Meanwhile, the following structure is also known as another conventional fuel tank disposition structure. Namely, the tunnel portion which projects upward toward the inside of the cabin at the central portion of the floor panel forming the lower face of the cabin in the vehicle width direction, and there is provided a cover member which is located at substantially the same level as the floor panel so as to cover the lower of the fuel tank. The fuel tank is disposed between the cover member and the tunnel portion so as to extend in the longitudinal direction of the vehicle (Japanese Utility Model Laid-Open Publication No. 59-78131).

In this conventional structure, since the fuel tank is provided in the tunnel portion such that the lower portion of the fuel tank does not project below the floor panel, the height of the fuel tank is apt to be greater in order to ensure a sufficient volume of the fuel tank. Accordingly, this conventional structure may need a relatively large-sized tunnel portion, and it may be difficult to facilitate a walk-through arrangement in the vehicle width direction. Thus, this conventional structure may not be suitable for the compact car particularly, either.

SUMMARY OF THE INVENTION

The present invention has been devised in view of the above-described problems. An object of the present invention is to provide a fuel tank disposition structure of a vehicle which can ensure the sufficient tank volume, the roomy cabin in the vertical direction and the proper foot space of passenger, and improve the function for the vehicle side crash and attain the seat arrangement properly.

According to the present invention, there is provided a fuel tank disposition structure of a vehicle, in which a plurality of passenger seats are disposed longitudinally in a cabin, comprising a tunnel portion provided so as to project upward toward an inside of the cabin at a central portion of a floor panel forming a lower face of the cabin in a vehicle width direction, the tunnel portion including a relatively wide front portion and a relatively narrow rear portion, a fuel tank disposed in the tunnel portion below the floor panel, the fuel tank including a relatively wide front portion and a relatively narrow rear portion so as to correspond to the tunnel portion, wherein a front seat of the passenger seats is disposed above the relatively wide front portion of the tunnel portion, and a rear seat of the passenger seats is disposed above the relatively narrow rear portion of the tunnel portion.

The above-described passenger seats may be comprised of a front seat (driver seat, assistant seat) and a rear seat, and the fuel tank may be formed of synthetic resins. According to this structure, the roomy cabin in the vertical direction can be obtained, ensuring the sufficient volume of the fuel tank by the tank shape including the relatively front wide portion and the relatively narrow rear portion. Also, the foot space of, especially the rear seat passenger can be ensured by the relatively narrow rear portion.

Further, since the fuel tank is located in the tunnel portion having a contour which corresponds to a shape of the fuel tank, the function for the vehicle side crash can be improved. Also, since the relatively wide front portion of the tunnel portion has a specified width so as not to reach a side sill, a seat arrangement can be attained properly.

According to a preferred embodiment, the relatively narrow rear portion of the tunnel portion provides a foot space of the passenger on a rear seat. According to this structure, the rear seat passenger can place the feet on this foot space and maintain a comfortable sitting position.

According to another preferred embodiment, the foot space of the passenger on the rear seat is formed beside the relatively narrow rear portion of the tunnel portion and between an upper face of the floor panel and a lower portion of a seat cushion of the front seat. According to this structure, the rear seat passenger can sit, extending legs, in a comfortable position with the feet placed on the foot space. This should be useful especially for a compact car.

According to another preferred embodiment, the tunnel portion includes a slant portion at a front end portion whose width becomes gradually narrower toward the front thereof, and the foot space of the front seat passenger is formed beside the slant portion. According to this structure, since the foot space of the front seat passenger is formed beside the slant portion, the comfortable sitting position of the front seat passenger can be obtained.

According to another preferred embodiment, a filler pipe as a fuel supply pipe is coupled to a rear end portion of the fuel tank. According to this structure, the filler pipe can be shortened and the safety can be improved thereby.

According to another preferred embodiment, a canister is provided at a front end portion of the fuel tank. According to this structure, the canister can be located as close to an engine as possible and an effective utilization of space can be attained.

According to another preferred embodiment, a floor frame is provided so as to extend in the longitudinal direction of the vehicle along the floor panel between the tunnel portion and a side sill which extends in the longitudinal direction of the vehicle at a side end of the floor panel, and an exhaust pipe is provided between the floor frame and the tunnel portion so as to extend in the longitudinal direction of the vehicle. According to this structure, the exhaust pipe can be disposed as straightly as possible without deforming the floor frame (vehicle body). Also, the floor face can be located at the lower level by disposing the exhaust pipe so as not to interfere with the floor frame. Also, since the fuel tank is located in the tunnel portion, the fuel tank is not apt to receive the heart from the exhaust pipe and the heat problem can be properly prevented thereby.

According to another preferred embodiment, the fuel tank disposition structure further comprises a cross member which is provided on the floor panel so as to extend in the vehicle width direction and perpendicularly to the tunnel portion, and a tunnel member which interconnects both portions at a lower open side of the tunnel portion in the vehicle width direction corresponding to the cross member, wherein the fuel tank is supported by the tunnel member. The above-described cross member may be disposed so as to extend beyond the tunnel portion. According to this structure, since the fuel tank is supported by the tunnel member at a portion corresponding an enhanced vehicle-body rigidity portion by the cross member, especially for the vehicle side crash, the support rigidity of the fuel tank can be ensured and the fuel tank can be protected properly.

According to another preferred embodiment, a plurality of cross members are disposed separately from each other in the longitudinal direction of the vehicle, there are provided a plurality of tunnel members so as to correspond to the cross members, and the fuel tank is supported by the plural tunnel members which are located separately from each other in the longitudinal direction of the vehicle. According to this structure, since the fuel tank is supported by the plural tunnel members which are located separately from each other in the longitudinal direction of the vehicle and interconnect both portions at the lower open side of the tunnel portion in the vehicle width direction, the support rigidity of the fuel tank can be improved.

According to another preferred embodiment, the cross member is provided at least so as to correspond to the relatively wide front portion of the tunnel portion. According to this structure, since the cross member is provided properly at the relatively wide front portion, the vehicle-body rigidity against the side crash can be improved and thus the safety can be ensured. Further, by providing the cross member so as to extend in the vehicle width direction beyond the relatively wide front portion of the tunnel portion, the rigidity of the wide portion can be improved.

According to another preferred embodiment, the cross member is provided so as to correspond to the relatively narrow rear portion of the tunnel portion. According to this structure, the vehicle-body rigidity against the vehicle side crash and the support rigidity of the fuel tank can be improved.

According to another preferred embodiment, the passenger seat is provided in the cabin and the seat is attached to the cross member. According to this structure, both improvement of the support rigidity of the fuel tank by the tunnel members and the support rigidity of the front seat attached to the cross members can be attained.

According to another preferred embodiment, an attaching member to attach the fuel tank is provided between the fuel tank and the tunnel portion, and the attaching member is configured so as to allow the fuel tank to move out from an inner space of the tunnel portion when the vehicle has the side crash.

According to this structure, since the attaching member allows the fuel tank to move out from the inner space of the tunnel portion when the vehicle has the side crash, the fuel tank can be prevented from being broken properly during the vehicle side crash and the safety can be ensured against the vehicle side crash thereby.

According to another preferred embodiment, the attaching member includes an upper attaching member which is provided below the lower face of the tunnel portion and a lower attaching member which is provided at the open side of the tunnel portion to support the fuel tank, and the lower attaching member is configured so as to be deformed downward by a load from the side. According to this structure, since the lower attaching member is deformed downward by the load which is applied from the side during the vehicle side crash, the fuel tank can be surely allowed to be moved downward.

According to another preferred embodiment, the upper attaching member is configured so as to be deformed in such a manner that the width thereof reduces when the vehicle has the side crash, whereby the fuel tank can be moved downward. According to this structure, since the fuel tank can be moved downward by the upper attaching member, maintaining the shape of the tunnel portion as much as possible, the safety can be improved further.

According to another preferred embodiment, the fuel tank includes a taper portion at the upper portion of thereof so as to gradually reduce the width thereof upward. According to this structure, the fuel tank can be moved downward more smoothly by the taper portion during the vehicle side crash.

According to another preferred embodiment, the lower attaching member is configured such that connection between the lower attaching member and the vehicle body is ensured when the side-crash load acts. According to this structure, since the fuel tank can be prevented from dropping during the vehicle side crash, allowing being to move downward, the safety can be improved further.

According to another preferred embodiment, the fuel tank disposition structure further comprises the cross member which is provided below the floor panel so as to extend in the vehicle width direction crossing the tunnel portion, and the fuel tank is supported by the cross member. It is preferable that the cross member is a member with a closed cross section.

According to this structure, since the cross member is provided below the floor panel, the floor panel can be lowered and the roomy cabin can be obtained thereby. Further, since the fuel tank is directly supported by the cross member, the number of parts for supporting the tank can be reduced and the vehicle-body rigidity and tank-support rigidity can be ensured with a simple structure. Also, since the cross member extends straightly in the vehicle width direction across the tunnel portion, the high vehicle-body rigidity can be ensured.

According to another preferred embodiment, there are provided side sills which extend in the longitudinal direction of the vehicle at both end portions of the floor panel, and both end portions of the cross member are connected with the side sills. According to this structure, since the side sills bear the support rigidity of the fuel tank, the tank-support rigidity can be improved further and becomes advantageous against the vehicle side crash as well.

According to another preferred embodiment, there is provided an exhaust pipe which extends in the longitudinal direction of the vehicle beside the fuel tank, and the cross member includes a recess portion to avoid the interference with the exhaust pipe at a middle portion thereof in the vehicle width direction. According to this structure, since the recess portion avoids the interference with the exhaust pipe, the disposition of the cross member and the disposition of the exhaust pipe can be attained at the same time.

According to another preferred embodiment, the fuel tank includes a recess portion which extends in the vehicle width direction at a cross-member disposition portion of the bottom thereof, and the cross member is disposed at the recess portion so as to extend straightly in the vehicle width direction. According to this structure, since the cross member is disposed so as to extend straightly, the vehicle-body rigidity can be further improved and the resistance to the vehicle side crash can be increased. Also, since the rigidity of the fuel tank itself is increased by the recess portion, the tank rigidity can be improved.

According to another preferred embodiment, both end portions of the cross member are detachably connected with the side sill. According to this structure, the maintenance of the fuel tank can be improved.

According to another preferred embodiment, there is provided a floor frame which extends in the longitudinal direction of the vehicle at the floor panel, the floor frame includes a connecting portion which is connected with the tunnel portion, and a support portion of the fuel tank is attached to the connecting portion of the floor frame.

According to this structure, since the floor frame extending in the longitudinal direction as the vehicle-body rigidity is connected with the tunnel portion via the connecting portion, the rigidity of the tunnel portion can be endured. Also, since the support portion of the fuel tank is attached to the connecting portion (connecting portion of the floor frame with the tunnel portion), the support rigidity of the fuel tank can be ensured. Namely, both the rigidity of the tunnel portion and the support rigidity of the fuel tank can be ensured.

According to another preferred embodiment, the floor frame includes an extended portion which extends in the longitudinal direction of the vehicle along a side portion of the tunnel portion with a specified length, a plurality of support portions of the fuel tank are provided separately from each other in the longitudinal direction, and a plurality of support members are attached to the extended portion of the floor frame. According to this structure, since the plural support portions of the fuel tank provided separately from each other in the longitudinal direction are attached to the extended portion of the floor frame, the fuel tank can be supported at the plural portions longitudinally, thereby increasing the tank-support rigidity.

According to another preferred embodiment, the tunnel portion includes the relatively wide front portion and the relatively narrow rear portion, the fuel tank has the contour which corresponds to the shape of the tunnel portion in the vehicle width direction, and the floor frame is connected over the relatively wide front portion and relatively narrow rear portion of the tunnel portion. According to this structure, by the proper shape of the fuel tank and tunnel portion, the sufficient volume of the fuel tank can be ensured, making the height of the fuel tank as lower as possible, and also the roomy cabin in the vertical direction can be obtained and the rigidity of the tunnel can be ensured by a structure of the floor frame.

According to another preferred embodiment, the support portion of the fuel tank is attached to the vehicle body via the tunnel member which interconnects both portions at the lower open side of the tunnel portion in the vehicle width direction. According to this structure, since the support portion of the fuel tank is attached to the vehicle body via the tunnel member, both the rigidity of the tunnel portion and the tank-support rigidity can be increased.

According to another preferred embodiment, the plural cross members are disposed separately from each other in the longitudinal direction of the vehicle, and the plural support portions of the fuel tank are connected with the plural cross members. According to this structure, even if the fuel tank is relatively long in the longitudinal direction of the vehicle, the fuel tank can be directly supported by the plural cross members, and thus this support can be made stable.

According to another preferred embodiment, there is provided the passenger seat at a portion on the floor panel which corresponds to the extension portion of the floor frame. This passenger seat may be the rear seat. According to this structure, since the passenger seat is attached to the portion corresponding to the extension portion of the floor frame, the support rigidity of the seat can be ensured along with the tank-support rigidity.

According to another preferred embodiment, a front end of the floor frame is connected with a rear end of the front frame, and a branch frame which branches off from a connecting portion of the floor frame with the front frame is connected with the side sill. According to this structure, since the branch frame of the floor frame is connected with the side sill, the floor rigidity and the vehicle-body torsion rigidity can be increased. Since the impact load during the vehicle frontal crash or the vehicle frontal-offset crash is conveyed the side sill via the front frame and branch frame, this structure becomes advantages against the vehicle frontal crash as well.

According to another preferred embodiment, the floor panel is formed of a plurality of split tunnel portion and split flat portion, and the fuel tank is configured so as to be preassembled to the tunnel portion as a module.

According to this structure, since the floor panel is formed of the plural split tunnel portion and split flat portion, the tunnel portion and flat portion can be formed separately and thus even a relatively large and complex floor panel forming the lower face of the cabin can be formed properly, ensuring an appropriate forming of the tunnel. Also, since the fuel tank is configured so as to be preassembled to the tunnel portion as the module, the assembling of the fuel tank to the floor panel can be improved.

According to another preferred embodiment, there is provided the cross member which extends in the vehicle width direction beyond a floor tunnel on the floor panel so as to be overlapped with the flat portion and the tunnel portion. According to this structure, even if the floor panel is split into the flat portion and the tunnel portion, since the cross member is overlapped with these, the vehicle-body rigidity can be ensured properly.

Other features, aspects and advantages of the present invention will become apparent from the following description which refers the accompanying drawings.

DETAILED DESCRIPTION OF THE INVENTION

Hereinafter, preferred embodiments of the present invention will be described in detail referring to the accompanying drawings. It should be understood that even though embodiments are separately described, single features thereof may be combined to additional embodiment.

Figure 1:
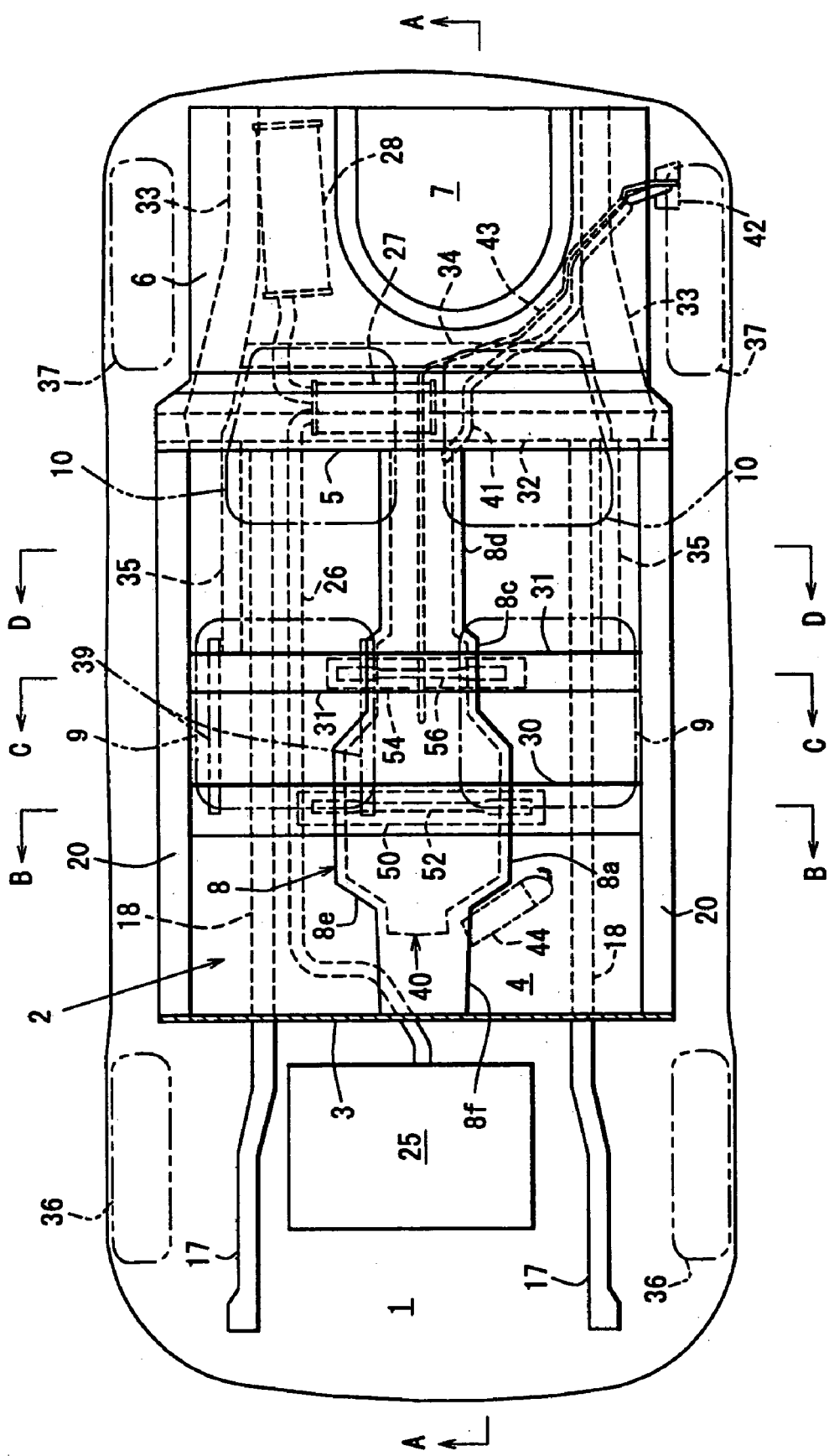
FIG. 1 is a plan view illustrating a fuel tank disposition structure according to an embodiment of the present invention.
Figure 2:
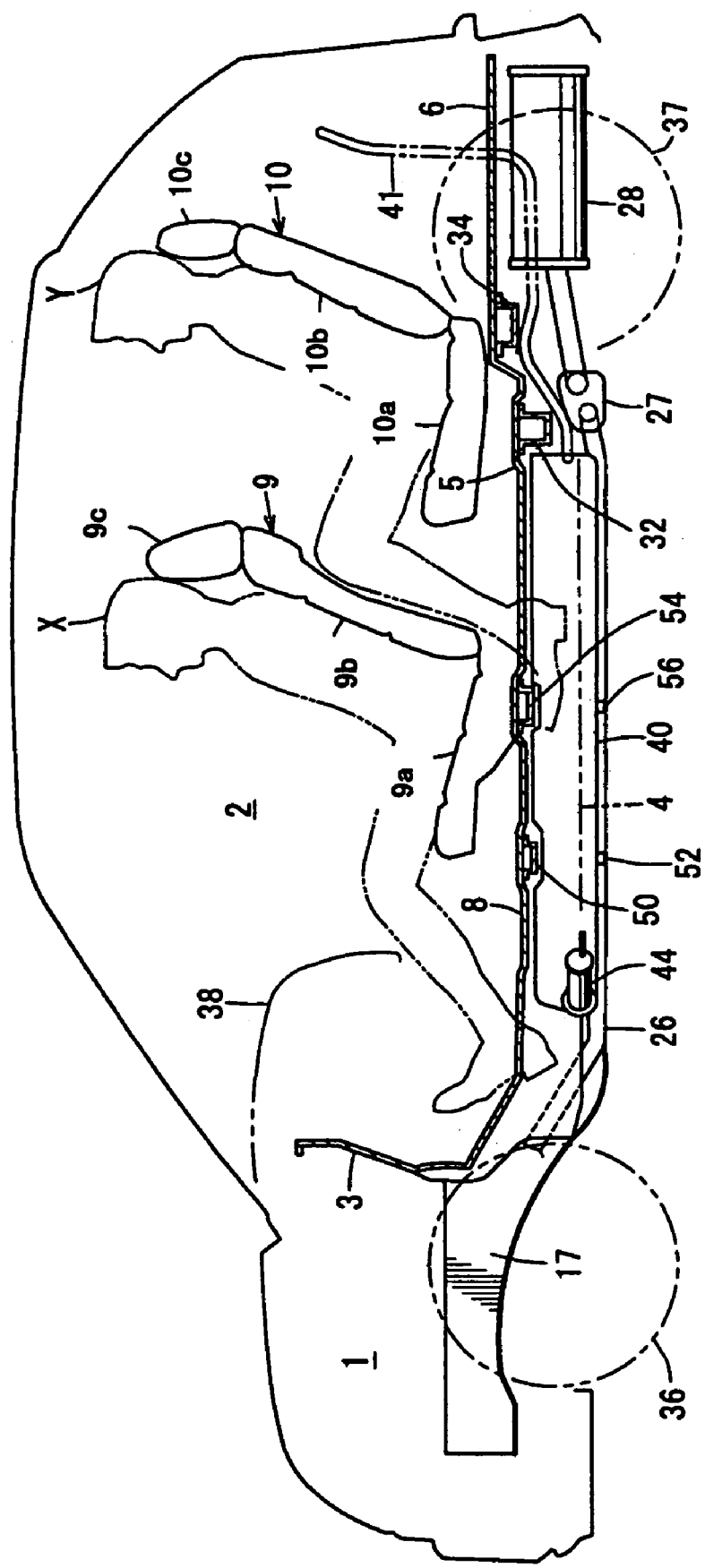
FIG. 2 is a side view illustrating the fuel tank disposition structure according to present embodiment.
Figure 3:
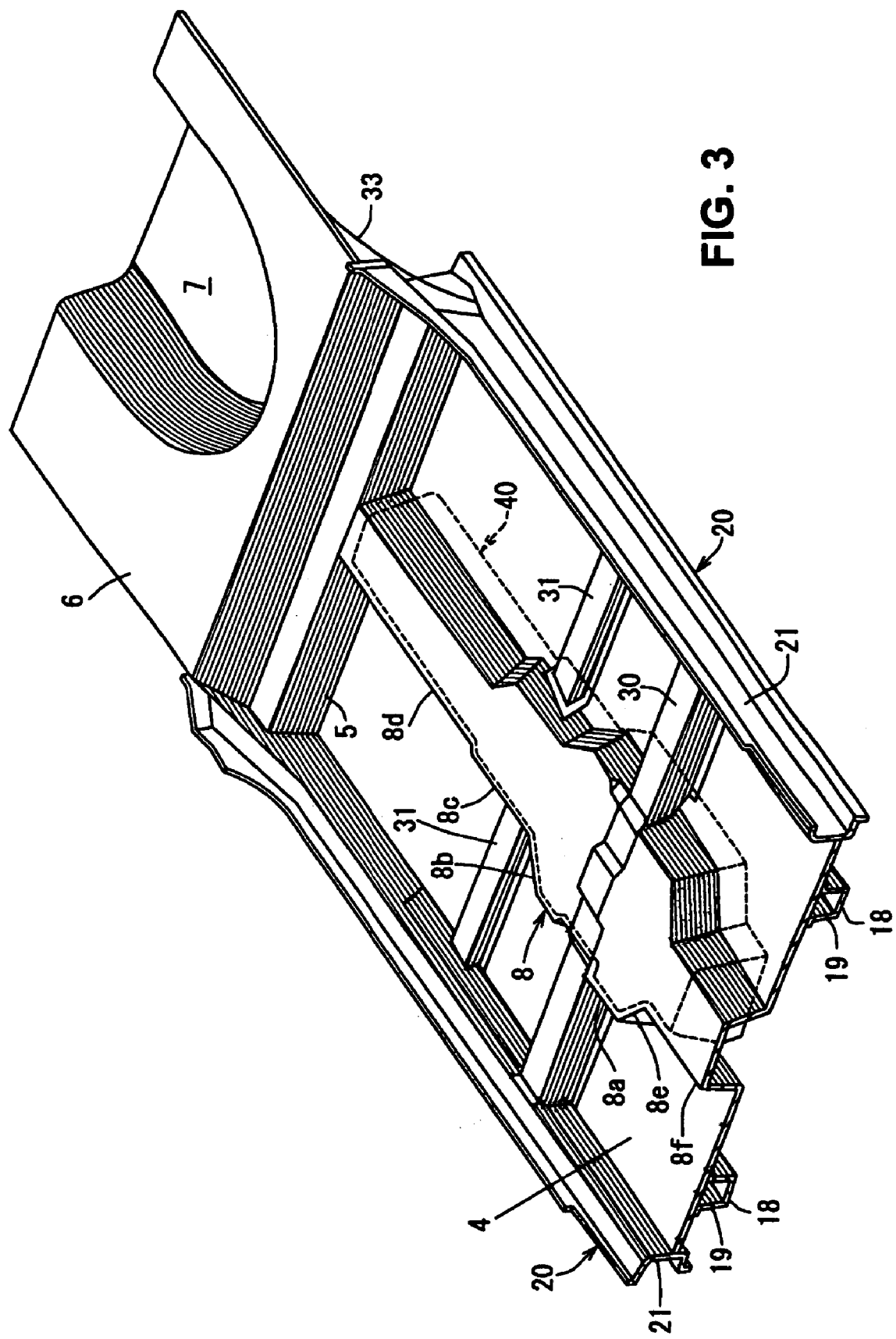
FIG. 3 is a perspective view of a major portion of FIG. 1.

Figures illustrate a fuel tank disposition structure of a vehicle, and as illustrated in FIGS. 1, 2 and 3, there is provided a dash lower panel (dash panel) 3 which separates a cabin 2 from an engine room 1 in a longitudinal direction of a vehicle. A floor panel 4 which forms a lower face of the cabin 2 is connected with a lower end portion of the dash lower panel 3. The floor panel 4 extends substantially horizontally from the front to the rear of the vehicle. A rear floor panel 6 is integrally connected with a rear end portion of the floor panel 4 via a kickup portion 5, and a spare tire pan 7 is formed at a central portion of the rear floor panel 6 so as to be located in a lower position. There is provided a tunnel portion 8 which projects upward toward an inside of the cabin 2 at a central portion of the floor panel 4 in a vehicle width direction.

Figure 4:
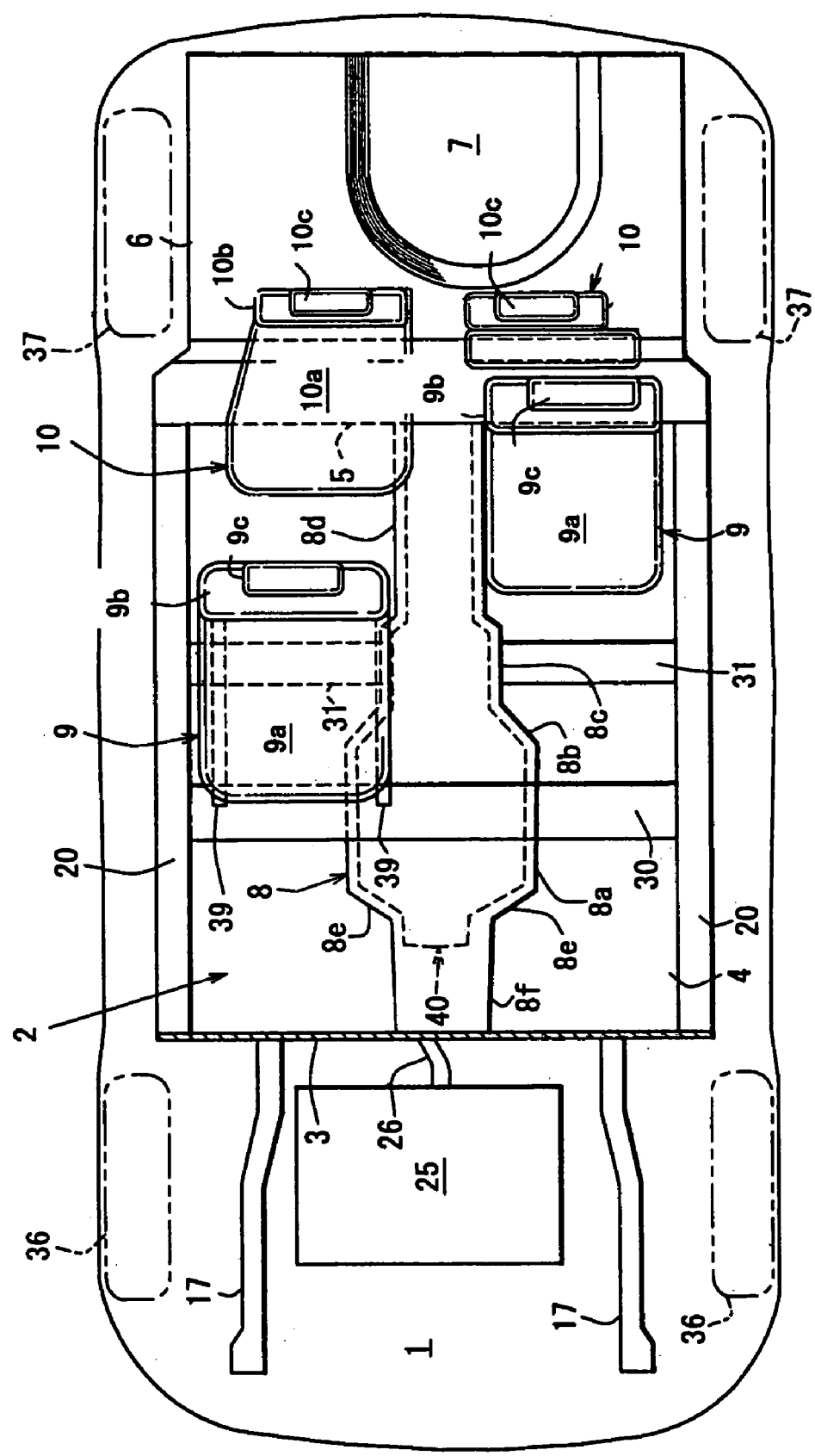
FIG. 4 is a plan view illustrating a seat arrangement of an assistant seat.

The tunnel portion 8 extends in the longitudinal direction of the vehicle from the dash lower panel 3 to the kickup portion 5 as illustrated in FIGS. 3 and 4. The tunnel portion 8 comprises a wide portion 8a at a front portion thereof which is relatively wide, a narrow portion 8c which is relatively narrow, which is connected via a slant portion 8b whose width becomes gradually narrower toward the rear, and a slim portion 8d which is narrower than the narrow portion 8c.

Also, the tunnel portion 8 further comprises another slant portion 8e which is located before the wide portion 8a and whose width becomes gradually narrower, and another slim portion 8f which extends forward, or toward the dash lower panel 3. And, there are provided front seats 9, 9 which are disposed above the wide portion 8a of the tunnel portion 8, and rear seats 10, 10 which are disposed above a rear portion of the slim portion 8d. Thus, there are provided a plurality of rows of seats 9 and 10 longitudinally in the cabin 2.

Herein, as illustrated in FIGS. 1, 2 and 4, the front seat 9 comprises a seat cushion 9a, seat back 9b and headrest 9c, and the rear seat 10 comprises a seat cushion 10a, seat back 10b and headrest 10c as well.

There is provided a foot space of a rear seat passenger Y on the rear seat 10 beside the narrow portion 8c and slim portion of the tunnel portion 8 (see FIG. 2). Particularly, in the present embodiment, the foot space of the rear seat passenger Y (foot positions of the rear seat passenger Y are illustrated by an imaginary line a in FIG. 5) is formed beside the narrow portion 8c of the tunnel portion 8 and between an upper face of the floor panel 4 and a seat cushion lower portion of the front seat 9 in a normal state as illustrated in FIG. 2.

Further, a foot space of a front seat passenger X is formed beside the slant portion 8e and slim portion 8f of the tunnel portion 8 (see FIG. 2). As illustrated in FIGS. 1 and 2, there are provided a pair of right and left front side frames (front frame) 17, 17 as vehicle-body rigidity members, which extend forward from the dash lower panel 3, at both sides in the engine room 1. The front side frames 17, 17 are respectively provided along a lower face of the dash lower panel 3, and a pair of floor frames 18 as vehicle-body rigidity members are integrated or integrally connected with rear ends of these front side frames 17, 17.

The floor frames 18 are vehicle-body rigidity members which extend straightly in the longitudinal direction along the lower face of the floor panel 4 as illustrated in FIGS. 1 and 3. And, a closed cross section 19 is formed between the floor frame 18 and floor panel 4 so as to extend in the same direction.

Figure 7:
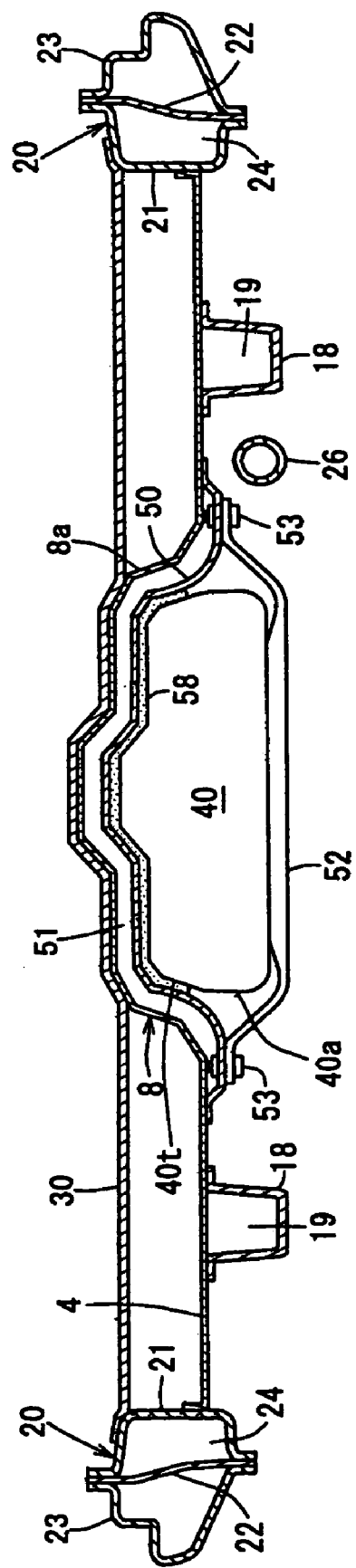
FIG. 7 is a sectional view taken along line B—B of FIG. 1.
Figure 10:
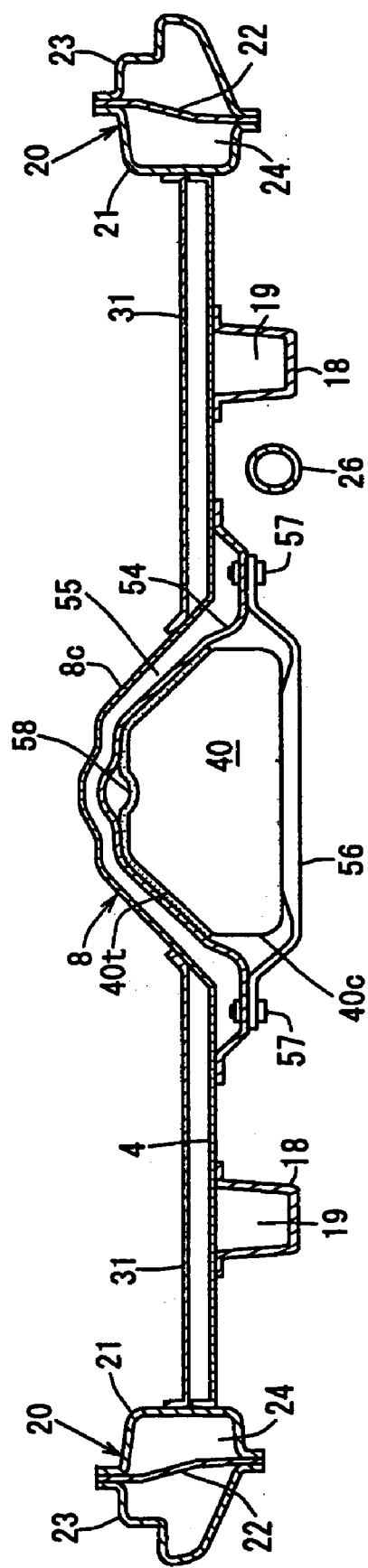
FIG. 10 is a sectional view taken along line C—C of FIG. 1.
Figure 11:
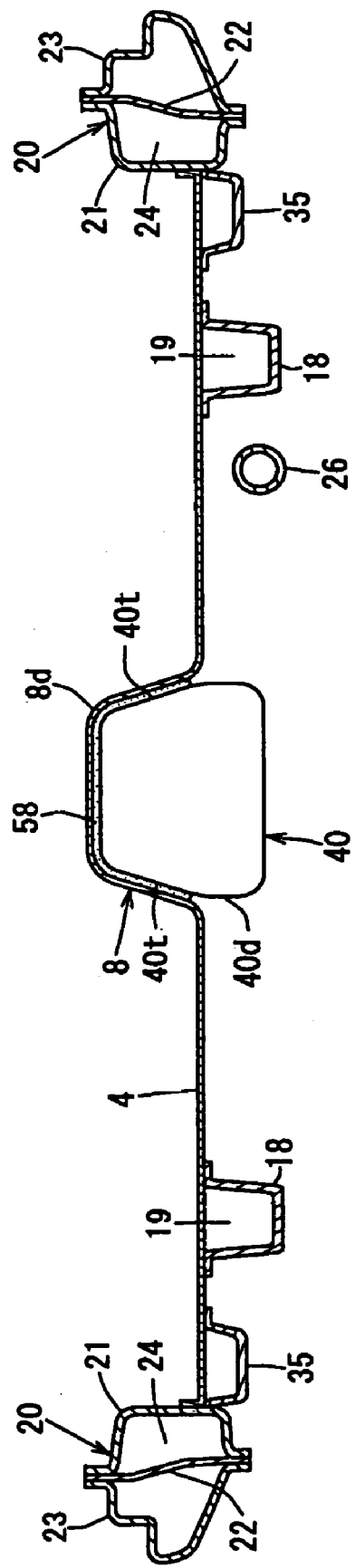
FIG. 11 is a sectional view taken along line D—D of FIG. 1.

Also, there are provided side sills 20, 20 which extend in the longitudinal direction at both sides of the floor panel 4. The side sill 20 is a vehicle-body rigidity member which comprises a side sill inner 21, side sill reinforcement 22 and side sill outer 23 as illustrated in FIGS. 7, 10 and 11. And, a side sill closed cross section 24 is formed between the side sill inner 21 and the side sill outer 23 so as to extend in the longitudinal direction.

Herein, the floor frame 18 is provided so as to extend in the longitudinal direction along the lower face of the floor panel 4 between the side sill 20 and the tunnel portion 8 as illustrated in FIG. 1. Between the floor frame 18 and tunnel portion 8 is provided an exhaust pipe 26 as an exhaust passage to exhaust gas from an engine 25 rearward.

As illustrated in FIGS. 1 and 2, a pre-silencer 27 is located at a middle portion of the exhaust pipe 26, and a main-silencer 28 is attached to a rear end of the exhaust pipe 26. As illustrated in FIGS. 1 and 3, at the floor panel 4 is provided a cross member 30 (so-called No. 2 cross member) as a vehicle-rigidity member which extends in the vehicle width direction to the side sill inners 21, 21 of the right and left side sills 20, 20 beyond the wide portion 8a of the tunnel portion 8. This cross member 30 has a cross section of a U shape and extends in the vehicle width direction, or perpendicularly to the tunnel portion 8 extending in the longitudinal direction. The cross member 30 which is disposed so as to extend perpendicularly to and beyond the tunnel portion 8 can improve a rigidity increase of the wide portion 8a.

Further, at a portion which is away from the cross member 30 in the longitudinal direction on the floor panel 4 are provided cross members 31, 31 (so-called No. 2.5 cross member) as a vehicle-rigidity member which interconnect the side sill inners 21, 21 of the right and left side sills 20, 20 and the narrow portion 8c of the tunnel portion 8. This cross member 31 has the cross section of the U shape and extends in the vehicle width direction, or perpendicularly to the tunnel portion 8 extending in the longitudinal direction as well.

Also, as illustrated in FIGS. 1 and 2, at a back face of the kickup portion 5 at rear end portions of the side sills 20, 20 is provided a cross member 32 (so-called No. 3 cross member) which extend in the vehicle width direction, and a pair of rear side frames 33, 33 are provided so as to extend from the both end portions of the kickup portion 5 to the both side portions of the lower face of the rear floor panel 6. And, a cross member (so-called No. 4 cross member) which extends in the vehicle width direction to interconnect the rear side frames 33, 33 is provided at a lower face of a front portion of the rear floor panel 6. The above-described cross members 32 and 34 and the rear side frames 33, 33 are vehicle-body rigidity members respectively.

Further, a pair of right and left rear floor frames 35, 35 are provided at the lower face of the floor panel 4 as illustrated in FIG. 1. This rear floor frames 35, 35 are vehicle-body rigidity members which extend in the longitudinal direction between the cross members 31 and 32 and are located between the side sills 20, 20 and the floor frames 18, 18.

Figure 5:
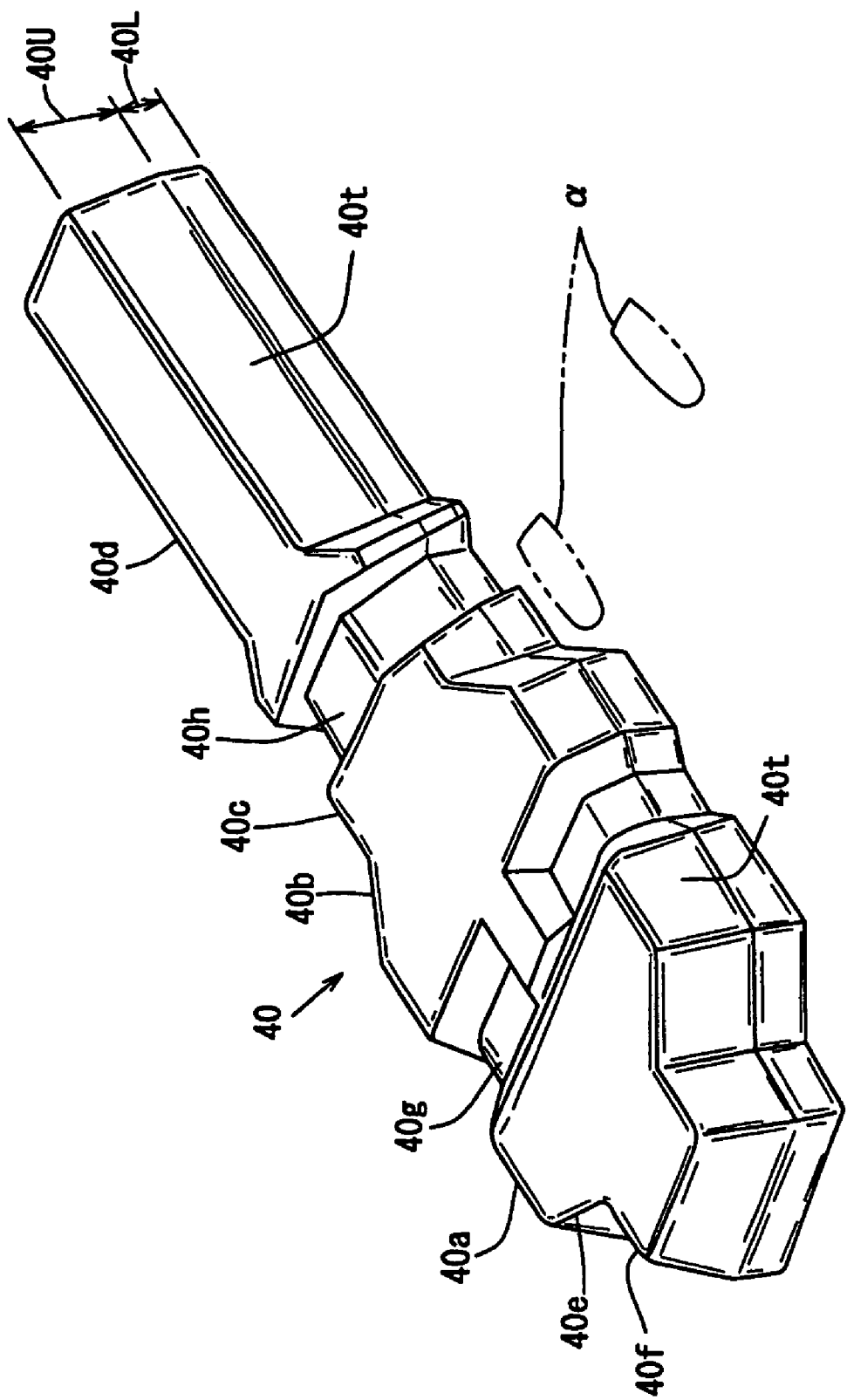
FIG. 5 is a perspective view of a fuel tank.

Herein, reference number 36 denotes a front wheel, reference numeral 37 denotes a rear wheel, reference numeral 38 denotes an instrument panel, and reference numeral 39 denotes a seat slide rail. The front seat 9 is provided on the cross members 30 and 31. FIG. 5 illustrates a fuel tank 40 disposed in the tunnel portion 8 below the floor panel 4, which has a contour which corresponds to a shape of the tunnel portion 8 in the vehicle width direction.

Namely, as illustrated in FIG. 5, the fuel tank 40 comprises a wide portion 40a at its front portion which is relatively wide, a narrow portion 40c which is relatively narrow, which is connected via a slant portion 40b whose width becomes gradually narrower toward the rear, and a slim portion 40d which is narrower than the narrow portion 40c.

Also, the fuel tank 40 further comprises another slant portion 40e which is located before the wide portion 40a and whose width becomes gradually narrower, and another slim portion 40f which extends forward by a specified distance. The upper portion of the fuel tank 40 is configured in a taper shape in such a manner that its width become gradually narrower. Namely, at the both sides of the upper portion of the fuel tank 40 are provided taper portions 40t, 40t which extend longitudinally. Thus, the fuel tank 40 is formed so that a sufficient volume can be ensured even if its height is not so great.

Figure 6:
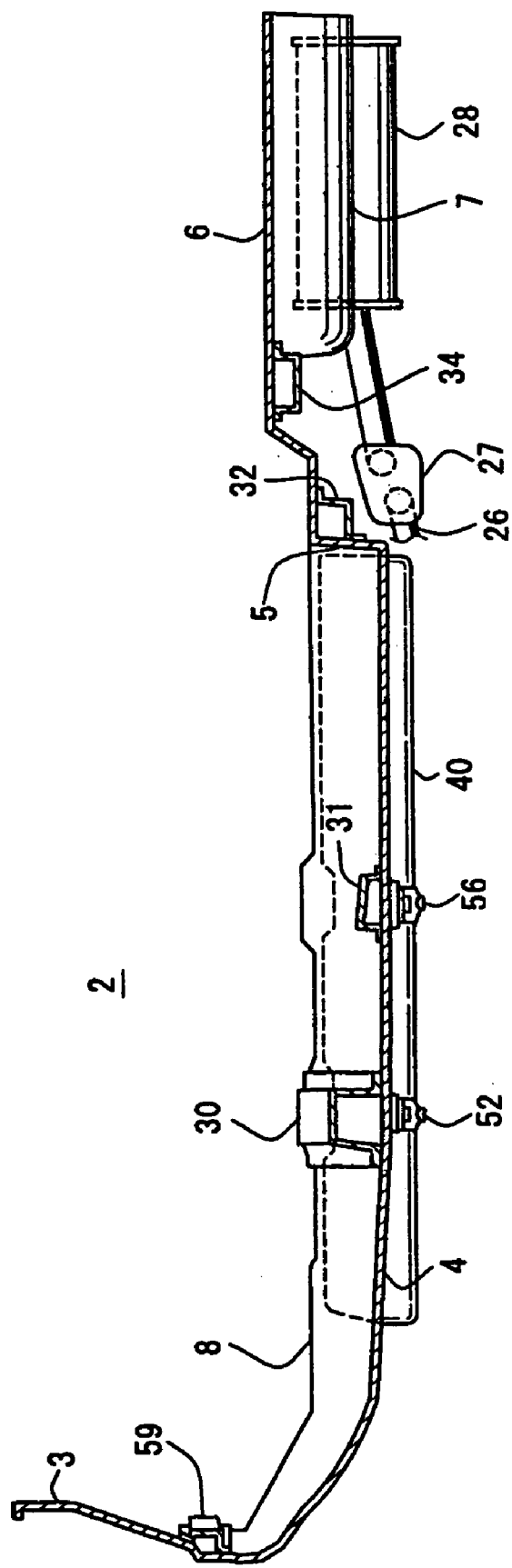
FIG. 6 is a sectional view taken along line A—A of FIG. 1.

This fuel tank 40 is disposed in the tunnel portion 8 below the floor panel 4 as illustrated in FIGS. 1 through 4, and 6. Herein, the fuel tank 40 is disposed in such a manner that its upper-side large part portion 40U (see FIG. 5) is located in the tunnel portion 8 and its lower-side part portion 40L (see FIG. 5) is located at an outside of the tunnel portion 8 below the lower face of the floor panel 4 as illustrated in FIG. 6.

As illustrated in FIGS. 1 and 2, a filler pipe 41 as a fuel supply pipe is coupled to a rear end portion of the fuel tank 40, and the filler pipe 41 is led to a filler box 42 at a rear fender panel. Coupling the filler pipe 41 to the rear end portion of the fuel tank 40 can shorten the filler pipe 41 and ensure the safety thereby.

Also, as illustrated in FIG. 1, a breather pipe 43 to relieve air in the fuel tank 40 during a fuel pouring is attached to the center of the upper portion of the fuel tank 40, and this breather pipe 43 is led to the filer box 42 at the rear fender panel.

Further, as illustrated in FIGS. 1 and 2, a canister 44 is disposed below the slant portion 40*e* at the front end portion of the fuel tank 40 along the slant portion 40*e*. This disposition of the canister 44 can enable the canister 44 to be located as close to the engine 25 as possible and an effective utilization of space. The canister 44 is a component to keep evaporator gas from the fuel tank 40 temporarily therein and supplies the gas to the engine 25 along with intake air during the engine start.

Figure 8:
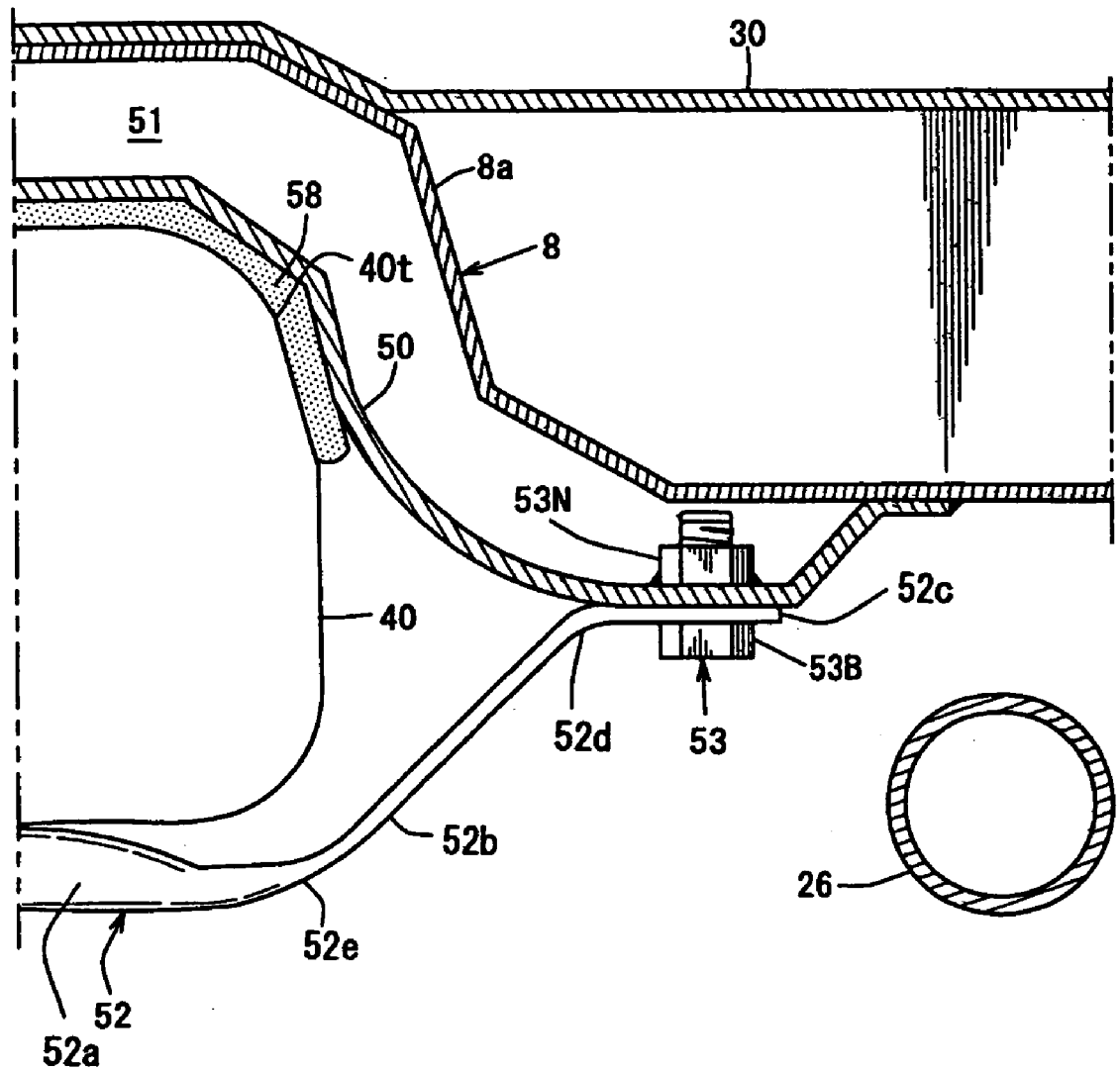
FIG. 8 is an enlarged view of FIG. 7.
Figure 9:
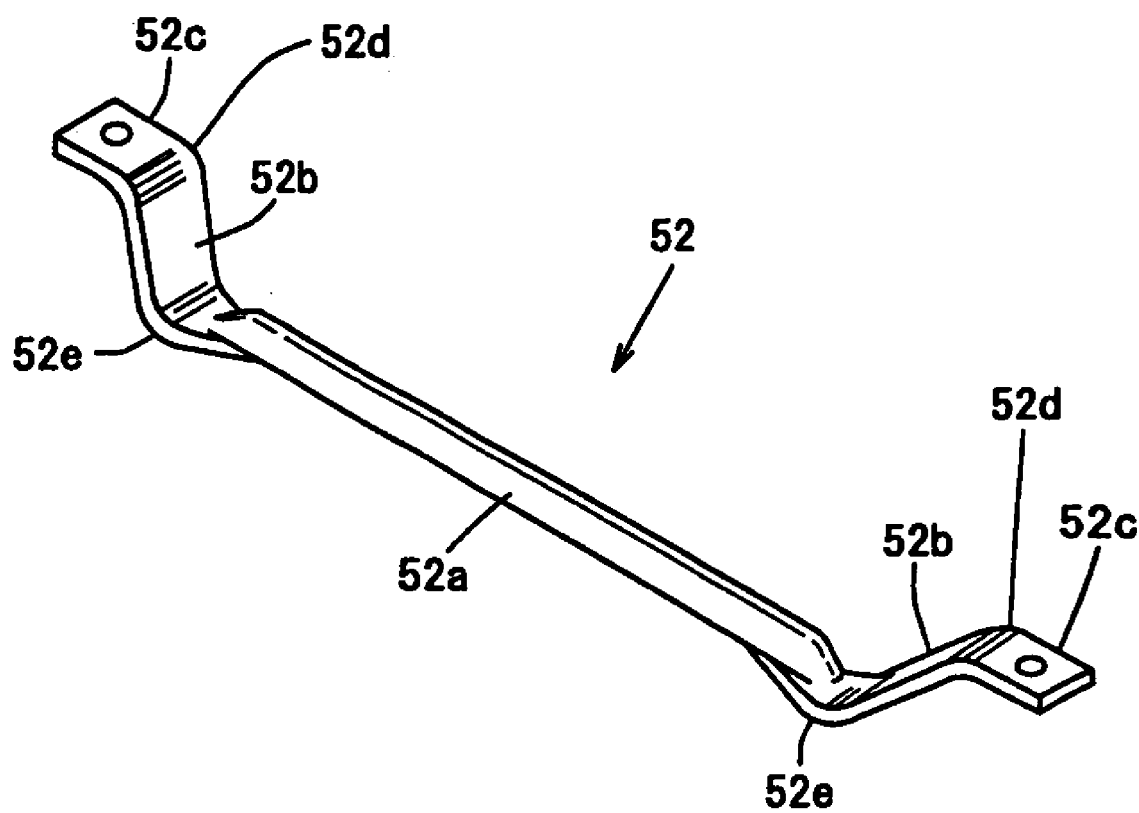
FIG. 9 is a perspective view illustrating a lower tunnel member.
Figure 12:
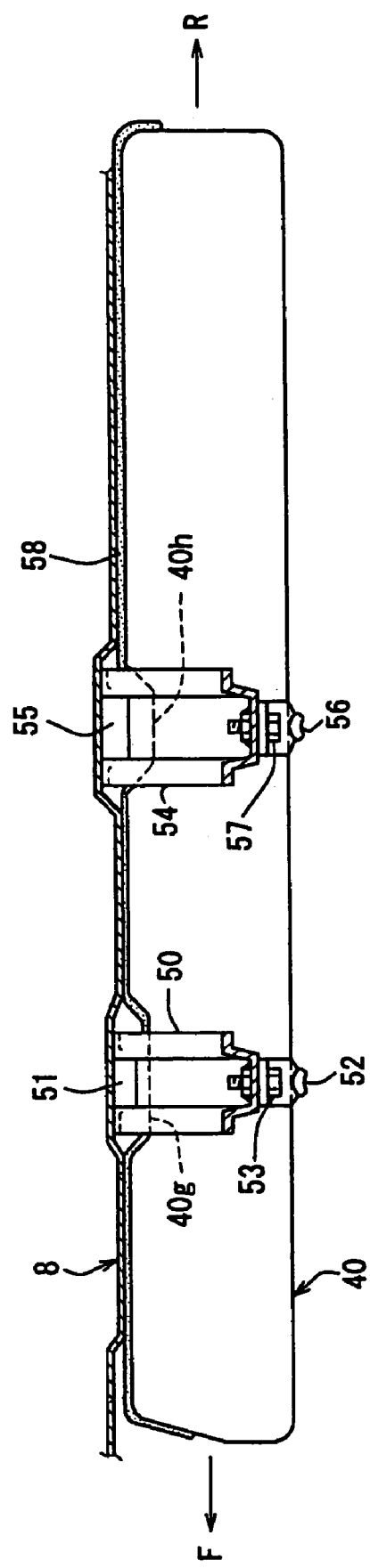
FIG. 12 is an enlarged side view of a major portion of FIG. 2.

Next, a disposition structure of the fuel tank 40 will be described referring to FIGS. 7 through 12. FIG. 7 is a sectional view taken along line B—B of FIG. 1. FIG. 8 is a partial enlarged view of FIG. 7. FIG. 9 is a perspective view of one member extracted. FIG. 10 is a sectional view taken along line C—C of FIG. 1. FIG. 11 is a sectional view taken along line D—D of FIG. 1. FIG. 12 is a partial enlarged view of FIG. 2.

The fuel tank 40 includes recess portions 40*g* and 40*h* which are formed respectively corresponding to the wide portion 40*a* and narrow portion 40*c* as illustrated in FIG. 5. Also, there is provided a tunnel front member 50 (so-called tunnel member inner) with a substantially reverse U-shaped section as an upper attaching member below the lower face of the wide portion 8*a* of the tunnel portion 8 corresponding to the recess portion 40*g* as illustrated in FIGS. 7 and 12. This tunnel front member 50 is a reinforcement member to interconnects both sides of a lower outside portion of the tunnel portion 8 in the vehicle width direction corresponding to the cross member 30 above the fuel tank 40. And, between the tunnel portion 8 and the tunnel front member 50 is formed a closed section 51 which extends in the vehicle width direction.

Also, there is provided a lower tunnel member 52 as an attaching member which interconnects both portions at the lower open side of the tunnel portion 8 in the vehicle width direction below the fuel tank 40 corresponding to the cross member 30 and the tunnel front member 50 in the vertical direction. And, both ends of the lower tunnel member 52 are fixed to both end portions of the tunnel front member 50 via attaching members 53, 53 such as bolts and nuts, and the fuel tank 40 is supported by the lower tunnel member 52 thereby.

In the present embodiment, the lower tunnel member 52 is formed of a pipe member whose both ends are formed in a flat shape as illustrated in FIG. 8. The lower tunnel member 52 is detachably connected with the tunnel front member 50 via nuts 53N, which are welded to the upper face of the tunnel front member 50, and bolts 53B which are inserted from below and fastened to the nuts 53N.

The above-described lower tunnel member 52, as illustrated in the perspective view of FIG. 9, comprises a support portion 52*a* to support the lower portion of the fuel tank 40, right and left connecting portions 52*b*, 52*b* to extend obliquely upward from both ends of the support portion 52*a*, and attachment pieces 52*c*, 52*c* to extend outward from upper end portions of the connecting portions 52*b*, 52*b* respectively, which are integrated or connected integrally with each other. Herein, when the vehicle has a side crash, the lower tunnel member 52 is bent downward with bent points of corner portions 52*d*, 52*d* between the portions 52*c* and 52*b* and corner portions 52*e*, 52*e* between the portions 52*b* and 52*a*. Thus, the fuel tank 40 is allowed to move out from the inner space of the tunnel portion 8.

Further, as illustrated in FIGS. 10 and 12, there is provided a tunnel rear member 54 (so-called tunnel member inner) with a substantially reverse V-shaped section as an upper attaching member below the lower face of the narrow portion 8*c* of the tunnel portion 8 corresponding to the recess portion 40*h* of the fuel tank 40. This tunnel rear member 54 is a reinforcement member to interconnects both portions at the lower open side of the tunnel portion 8 in the vehicle width direction corresponding to the cross member 31 above the fuel tank 40. And, between the tunnel portion 8 and the tunnel rear member 54 is formed a closed section 55 which extends in the vehicle width direction.

Also, there is provided a lower tunnel member 56 as a lower attaching member which interconnects both portions at the lower open side of the tunnel portion 8 in the vehicle width direction below the fuel tank 40 corresponding to the cross member 31 and the tunnel rear member 54. And, both ends of the lower tunnel member 56 are fixed to both end portions of the tunnel rear member 54 via attaching members 57, 57 such as bolts and nuts, and the fuel tank 40 is supported by the lower tunnel member 56 thereby.

In the present embodiment, the lower tunnel member 56 is formed of a pipe member whose both ends are formed in a flat shape. The lower tunnel member 56 is detachably connected with the tunnel rear member 54 via nuts, which are welded to the upper face of the tunnel rear member 54, and bolts which are inserted from below and fastened to the nuts. Herein, the lower tunnel member 56 is configured in the same shape as the lower tunnel member 52 illustrated in FIG. 9.

Namely, there are provided the lower tunnel members 52 and 56 as lower attaching members, corresponding to a plurality of cross members 30 (see FIG. 7) and 31 (see FIG. 10) which are disposed separately from each other in the longitudinal direction. And, the fuel tank 40 is supported by these lower tunnel member 52 and 56 which are located longitudinally so as to interconnect the both portions at the lower open side of the tunnel portion 8. Thus, the support rigidity of the fuel tank 40 can be ensured.

Figure 13:
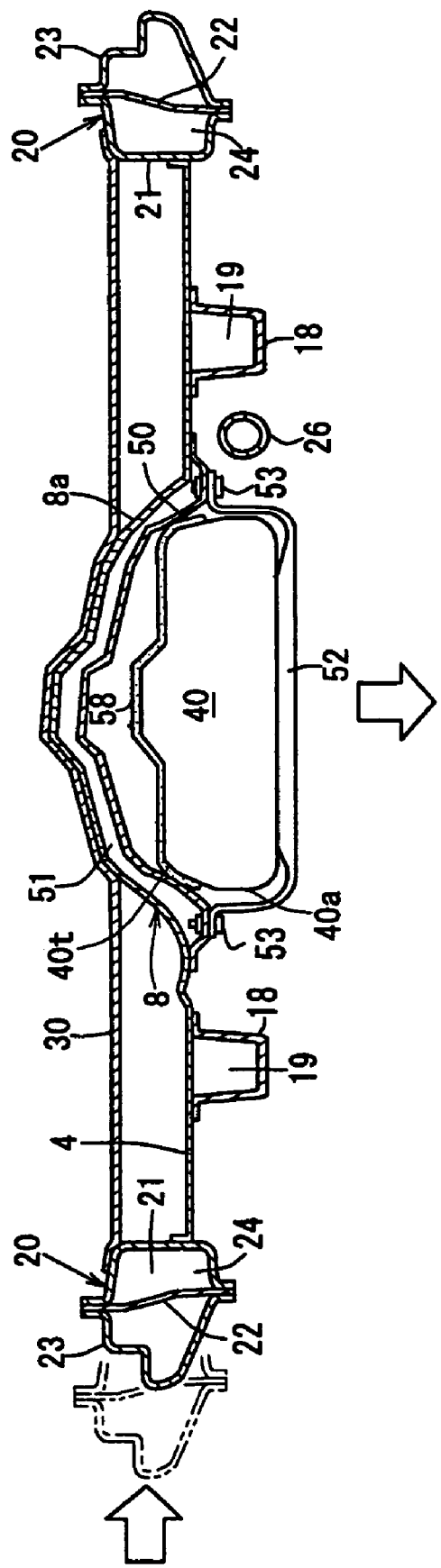
FIG. 13 is an explanatory diagram when a vehicle has a side crash.
Figure 14:
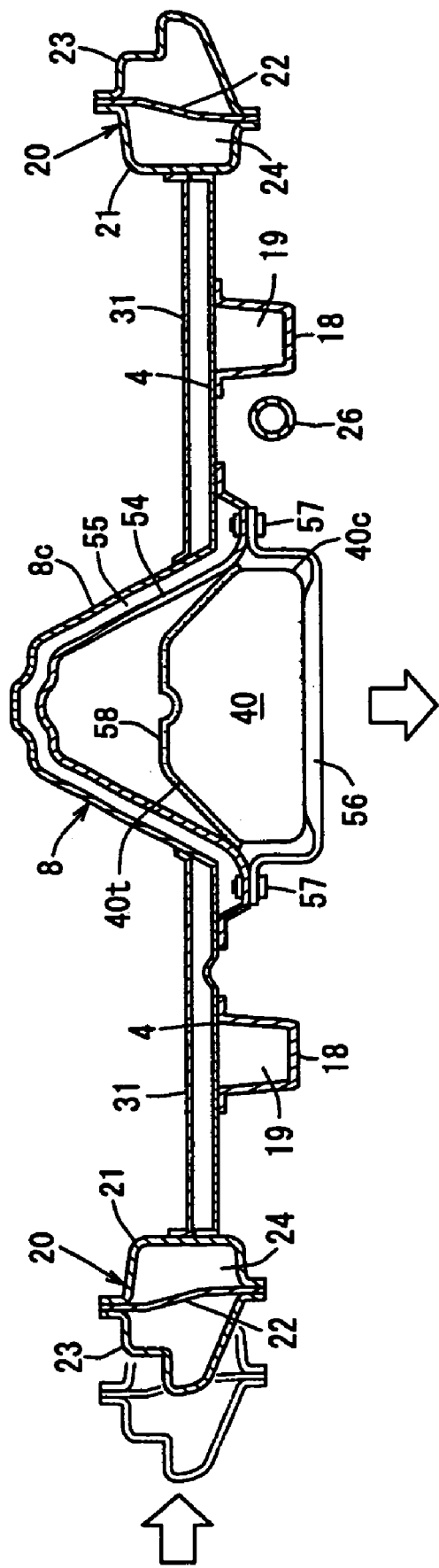
FIG. 14 is an explanatory diagram when the vehicle has the side crash.

FIGS. 13 and 14 are sectional views illustrating deformation states of respective portions during the vehicle side crash. FIG. 13 illustrates the same portion as FIG. 7 dose, and FIG. 14 illustrates the same portion as the FIG. 10 dose. As apparent from comparisons of FIG. 7 and FIG. 13, or FIG. 10 and FIG. 14, the lower tunnel members 52 and 56 as the lower attaching member are configured so as to be deformed downward in the recess shape by a load (side-crash load) from the side and maintain the connection with the vehicle body even when the side-crash load acts.

Also, as apparent from comparisons of FIG. 7 and FIG. 13, or FIG. 10 and FIG. 14, the tunnel front member 50 and the tunnel rear member 54 as the upper attaching member are configured so as to be deformed upward (see FIGS. 13 and 14) from their normal state (see FIGS. 7 and 10) in such a manner that their width reduces when the vehicle has the side crash, whereby the fuel tank 40 can be moved downward by the load (side-crash load) from the side.

Thus, the downward deformation of the lower tunnel members 52 and 56 as the lower attaching members and the upward deformation of the tunnel front members 50 and tunnel rear member 54 as the upper attaching members allow the fuel tank 40 to move out from the inner space of the tunnel portion 8.

Herein, since the taper portions 40t, 40t are formed at the both sides of the upper portion of the fuel tank 40 which gradually reduce the width upward, part of the side-crash load acting inward is converted by the taper portions 40t, 40t into a component force which functions as a force to put the fuel tank 40 downward. As a result, the fuel tank 40 is apt to be moved downward.

As illustrated in FIGS. 7 through 14, a seal member 58 which is made of a heat-resistant fiber material is disposed between the upper face portion of the fuel tank 40 and the lower faces of the tunnel portion 8, tunnel front member 50 and tunnel rear member 54.

Further, as illustrated in FIGS. 7, 10 and 11, there is provided the exhaust pipe 26 extending longitudinally between the floor frame 18 and the tunnel portion 8. Thus, the exhaust pipe 26 is disposed as straightly as possible without deforming the floor frame 18 (vehicle body). Also, the floor face is located at a lower level by disposing the exhaust pipe 26 so as not to interfere with the floor frame 18. Further, the fuel tank 4 is located in the tunnel portion 8, and thus the fuel tank 40 is not apt to receive a heart from the exhaust pipe 26 and a heat problem is properly prevented thereby.

Figure 15:
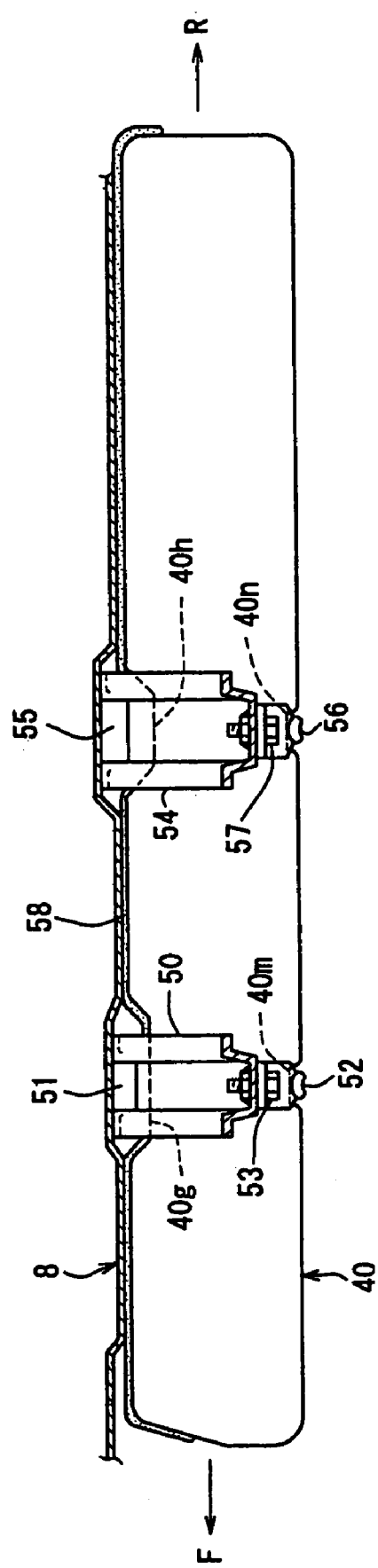
FIG. 15 is a side view illustrating a modified bottom structure of the fuel tank.

Herein, a structure illustrated in FIG. 15 may be used instead of the bottom structure of the fuel tank 40 of FIG. 12. Namely, recess portions 40m and 40n are formed at portions corresponding to the lower tunnel members 52 and 56 of the fuel tank 40, and these recess portions 40m and 40n are supported by the lower tunnel members 52 and 56. And, a lower deck of the fuel tank 40 is located substantially at the same level as a lowermost portion of the lower tunnel members 52 and 56, so that the volume of fuel tank and the rigidity of tank can be increased further.

In the drawings, reference numeral 59 denotes a dash cross member, an arrow F denotes a front of the vehicle and an arrow R denotes a rear of the vehicle. FIG. 4 illustrates a seat arrangement state where the seat cushion 14 of the rear seat 10 is folded in an upright state toward the seat back 15 and then the front seat 9 at an assistant-seat side is slid rearward.

When the vehicle has the crash, the load is applied to the vehicle body from the side, and the sate is changed from the normal state of FIGS. 7 and 10 to the state of FIGS. 13 and 14.

Namely, the tunnel front member 50 and the tunnel rear member 54 as the upper attaching member are deformed upward so as to reduce the width, preventing the cross members 30 and 31 from invading the inside of the tunnel portion 8 and maintaining the shape of the tunnel portion 8 as much as possible. Meanwhile, the lower tunnel member 52 and 56 as the lower attaching member are deformed downward in the recess shape from the state of FIGS. 7 and 10 to the state of FIGS. 13 and 14.

As a result, the fuel tank 40 is moved out from the inside of the tunnel portion 8 as illustrated in FIGS. 13 and 14, and the connection between the lower tunnel members 52 and 56 and the vehicle body is ensured even when the vehicle has the side crash. Thus, the fuel tank 40 can be prevented from dropping down and the safety can be improved thereby.

As described above, according to the present embodiment, there is provided the fuel tank disposition structure of the vehicle, in which a plurality of passenger seats (see the front seat 9 and rear seat 10) are disposed longitudinally in the cabin 2, comprising the tunnel portion 8 provided so as to project upward toward the inside of the cabin 2 at the central portion of the floor panel 4 forming the lower face of the cabin 2 in the vehicle width direction, the tunnel portion 8 including the relatively wide front portion and the relatively narrow rear portion, the fuel tank 40 disposed in the tunnel portion 8 below the floor panel 4, the fuel tank 4 including the relatively wide front portion 8a and the relatively narrow rear portion (see the narrow portion 8c and slim portion 8d) so as to correspond to the tunnel portion 8, wherein the front seat 9 of the passenger seats is disposed above the relatively wide front portion 8a of the tunnel portion 8, and the rear seat 10 of the passenger seats is disposed above the relatively narrow rear portion (see the narrow portion 8c and slim portion 8d) of the tunnel portion 8.

According to this structure, the roomy cabin 2, especially in the vertical direction, can be obtained, ensuring the sufficient volume of the fuel tank 40 by the tank shape including the wide portion 8a and the narrow portion (see the narrow portion 8c and slim portion 8d). Also, the foot space of, especially the rear seat passenger Y can be ensured by the relatively narrow rear portion (see the narrow portion 8c and slim portion 8d).

Further, since the fuel tank 40 is located in the tunnel portion 8 having the contour which corresponds to the shape of the fuel tank 40, the function for the vehicle side crash can be improved. Also, since the wide portion 8a of the tunnel portion has a specified width so as not to reach the side sill 20, the seat arrangement illustrated in FIG. 4 can be attained properly.

Also, the narrow portion 8c of the tunnel portion 8 provides the foot space of the passenger Y on the rear seat 10 (see the imaginary line a in FIG. 5). According to this structure, the rear seat passenger Y can place the feet on this foot space and maintain a comfortable sitting position.

Further, the foot space of the passenger Y on the rear seat 10 is formed beside the narrow portion 8c of the tunnel portion 8 and between the upper face of the floor panel 4 and the lower portion of the seat cushion 9a of the front seat 9. According to this structure, the rear seat passenger Y can sit, extending legs, in a comfortable position with the feet placed on the foot space as illustrated by the imaginary line of FIG. 2. This should be useful especially for a compact car.

Additionally, the tunnel portion 8 includes the slant portion (see the slant portion 8e and slim portion 8f) at the front end portion whose width becomes gradually narrower toward the front thereof, and the foot space of the front seat passenger X is formed beside the slant portion. According to this structure, since the foot space of the front seat passenger X is formed beside the slant portion (see the slant portion 8e and slim portion 8f), the comfortable sitting position of the front seat passenger X can be obtained.

Also, the filler pipe 41 as the fuel supply pipe is coupled to the rear end portion of the fuel tank 40. According to this structure, the filler pipe 41 can be shortened and the safety can be improved thereby.

Further, the canister 44 is provided the front end portion of the fuel tank 40. According to this structure, the canister 44 can be located as close to the engine 25 as possible and the effective utilization of space can be attained.

Additionally, the floor frame 18 is provided so as to extend in the longitudinal direction of the vehicle along the floor panel 4 between the tunnel portion 8 and the side sill 20 which extends in the longitudinal direction of the vehicle at the side end of the floor panel 4, and the exhaust pipe 26 is provided between the floor frame 18 and the tunnel portion 8 so as to extend in the longitudinal direction of the vehicle. According to this structure, the exhaust pipe 26 can be disposed as straightly as possible without deforming the floor frame 18 (vehicle body). Also, the floor face can be located at the lower level by disposing the exhaust pipe 26 so as not to interfere with the floor frame 18. Also, since the fuel tank 4 is located in the tunnel portion 8, the fuel tank 40 is not apt to receive the heart from the exhaust pipe 26 and the heat problem can be properly prevented thereby.

Further, the fuel tank disposition structure further comprises the cross member 30 which is provided on the floor panel 4 so as to extend in the vehicle width direction and perpendicularly (including substantially perpendicularly) to the tunnel portion 8, and the lower tunnel member 52 (see FIG. 7) which interconnects both portions at a lower open side of the tunnel portion 8 in the vehicle width direction corresponding to the cross member 30, wherein the fuel tank 40 is supported by the lower tunnel member 52. According to this structure, since the fuel tank 40 is supported by the lower tunnel member 52 at a portion corresponding an enhanced vehicle-body rigidity portion by the cross member 3, especially for the vehicle side crash, the support rigidity of the fuel tank 40 can be ensured and the fuel tank 40 can be protected properly.

Also, the plural cross members 30 and 31 are disposed separately from each other in the longitudinal direction of the vehicle, there are provided the plural lower tunnel members 52 and 56 (see FIGS. 7 and 9) so as to correspond to the cross members 30 and 31, and the fuel tank 40 is supported by the plural lower tunnel members 52 and 56 which are located separately from each other in the longitudinal direction of the vehicle. According to this structure, since the fuel tank 40 is supported by the plural lower tunnel members 52 and 56 which are located separately from each other in the longitudinal direction of the vehicle and interconnect both portions at the lower open side of the tunnel portion 8 in the vehicle width direction, the support rigidity of the fuel tank 40 can be improved.

Further, the tunnel portion 8 includes the relatively wide front portion (see the wide portion 8a) and the relatively narrow rear portion (see the narrow portion 8c), and the fuel tank 40 has the contour which corresponds to the shape of the tunnel portion 8 in the vehicle width direction as illustrated in FIG. 5. According to this structure, by the proper shape of the fuel tank 40 and tunnel portion 8, the sufficient volume of the fuel tank 40 can be ensured, making the height of the fuel tank as lower as possible, and also the roomy cabin 2, especially in the vertical direction, can be obtained. Namely, the support rigidity of the fuel tank 4, the sufficient volume of the fuel tank 40, and the roomy cabin 2 can be ensured.

Further, the cross member 30 is provided at least so as to correspond to the relatively wide front portion (see the wide portion 8a) of the tunnel portion 8. According to this structure, since the cross member 30 is provided properly at the wide portion, the vehicle-body rigidity against the side crash can be improved and thus the safety can be ensured. Further, by providing the cross member 30 so as to extend in the vehicle width direction beyond the wide portion 8a of the tunnel portion 8 like the present embodiment, the rigidity of the wide portion 8a can be improved.

Additionally, the cross member 31 is provided so as to correspond to the relatively narrow rear portion (see the narrow portion 8c) of the tunnel portion 8. According to this structure, the vehicle-body rigidity against the vehicle side crash and the support rigidity of the fuel tank 40 can be improved. Particularly, by disposing the plural cross members 30 and 31 so as to correspond the front and rear portions of the tunnel portion 8, the vehicle-body rigidity can be improved further.

Also, the passenger seat (see the front seat 9) is provided in the cabin 2 and the seat (see the front seat 9) is attached to the cross members 30 and 31. According to this structure, both improvement of the support rigidity of the fuel tank 40 by the lower tunnel members 52 and 56 and the support rigidity of the front seat 9 attached to the cross members 30 and 31 can be attained.

Further, by providing the tunnel front member 50 (see FIG. 7) and the tunnel rear member 54 (see FIG. 9) below the wide portion 8a (front portion) and the narrow portion 8c (rear portion) of the tunnel portion 8 respectively like the present embodiment, the front and rear portions of the tunnel portion 8 can be strengthened without deteriorating the roomy cabin 2 in the vertical direction.

Further, the attaching member (see the tunnel members 50, 52, 54 and 56) to attach the fuel tank 40 is provided between the fuel tank 40 and the tunnel portion 8, and this attaching member is configured so as to allow the fuel tank 40 to move out from the inner space of the tunnel portion 8 when the vehicle has the side crash.

According to this structure, since the attaching member (see the tunnel members 50, 52, 54 and 56) allows the fuel tank 40 to move out from the inner space of the tunnel portion 8 when the vehicle has the side crash, the fuel tank 40 can be prevented from being broken properly during the vehicle side crash and the safety can be ensured against the vehicle side crash thereby.

Also, the attaching member includes the upper attaching member (see the tunnel front member 50 and the tunnel rear member 54) which is provided below the lower face of the tunnel portion 8 and the lower attaching member (see the lower tunnel members 52 and 56) which is provided at the open side of the tunnel portion 8 to support the fuel tank 40, and this lower attaching member is configured so as to be deformed downward by the load from the side. According to this structure, since the lower attaching member (see the lower tunnel members 52 and 56) is deformed downward by the load which is applied from the side during the vehicle side crash, the fuel tank 40 can be surely allowed to be moved downward.

Further, the upper attaching member (see the tunnel front member 50 and the tunnel rear member 54) is configured so as to be deformed in such a manner that the width thereof reduces when the vehicle has the side crash, whereby the fuel tank 40 can be moved downward. According to this structure, since the fuel tank 40 can be moved downward by the upper attaching member (see the tunnel front member 50 and the tunnel rear member 54), maintaining the shape of the tunnel portion 8 as much as possible, the safety can be improved further.

Additionally, the fuel tank 40 includes the taper portion 40t at the upper portion of thereof so as to gradually reduce the width thereof upward. According to this structure, the fuel tank 40 can be moved downward more smoothly by the taper portion 40t during the vehicle side crash.

Also, there are provided the cross members 30 and/or 31 on the floor panel 4 so as to extend in the vehicle width direction and perpendicularly to the tunnel portion 8. According to this structure, since the side-crash load is born by the cross members 30 and/or 31, the fuel tank 40 can be protected and moved downward.

Also, the plural cross members 30 and 31 are disposed separately from each other in the longitudinal direction of the vehicle, and the plural attaching members (see the tunnel members 50, 52, 54 and 56) are provided so as to correspond to the cross members 30 and 31. According to this structure, the support rigidity of the fuel tank 40 can be improved by the plural attaching members (see the tunnel members 50, 52, 54 and 56) disposed separately from each other in the longitudinal direction of the vehicle. And, since the attaching members (see the tunnel members 50, 52, 54 and 56) are provided so as to correspond to the cross members 30 and 31, the cross members 30 and 31 can be prevented from invading the inside of the tunnel portion 8 during the vehicle side crash, and both the protection of the fuel tank 40 and the safety improvement can be attained.

Further, the lower attaching member (see the lower tunnel members 52 and 56) is configured such that connection between this lower attaching member and the vehicle body is ensured when the side-crash load acts. According to this structure, since the fuel tank 40 can be prevented from dropping during the vehicle side crash, being allowed to move downward, the safety can be improved further.

Additionally, the tunnel portion 8 includes the relatively wide front portion (see the wide portion 8a) and the relatively narrow rear portion (see the narrow portion 8c), and the fuel tank 40 has the contour which corresponds to the shape of the tunnel portion 8 in the vehicle width direction. According to this structure, by the proper shape of the fuel tank 40 and tunnel portion 8, the sufficient volume of the fuel tank 40 can be ensured, making the height of the fuel tank as lower as possible, and also the roomy cabin 2 in the vertical direction can be obtained. Namely, the sufficient volume of the fuel tank, the roomy cabin in the vertical direction, and the safety against the vehicle side crash can be ensured.

Herein, by providing the cross member below the floor panel so as to lower the floor panel, the roomy cabin can be further obtained. Hereinafter, another embodiment with such a cross member provided below the floor panel will be described referring to FIGS. 16 through 25. The same components/structures are denoted in these figures by the same reference characters as those in the previous embodiment, and their detailed descriptions will be omitted.

Figure 16:
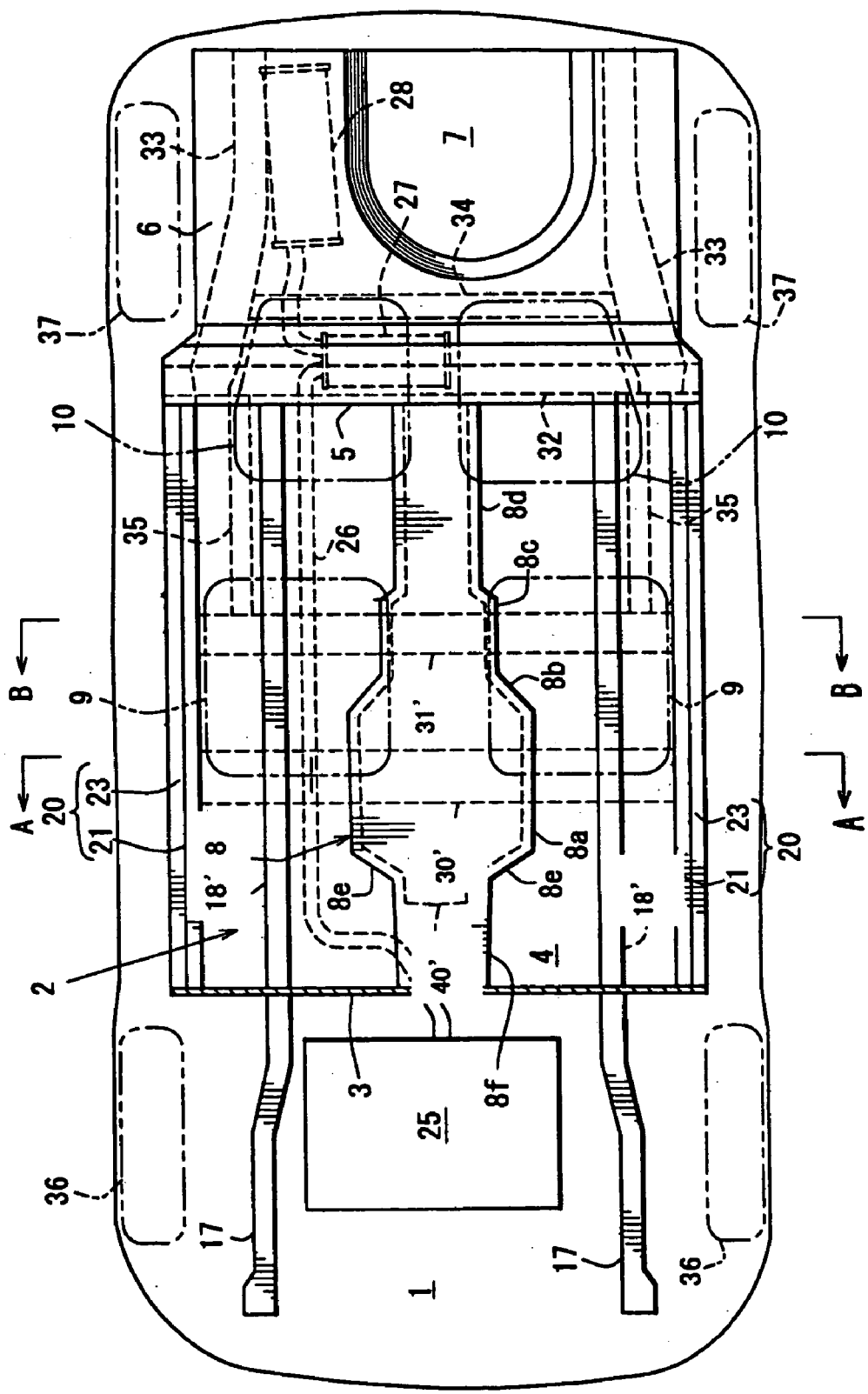
FIG. 16 is a plan view illustrating a fuel tank disposition structure according to another embodiment of the present invention.
Figure 17:
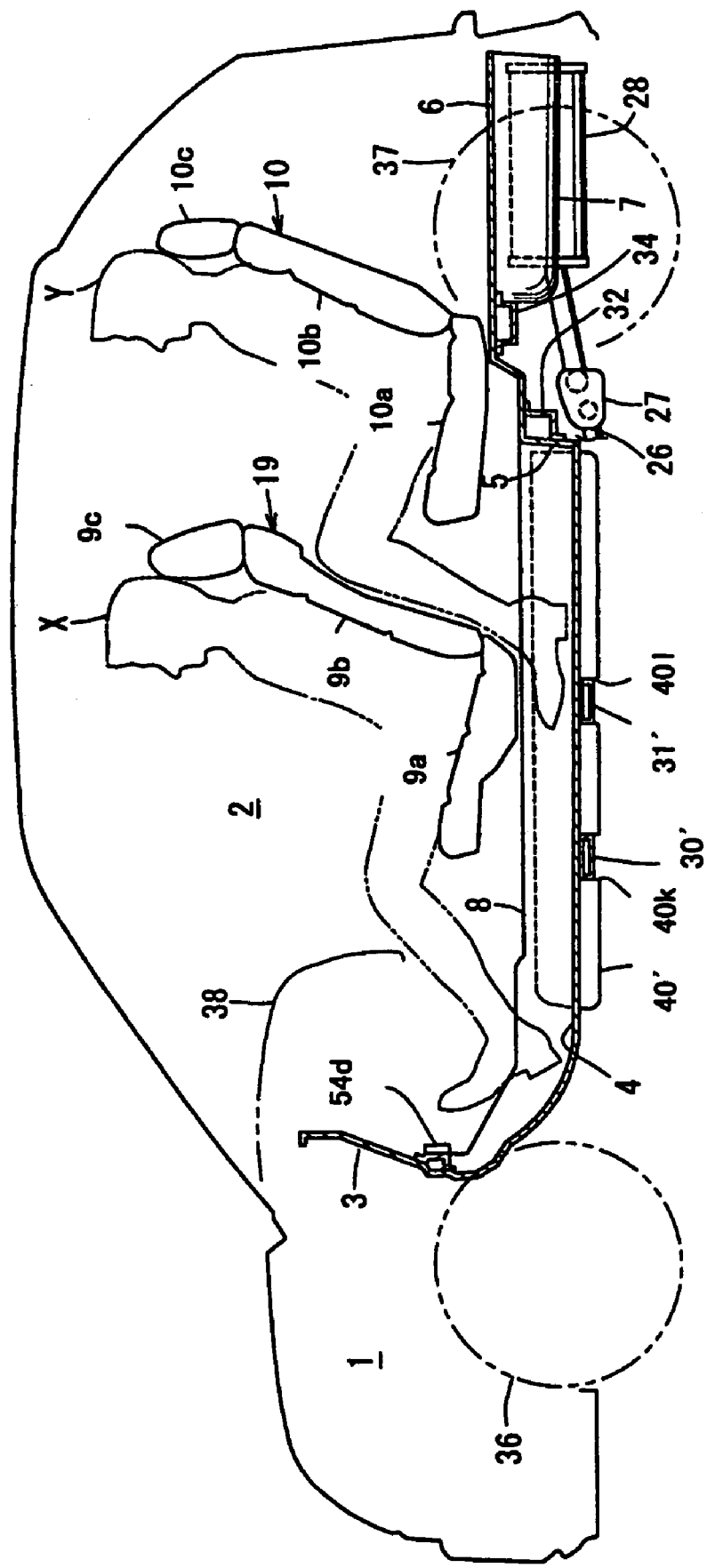
FIG. 17 is a side view illustrating the fuel tank disposition structure of FIG. 16.
Figure 18:
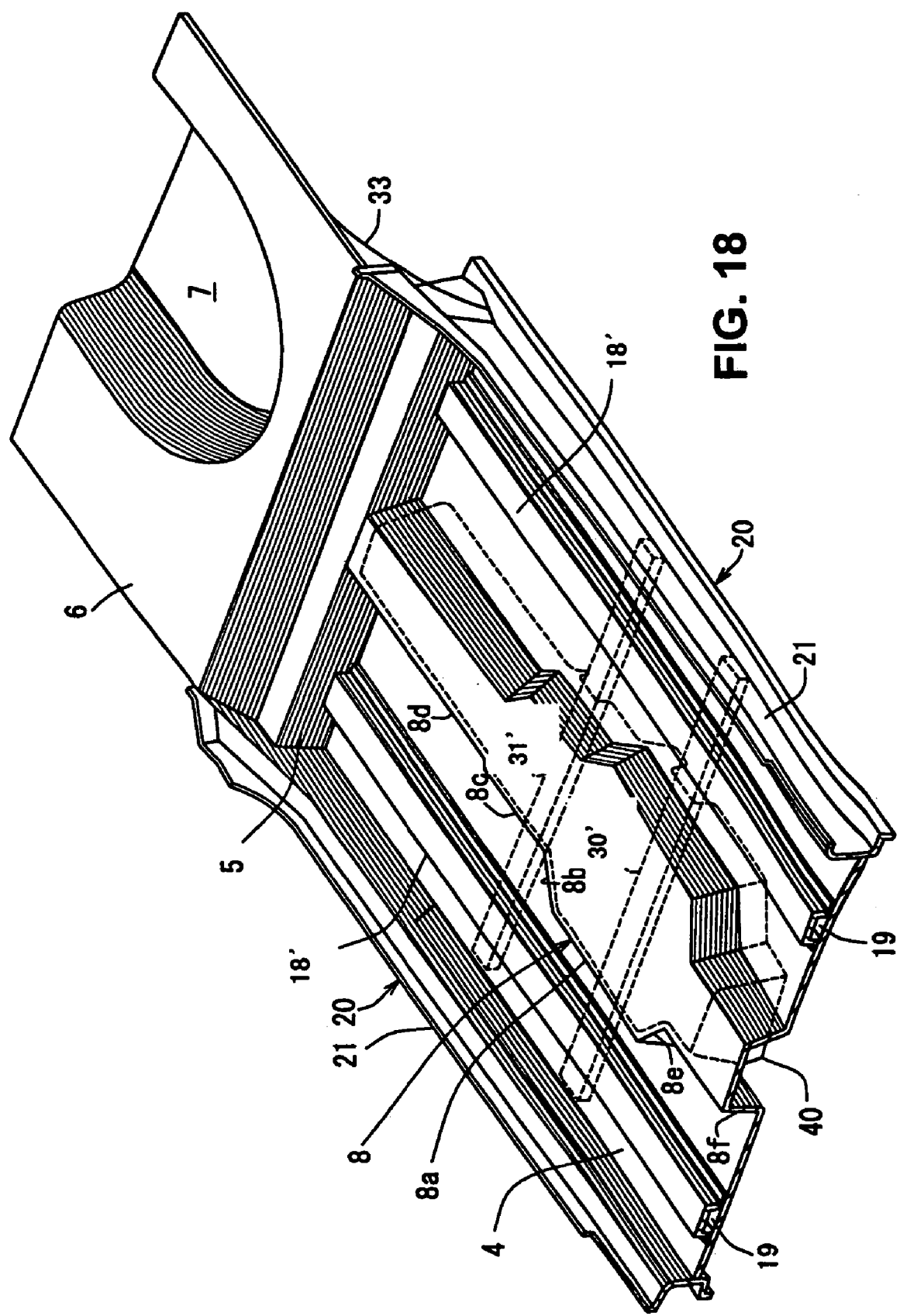
FIG. 18 is a perspective view of a major portion of FIG. 16.
Figure 19:
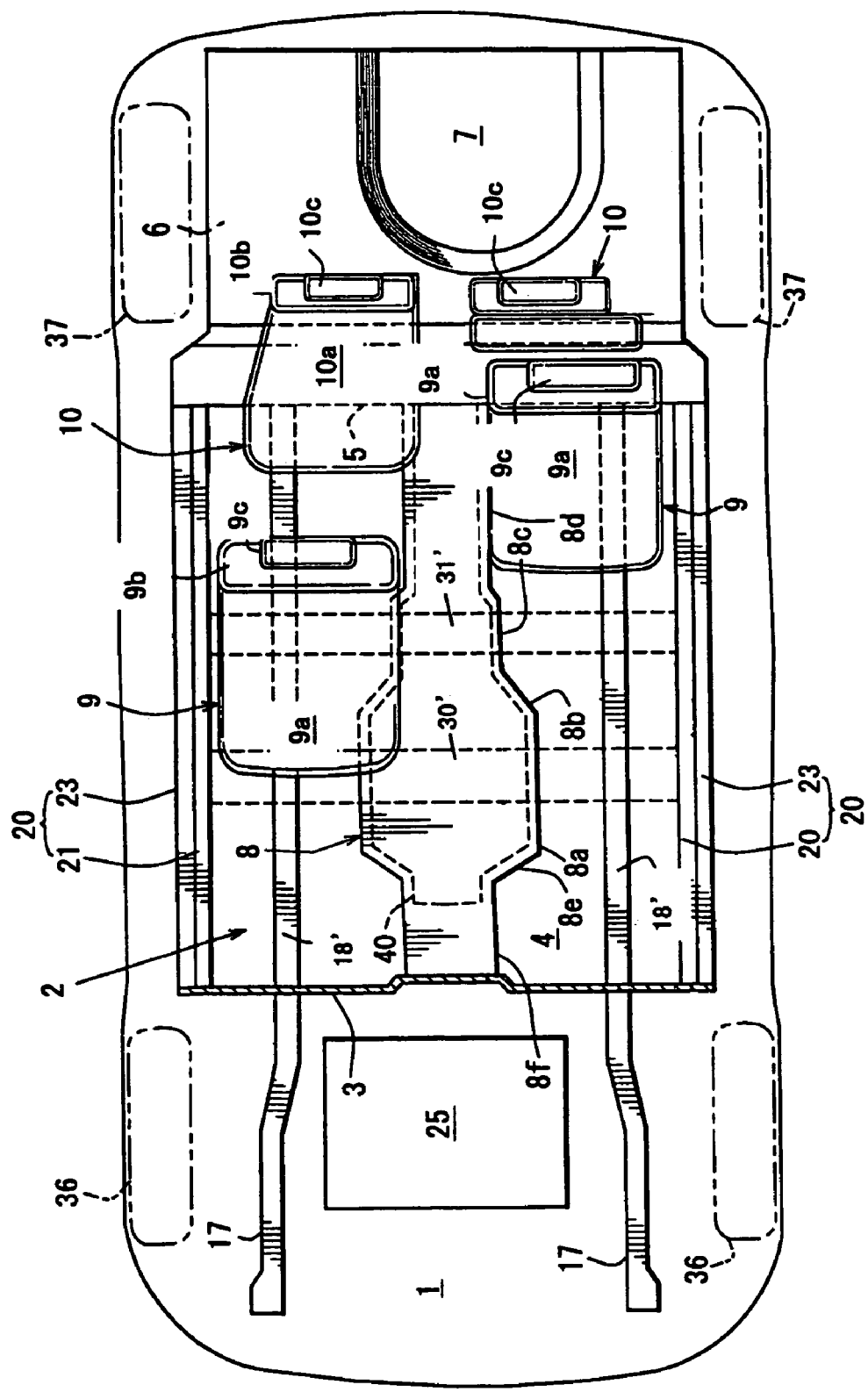
FIG. 19 is a plan view illustrating a seat arrangement of the assistant seat.
Figure 20:
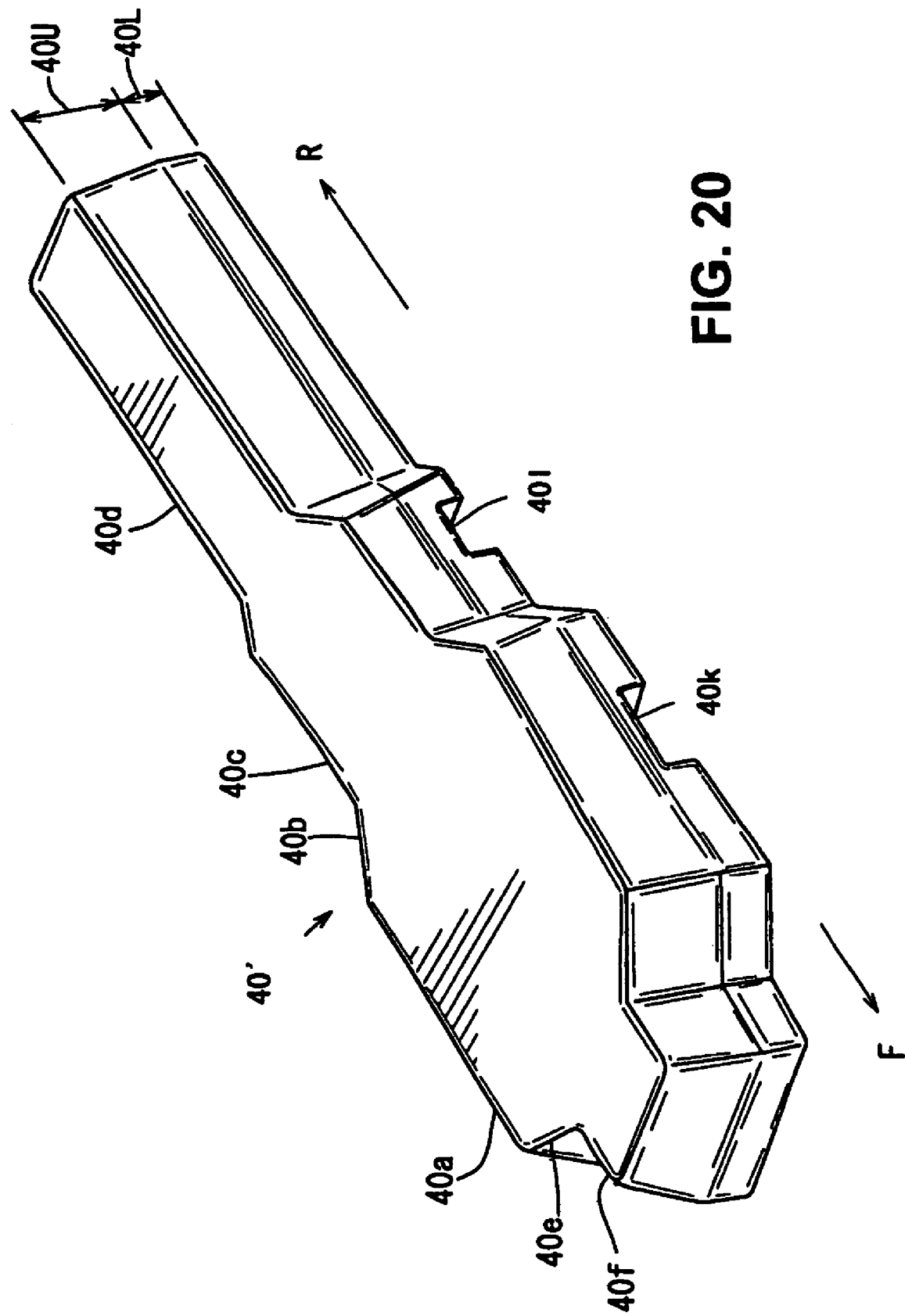
FIG. 20 is a perspective view of the fuel tank of FIG. 16.
Figure 21:
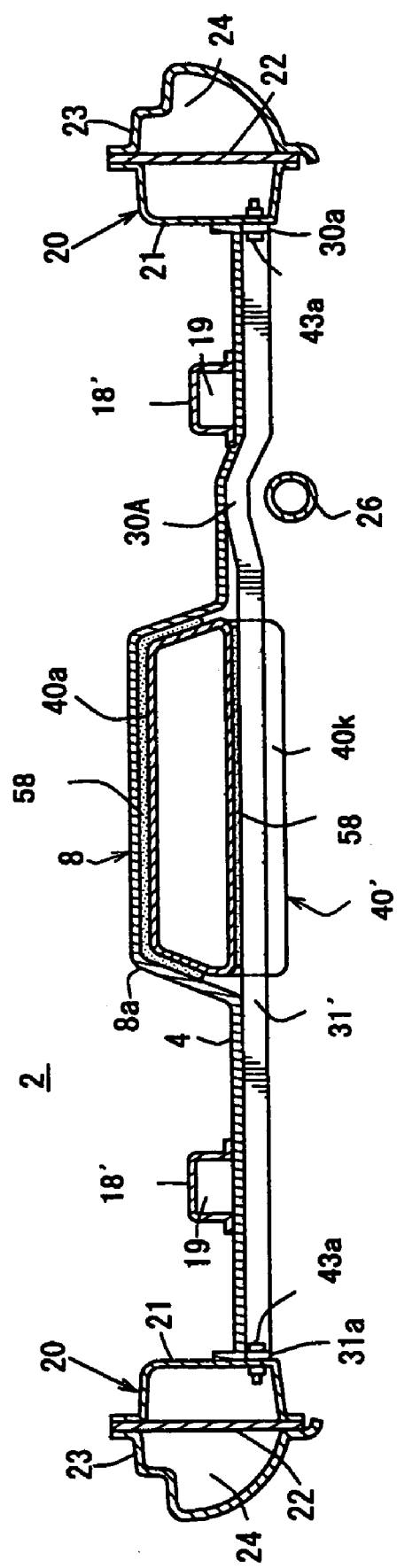
FIG. 21 is a sectional view taken along line A—A of FIG. 16.
Figure 22:
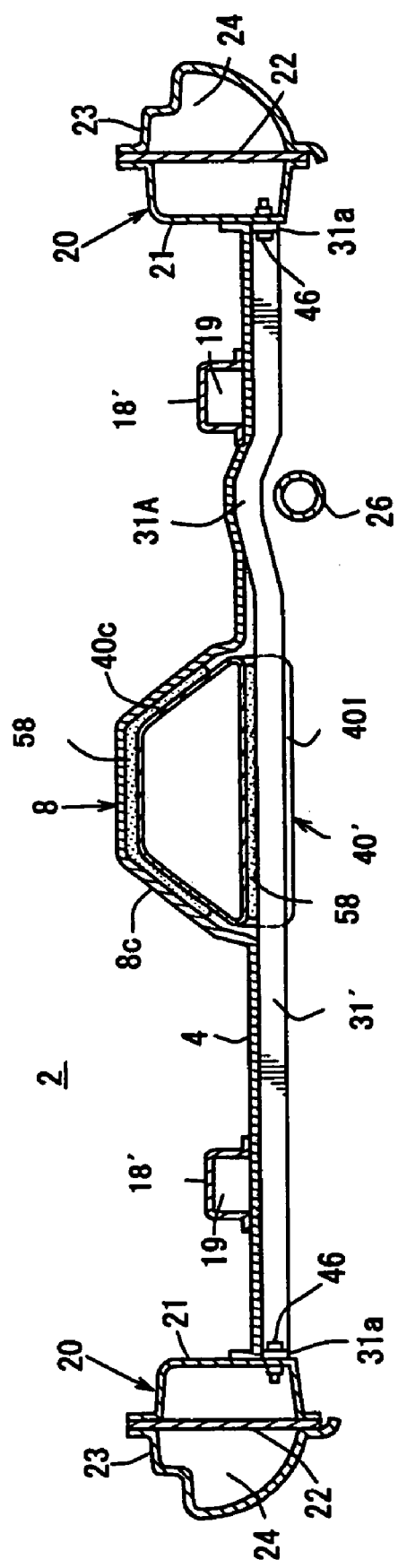
FIG. 22 is a sectional view taken along line B—B of FIG. 16.
Figure 23:
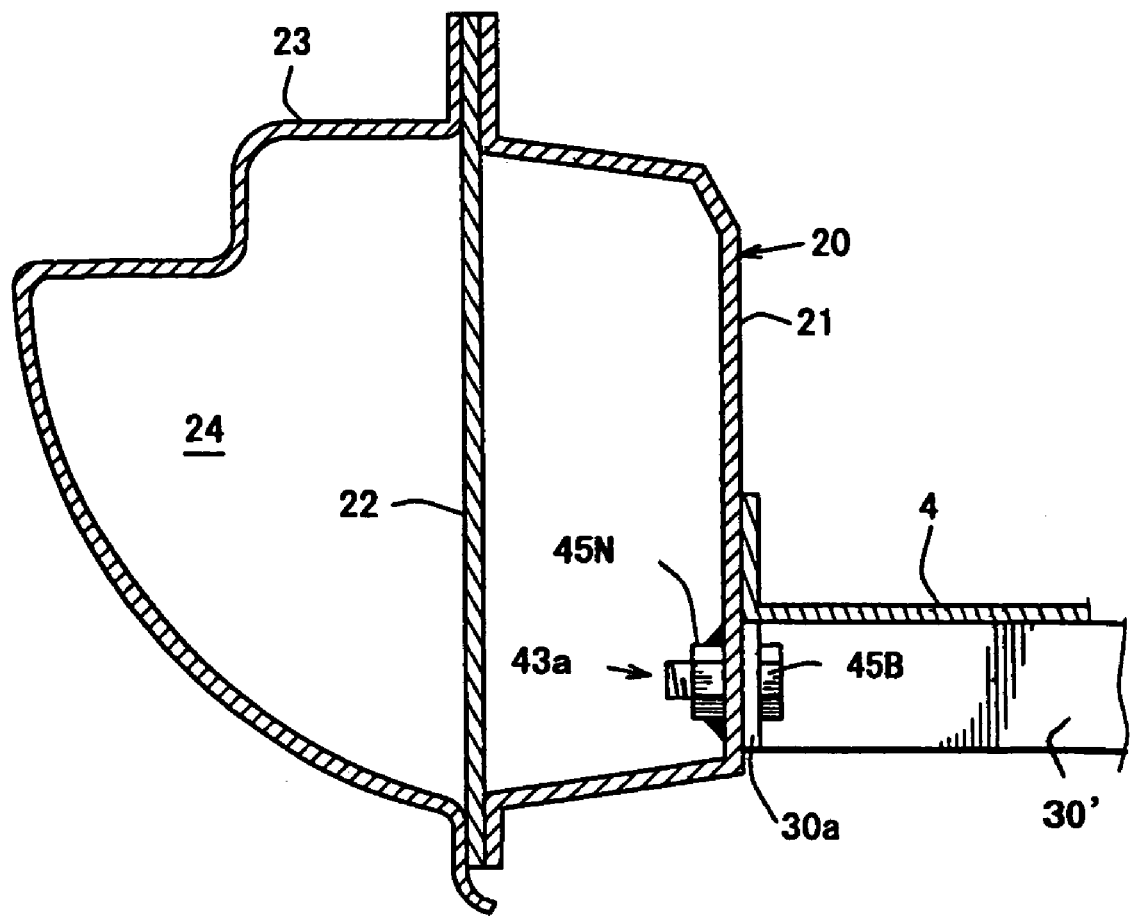
FIG. 23 is an enlarged view of FIG. 21.
Figure 24:
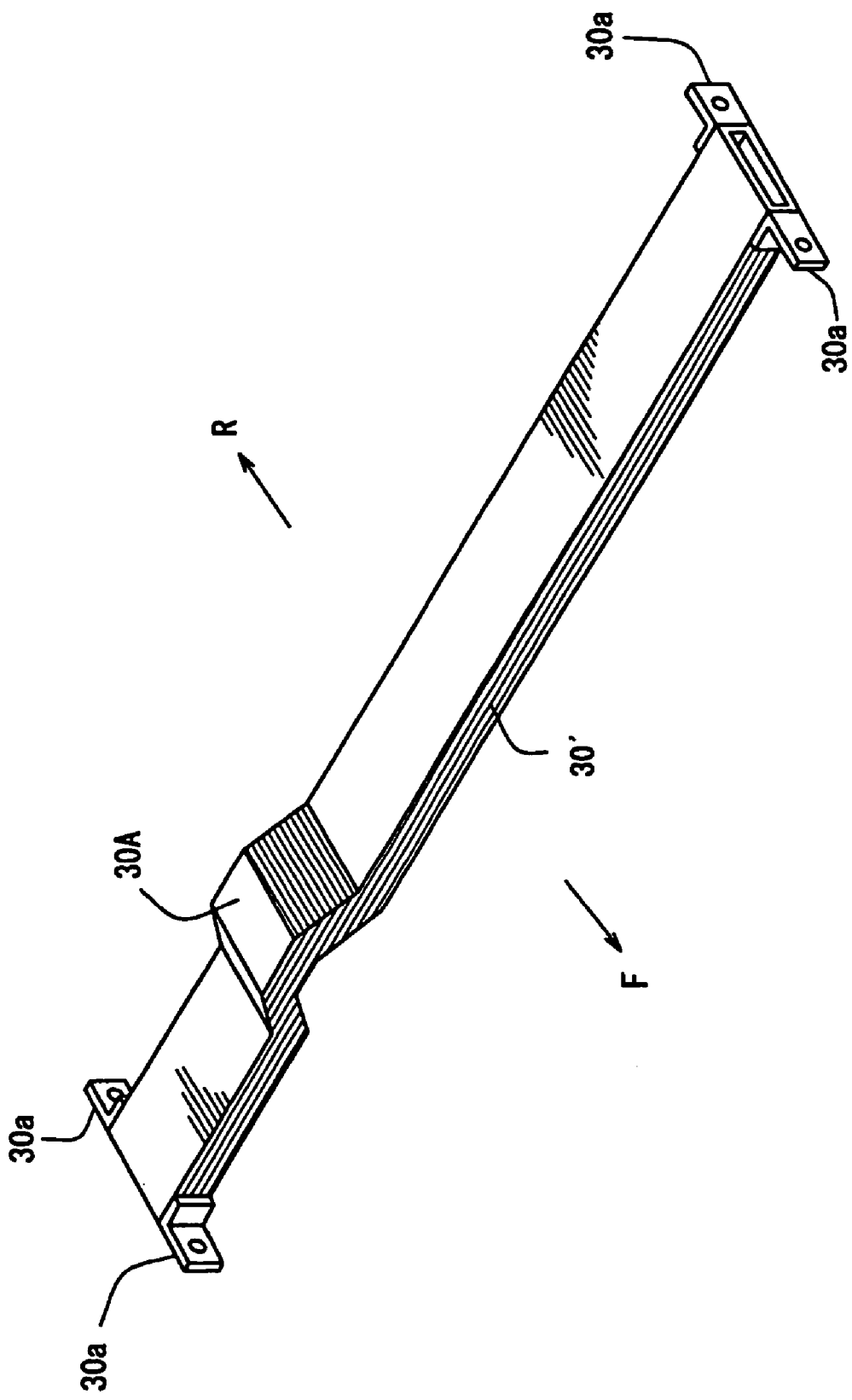
FIG. 24 is a perspective view illustrating the lower tunnel member.
Figure 25:
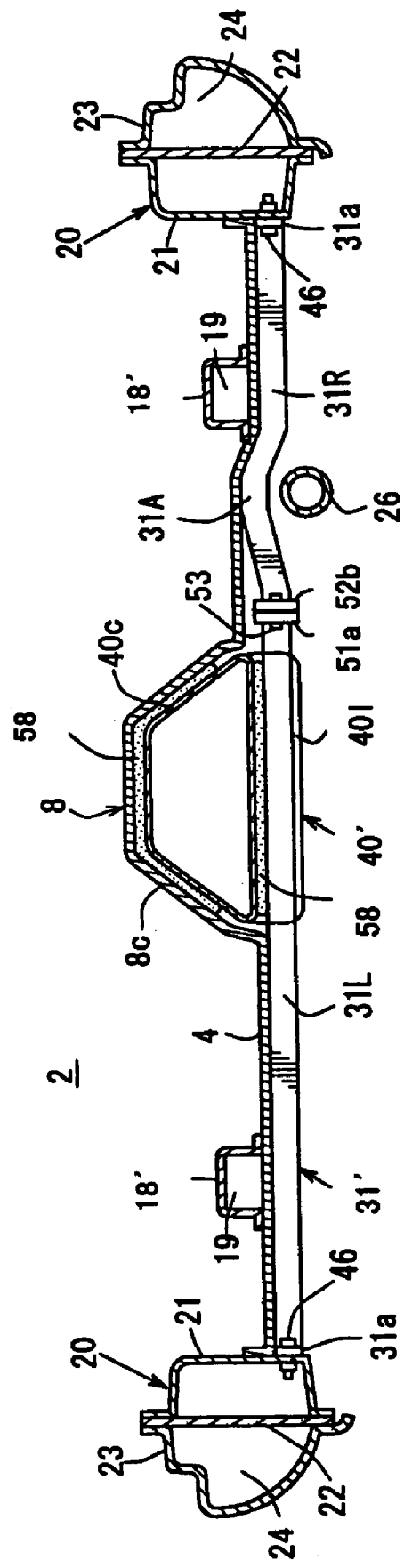
FIG. 25 is a sectional view illustrating another modified fuel tank disposition structure.

FIG. 16 is a plan view illustrating a fuel tank disposition structure according to this another embodiment of the present invention. FIG. 17 is a side view illustrating the fuel tank disposition structure of FIG. 16. FIG. 18 is a perspective view of a major portion of FIG. 16. FIG. 19 is a plan view illustrating a seat arrangement of the assistant seat. FIG. 20 is a perspective view of the fuel tank of FIG. 16. FIG. 21 is a sectional view taken along line A—A of FIG. 16. FIG. 22 is a sectional view taken along line B—B of FIG. 16. FIG. 23 is an enlarged view of FIG. 21. FIG. 24 is a perspective view illustrating the lower tunnel member. FIG. 25 is a sectional view illustrating another modified fuel tank disposition structure.

Herein, as illustrated in FIG. 18, floor frames 18', 18' are the vehicle-rigidity member which extend straightly in the longitudinal direction along the upper face of the floor panel 4, and the closed cross section 19 extending in the same direction is formed between the floor frame 18' and the floor panel 4 as well.

The floor frames 18', 18' are provided so as to extend in the longitudinal direction along the upper face of the floor panel 4 between the side sills 20, 20 and the tunnel portion 8 as illustrated in FIG. 16. The exhaust pipe 26 as the exhaust passage to exhaust the gas from the engine 25 rearward is provided below the floor panel 4 and at a location corresponding to a portion between the floor frame 18' and tunnel portion 8.

As illustrated in FIGS. 16, 17 and 18, below the floor panel 4 is provided a cross member 30' (so-called No. 2 cross member) as the vehicle-body rigidity member which extends in the vehicle width direction across the tunnel portion 8 to the side sill inners 21, 21 of the side sills 20, 20 so as to correspond to the wide portion 8a of the tunnel portion 8.

Further, a fuel tank 40' of the present embodiment includes recess portion 40k and 40l which are formed respectively at its bottom corresponding to the wide portion 40a and narrow portion 40c so as to extend in the vehicle width direction as illustrated in FIG. 20. The recess portion 40k is for a disposition of the above-described cross member 30' with the closed cross section and the recess portion 40l is for a disposition of another cross member 31' which is disposed separately from the cross member 30'.

Next, the support structure of the fuel tank 40' will be described referring to FIGS. 21 through 24. Connecting pieces 30a, 30a are integrated or formed integrally with the both ends of the cross member 30' (so-called No. 2 cross member) with the closed cross section and extending in the vehicle width direction. Each of these connecting pieces 30a, 30a is detachably connected with the side sill inner 21 of the side sill 20 via an attaching member 43a such as a bolt and nut.

In the present embodiment, as illustrated in FIG. 23, a nut 45N is previously welded to the side sill inner 21 at the inside of the closed cross section 24, and the cross member 30' is detachably connected with the side sill 20 by fastening a bolt 45B to the nut 45N.

The above-described cross member 30' is disposed such that its center portion is located at the front recess portion 40k of the fuel tank 40', and it extends straightly in the vehicle width direction as illustrated in FIGS. 16, 18 and 19 and its both end portions are detachably connected with the side sill inner 21 as described above.

Also, the cross member 30' includes a recess portion 30A to avoid an interference with the exhaust pipe 26 at its middle portion corresponding to the exhaust pipe 26. In the present embodiment, the recess portion 30A is formed so as to project toward the floor panel 4.

Although the cross member 30' is detachably connected with the side sill inners 21 of the side sills 20 via the both end portions, it is not connected with the floor panel 4.

As illustrated in FIG. 22, connecting pieces 31a, 31a are integrated or formed integrally with both ends of the cross member 31' (so-called 2.5 cross member) with a closed cross section which is located behind the above-descried cross member 30' (so-called No. 2 cross member) with the closed cross section. Each of these connecting pieces 31a, 31a is detachably connected with the side sill inner 21 of the side sill 20 via an attaching member 46 such as the bolt and nut. A specific structure of the attaching member 46 is configured to be similar to the structure illustrated in FIG. 23.

The above-described cross member 31' is disposed such that its center portion is located at the front recess portion 40l of the fuel tank 40', and it extends straightly in the vehicle width direction as illustrated in FIGS. 16, 18 and 19 and its both end portions are detachably connected with the side sill inner 21 as described above.

Also, the cross member 31' includes a recess portion 30A to avoid an interference with the exhaust pipe 26 at its middle portion corresponding to the exhaust pipe 26. In the present embodiment, the recess portion 31A is formed so as to project toward the floor panel 4.

Although the cross member 31' is detachably connected with the side sill inners 21 of the side sills 20 via the both end portions, it is not connected with the floor panel 4.

Namely, the fuel tank 40' is supported by the plural cross members 30' and 31' which are located separately from each other in the longitudinal direction, and these cross members 30' and 31' are disposed so as to extend straightly in the vehicle width direction. Also, as illustrated in FIGS. 21 and 22, the seal member 58 which is made of the heat-resistant fiber material is disposed between the upper portion of the fuel tank 40' and the tunnel portion 8 and between the recess portions 40k and 40l of the fuel tank 40' and the cross members 30' and 31'. Herein, the cross members 30' and 31' are attached and connected to the vehicle body, or the side sills 20, 20, in a state where the fuel tank 40' is placed on the cross members 30' and 31'.

A cross member structure illustrated in FIG. 25 may be used instead of the structure of FIG. 22. Namely, the cross member 31' is comprised of two split members 31L and 31R, and connecting flanges 51a and 51b are integrated or formed integrally with respective facing portions of these cross members 31L and 31R. These connecting flanges 51a and 51b are detachably connected by an attaching member 53 such as a blot and nut, so that the cross member 31' can be detachably connected with the side sills 20, 20 properly. The same structure may be applied to the cross member 30' as well.

Herein, reference numeral 54d in FIG. 17 denotes a dash cross member.

According to this another embodiment described above, the fuel tank disposition structure further comprises the cross member 30' which is provided below the floor panel 4 so as to extend in the vehicle width direction crossing the tunnel portion 8, and the fuel tank 40' is supported by the cross member 30'.

According to this structure, since the cross member 30' is provided below the floor panel 4, the floor panel 4 can be lowered and the roomy cabin can be obtained thereby. Specifically, since the cross member 30' is provided below the floor panel 4, the floor frame 18 is provided on the floor panel 4, and the front side frame 17 and the floor frame 18 are disposed so as to extend continuously in the longitudinal direction of the vehicle, the floor panel 4 can be lowered. Further, since the fuel tank 40' is directly supported by the cross member 30', the number of parts for supporting the tank can be reduced and the vehicle-body rigidity and tank-support rigidity can be ensured with a simple structure. Also, since the cross member 30' extends straightly in the vehicle width direction across the tunnel portion 8, the high vehicle-body rigidity can be ensured.

Also, there are provided side sills 20, 20 which extend in the longitudinal direction of the vehicle at both end portions of the floor panel 4, and both end portions of the cross member 30' are connected with the side sills 20, 20. According to this structure, since the side sills 20 bear the support rigidity of the fuel tank 40', the tank-support rigidity can be improved further and becomes advantageous against the vehicle side crash as well.

Further, a plurality of the cross members 30' and 31' are disposed separately from each other in the longitudinal direction of the vehicle, and the fuel tank 40' is supported by these cross members 30' and 31' located separately from each other in the longitudinal direction. According to this structure, even if the fuel tank 40' is relatively long in the longitudinal direction of the vehicle, the fuel tank 40' can be directly supported by the plural cross members 30 and 31, and thus this support can be made stable.

Further, the tunnel portion 8 includes the relatively wide front portion (see the wide portion 8a) and the relatively narrow rear portion (see the narrow portion 8c), and the fuel tank 40' has the contour which corresponds to the shape of the tunnel portion 8 in the vehicle width direction. According to this structure, by the proper shape of the fuel tank 40' and tunnel portion 8, the sufficient volume of the fuel tank 40' can be ensured, making the height of the fuel tank as lower as possible, and also the roomy cabin 2 in the vertical direction can be obtained. Namely, both the sufficient volume of the fuel tank and the roomy cabin can be ensured. Further, since an upward projection of the tunnel portion 8 can be restrained by the proper shape of the tunnel portion 8 and fuel tank 40', a walk-through arrangement in the vehicle width direction can be facilitated.

Additionally, the cross member 30' is provided at least so as to correspond to the relatively wide front portion (see the wide portion 8a) of the tunnel portion 8. According to this structure, since the cross member 30' is provided properly at the wide portion, the vehicle-body rigidity against the side crash can be improved and thus the safety can be ensured.

Also, the cross member 31' is provided so as to correspond to the relatively narrow rear portion (see the narrow portion 8c) of the tunnel portion 8. According to this structure, the vehicle-body rigidity against the vehicle side crash and the support rigidity of the fuel tank can be improved.

Further, there is provided the exhaust pipe 26 which extends in the longitudinal direction of the vehicle beside the fuel tank 40', and the cross members 30' and 31' include recess portions 30A and 31A to avoid the interference with the exhaust pipe 26 at respective middle portions thereof in the vehicle width direction. According to this structure, since the recess portions 30A and 31A avoid the interference with the exhaust pipe 26, the disposition of the cross members 30' and 31' and the disposition of the exhaust pipe 26 can be attained.

Also, the fuel tank 40' includes the recess portions 40k and 40l which extend in the vehicle width direction at the cross-member disposition portion of the bottom thereof, and the cross members 30' and 31' are disposed at the recess portions 40k and 40l so as to extend straightly in the vehicle width direction. According to this structure, since the cross members 30' and 31' are disposed so as to extend straightly, the vehicle-body rigidity can be further improved and the resistance to the vehicle side crash can be increased. Also, since the rigidity of the fuel tank 40' itself is increased by the recess portions 40k and 40l, the tank rigidity can be improved.

Further, the both end portions of the cross members 30' and 31' are detachably connected with the side sills 20. According to this structure, the maintenance of the fuel tank 40' can be improved.

Herein, by connecting the floor frame with the tunnel portion, the rigidity of the tunnel portion can be ensured. Also, by attaching the support portion of fuel tank to the connecting portion of the floor frame with the tunnel portion, the support rigidity of the fuel tank can be ensured. Hereinafter, further another embodiment with such a structure will be described referring to FIGS. 26 through 34. The same components/structures are denoted in these figures by the same reference characters as those in the previous embodiments, and their detailed descriptions will be omitted.

Figure 26:
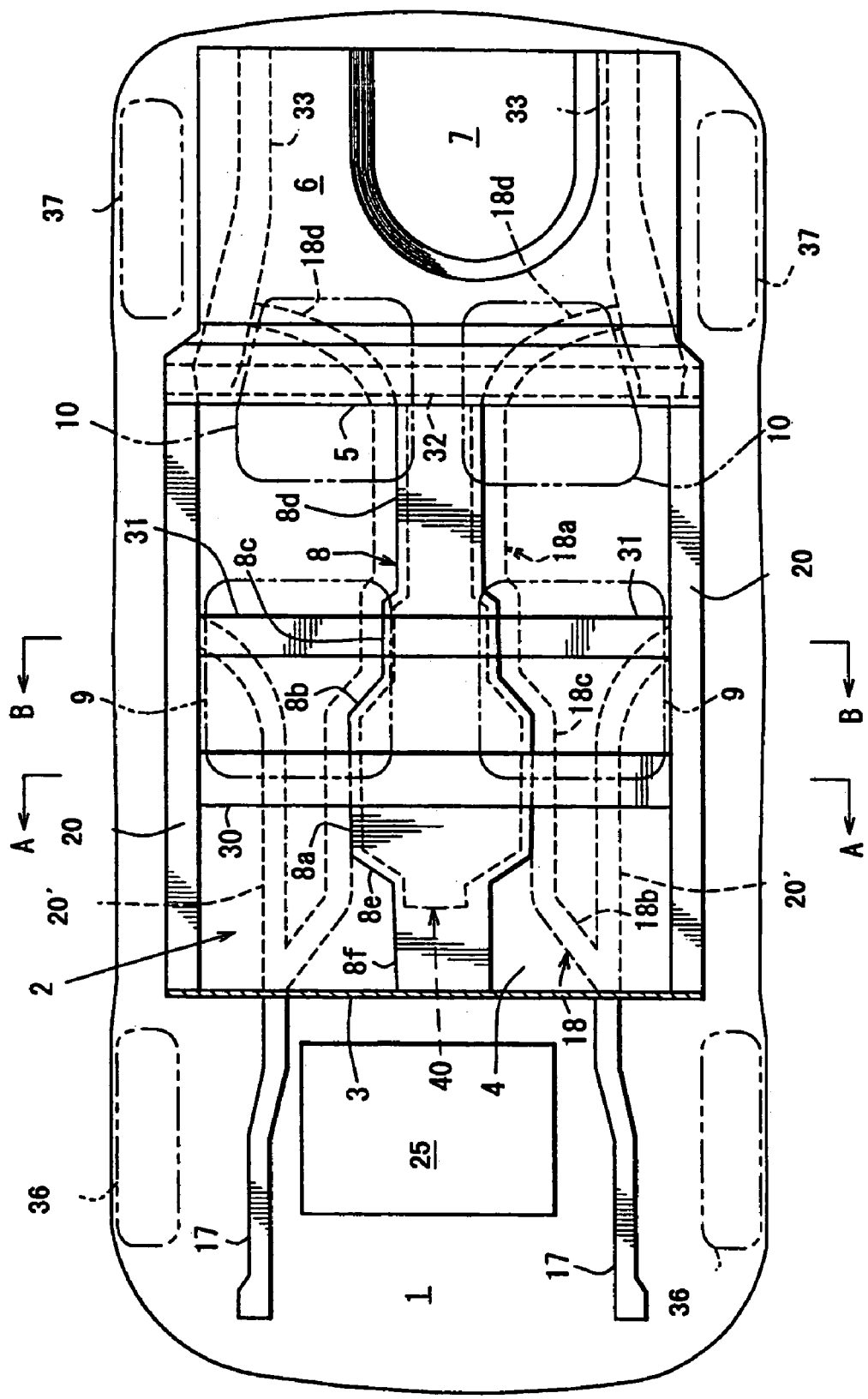
FIG. 26 is a plan view illustrating a fuel tank disposition structure according to further another embodiment of the present invention.
Figure 27:
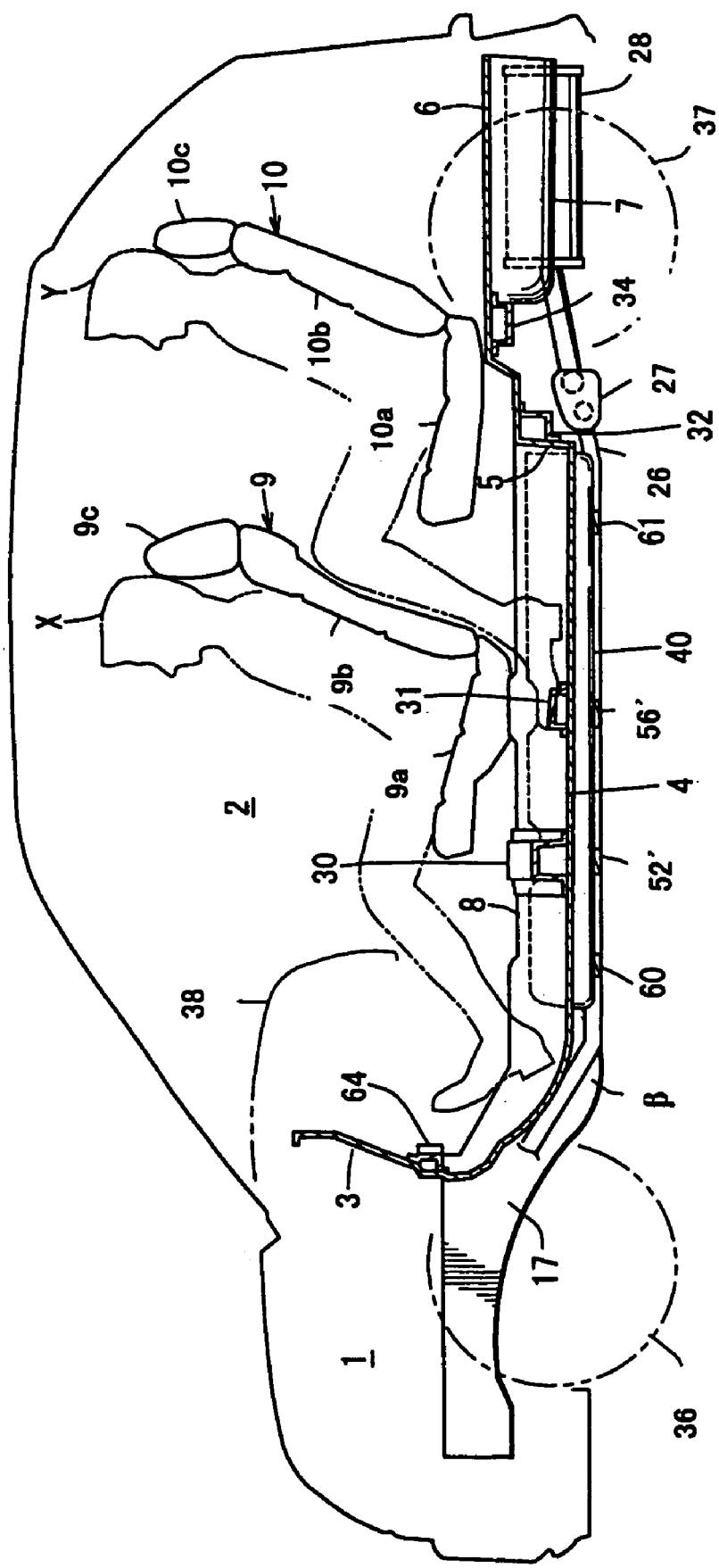
FIG. 27 is a side view illustrating the fuel tank disposition structure of FIG. 26.
Figure 28:
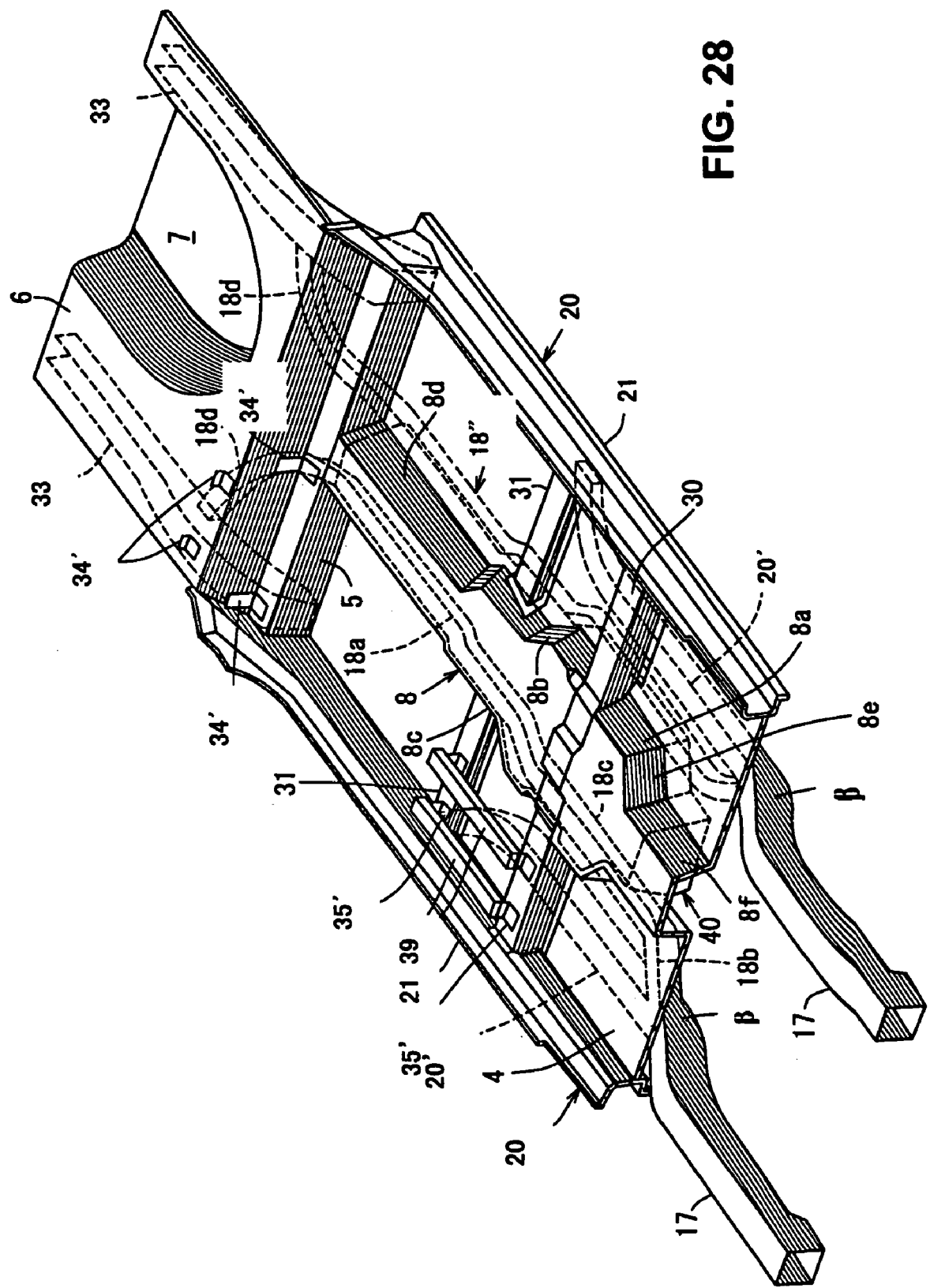
FIG. 28 is a perspective view of a major portion of FIG. 26.
Figure 29:
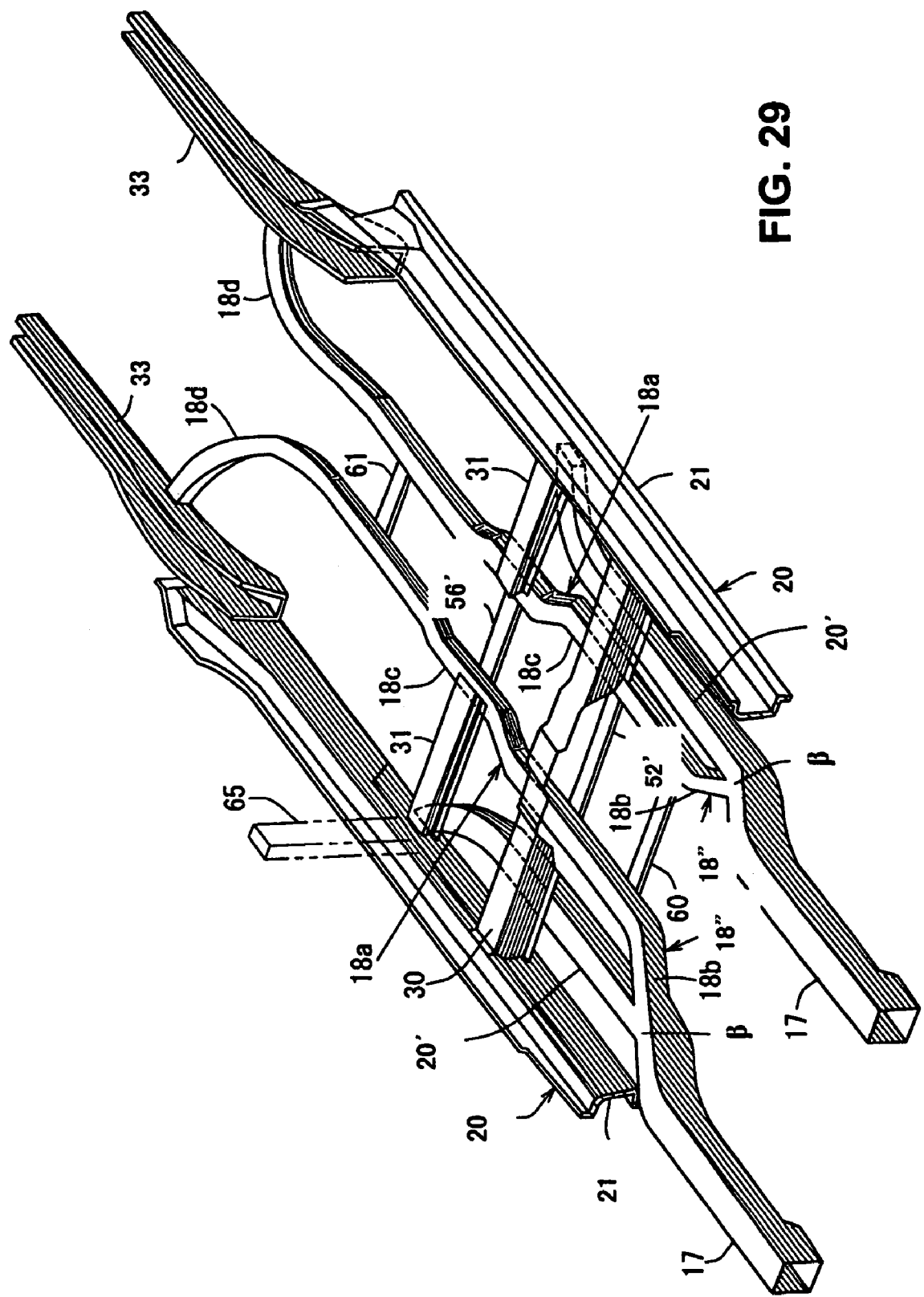
FIG. 29 is a perspective view illustrating a vehicle body structure, omitting a floor panel, tunnel portion and rear floor panel.
Figure 30:
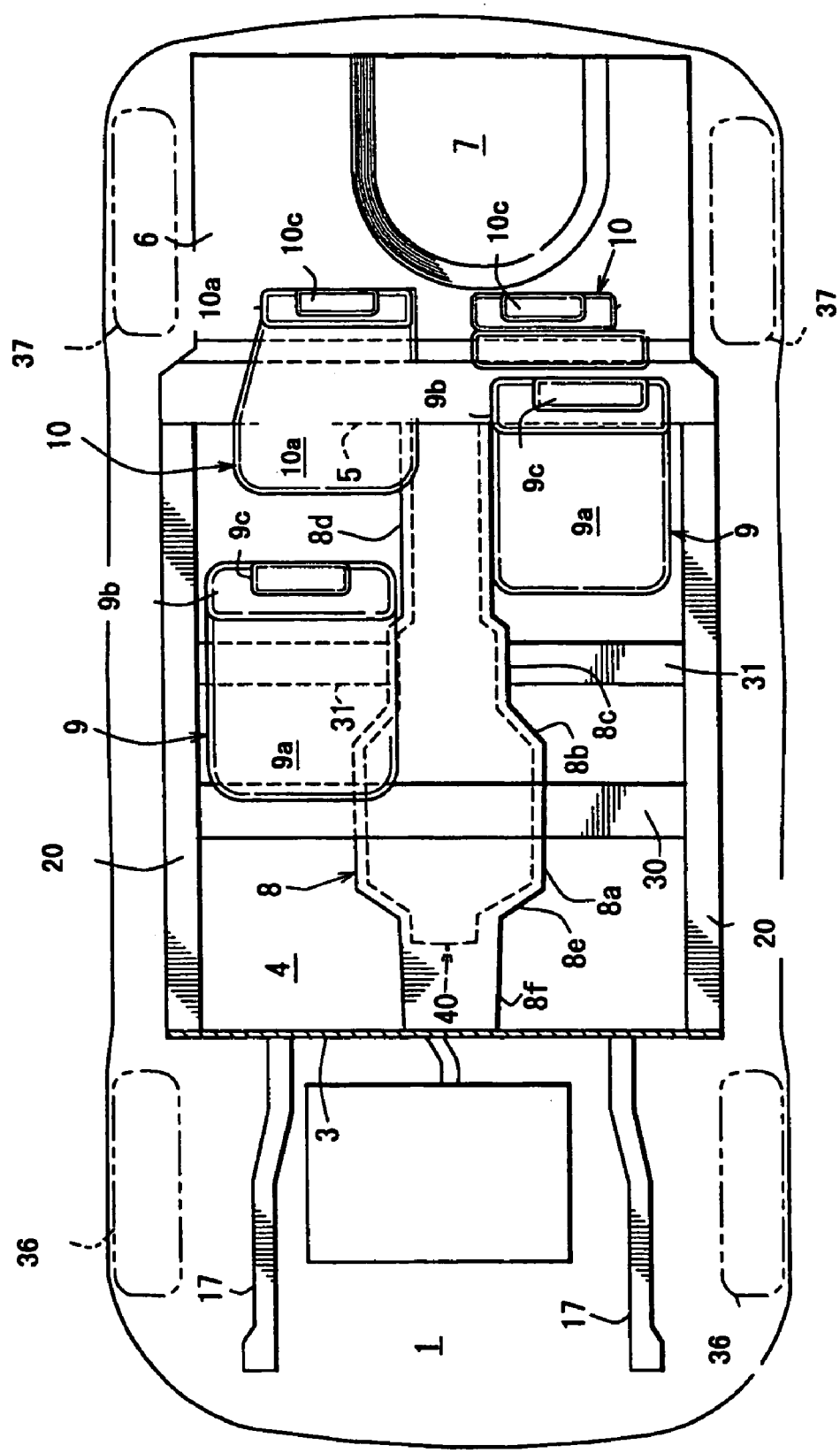
FIG. 30 is a plan view illustrating the seat arrangement of the assistant seat.
Figure 31:
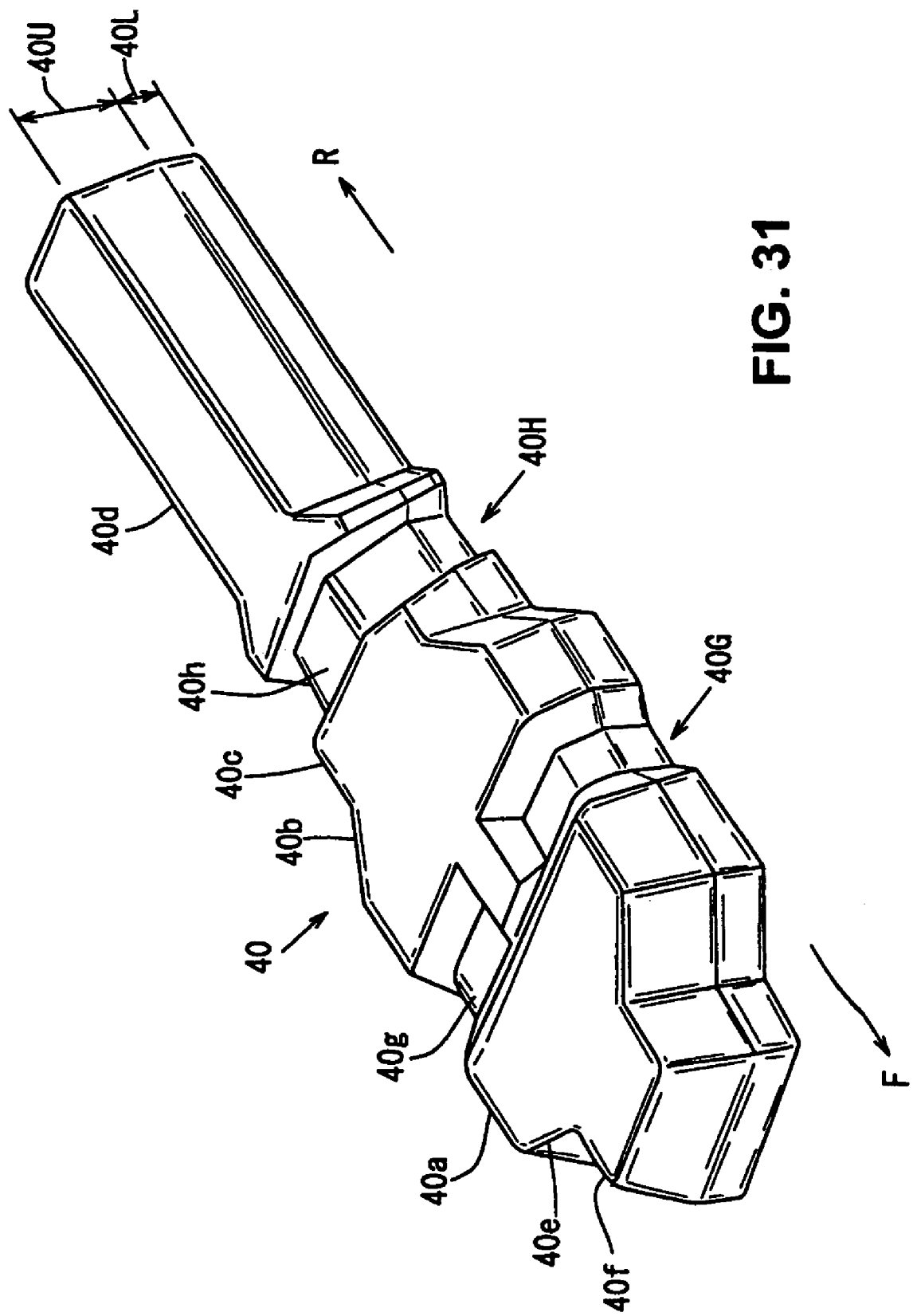
FIG. 31 is a perspective view of the fuel tank of FIG. 26.
Figure 32:
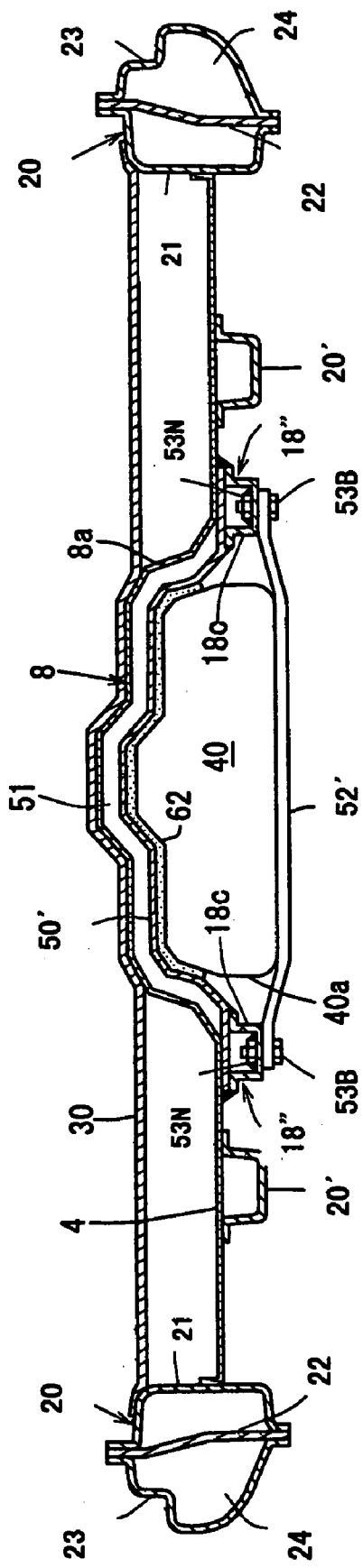
FIG. 32 is a sectional view taken along line A—A of FIG. 26.
Figure 33:
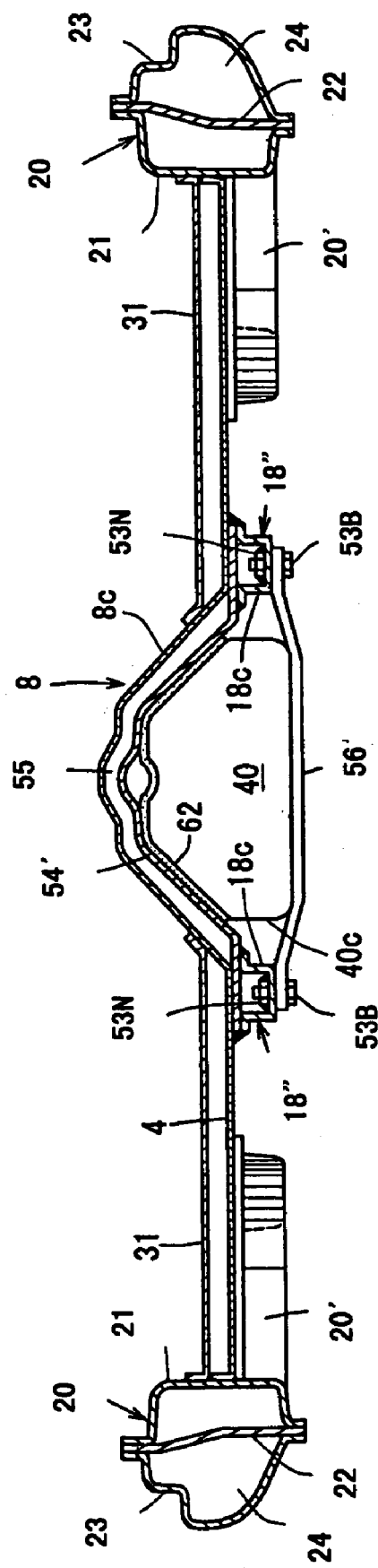
FIG. 33 is a sectional view taken along line B—B of FIG. 26.
Figure 34:
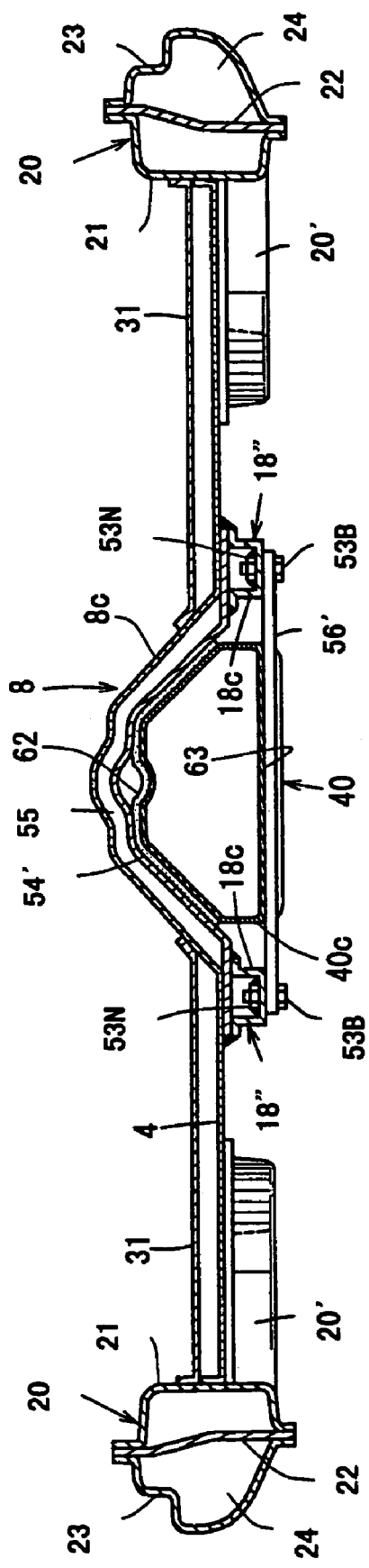
FIG. 34 is a sectional view illustrating a modified fuel tank disposition structure.

FIG. 26 is a plan view illustrating a fuel tank disposition structure according to this another embodiment. FIG. 27 is a side view illustrating the fuel tank disposition structure of FIG. 26. FIG. 28 is a perspective view of a major portion of FIG. 26. FIG. 29 is a perspective view illustrating a vehicle body structure, omitting a floor panel, tunnel portion and rear floor panel. FIG. 30 is a plan view illustrating the seat arrangement of an assistant seat. FIG. 31 is a perspective view of a fuel tank of FIG. 26. FIG. 32 is a sectional view taken along line A—A of FIG. 26. FIG. 33 is a sectional view taken along line B—B of FIG. 26. FIG. 34 is a sectional view illustrating further another modified fuel tank disposition structure.

A pair of right and left floor frames 18", 18" are formed substantially symmetrically. Namely, each of the floor frames 18", 18" is configured so as to have a connecting portion 18a which is connected with an open-side lower face of the tunnel portion 8 as illustrated in FIGS. 26, 28 and 29. More specifically, the floor frame 18" includes an offset portion 18b which extends inward and rearward from a rear end of the front side frame 17 with an offset disposition, an extended portion 18c which is provided so as to extend in the longitudinal direction of the vehicle from a rear end of the offset portion 18b along the side portion of the wide portion 8a, slant portion 8b, narrow portion 8c and slim portion 8d of the tunnel portion 8 (the extended portion 18c substantially corresponds to the connecting portion 18a), and an extension portion 18d which extends upward and outward from a rear end of the extended portion 18c and leads to the rear side frame 33.

The floor frame 18" extends substantially in the longitudinal direction of the vehicle along the side portion of the tunnel portion 8 below the lower face of the floor panel 4, and the above-described extension portion 18d is fixed to the rear side frame 33. There is further provided a branch frame 20' which branches off from a connecting portion β of the rear end of the front side frame 17 with the front end of the floor frame 18". This branch frame 20' is provided so as to extend straightly in the longitudinal direction of the vehicle along with the front side frame 17 as illustrated in FIG. 26, and its extended rear portion is curved outward and connected with the side sill 20 (specifically, the side sill inner 21 as illustrated in FIGS. 7 and 8) at a portion which corresponds to the cross member 31.

As illustrated in FIGS. 28 and 30, the rear seat 10 as the seat for the rear seat passenger Y is provided above the floor panel 4 and rear floor panel 6, and the rear seat 10 is attached to a portion which corresponds to the extension portion 18d of the floor frame 18". Namely, two seat brackets 34', 34' are attached to panel portions which correspond to the extension portion 18d of the floor frame 18" in the vertical direction, while two seat brackets 34', 34' are attached to panel portions which correspond to the rear side frame 33 in the vertical direction. The rear seat 10 is attached to these seat brackets 34'.

Meanwhile, the front seat 9 is, as illustrated in FIGS. 28 and 30, attached to the cross members 30 and 31 with the closed cross section which are provided separately longitudinally via seat brackets 35' and seat slides 39.

Herein, the fuel tank 40, which has the contour which corresponds to the shape of the tunnel portion 8 in the vehicle width direction, is disposed in the tunnel portion 8 below the floor panel 4 as illustrated in FIG. 31.

Next, a disposition structure of the fuel tank 40 will be described referring to FIGS. 29, 31, 32 and 33. The fuel tank 40 includes the recess portions 40g and 40h which are formed respectively corresponding to the wide portion 40a and narrow portion 40c (see FIG. 31). Also, there is provided a tunnel member inner 50' with a substantially reverse U-shaped section below the lower face of the wide portion 8a of the tunnel portion 8 corresponding to the recess portion 40g as illustrated in FIGS. 32. This tunnel member inner 50' is a reinforcement member to interconnects both portions at the lower open side of the tunnel portion 8 in the vehicle width direction corresponding to the cross member 30 above the fuel tank 40. And, between the tunnel portion 8 and the tunnel member inner 50' is formed the closed section 51 which extends in the vehicle width direction.

Both lower end portions of the tunnel member inner 50' are connected with the floor panel 4 at the side portion of the tunnel portion 8. The above-described extended portion 18c of the floor frame 18" is connected with the lower portions of the floor panel 4 and tunnel member inner 50'.

And, a front-side support portion 40G of the fuel tank 40 (see FIG. 31) is detachably supported at the extended portion 18c of the floor frame 18" via a lower tunnel member 52' which interconnects both portions at the lower open side of the tunnel portion 8 in the vehicle width direction corresponding to the cross member 30.

In the present embodiment, the both ends of the lower tunnel member 52' are detachably connected with the extended portions 18c, 18c of the floor frames 18", 18" via nuts 53N, which are welded inside the closed cross section of the floor frame 18", and bolts 53B which are inserted from below and fastened to the nuts 53N.

Further, as illustrated in FIG. 33, there is provided a tunnel member inner 54' with a substantially reverse V-shaped section below the lower face of the narrow portion 8c of the tunnel portion 8 corresponding to the recess portion 40h of the fuel tank 40. This tunnel member inner 54' is a member to interconnects both portions at the lower open side of the tunnel portion 8 in the vehicle width direction corresponding to the cross member 31 above the fuel tank 40. And, between the tunnel portion 8 and the tunnel member inner 54' is formed a closed section 55 which extends in the vehicle width direction.

The both lower end portions of the tunnel member inner 54' are also connected with the floor panel 4 at the side portion of the tunnel portion 8, and the above-described extended portion 18c of the floor frame 18" is connected with the lower portions of the floor panel 4 and tunnel member inner 54'.

And, a rear-side support portion 40H of the fuel tank 40 (see FIG. 31) is detachably supported at the extended portion 18c of the floor frame 18" via a lower tunnel member 56' which interconnects both portions at the lower open side of the tunnel portion 8 in the vehicle width direction corresponding to the cross member 31.

In the present embodiment, the both ends of the lower tunnel member 56' are detachably connected with the extended portions 18c, 18c of the floor frames 18", 18" via nuts 53N, which are welded inside the closed cross section of the floor frame 18", and bolts 53B which are inserted from below and fastened to the nuts 53N.

Namely, the extended portion 18c of the floor frame 18" is connected at least over the front portion (see the wide portion 8a) and the rear portion (see the rear portion 8c) of the tunnel portion 8. And, there are provided the plural support portions 40G and 40H of the fuel tank 40 which are located separately in the longitudinal direction of the vehicle as illustrated in FIG. 31, and these support portions 40G and 40H are detachably supported at the extended portion 18c of the floor frame 18" as the vehicle body via the respective lower tunnel members 52' and 56'.

Herein, since the fuel tank 40 is formed so as to extend in the longitudinal direction, having the contour which corresponds to the shape of the tunnel portion 8 in the present embodiment, there are further provided lower tunnel members 60 and 61 respectively in front of and behind the above-described lower tunnel members 52' and 56' as illustrated in FIGS. 27 and 29. These lower tunnel members 60 and 61 are detachably connected with the extended portion 18c of the floor frame 18" via an attaching member such as a bolt and nut, and thus the lower faces of the slim portions 40f and 40d of the fuel tank 40 are supported at the lower tunnel members 60 and 61.

As illustrated in FIGS. 32 and 33, a seal member 62 which is made of the heat-resistant fiber material is disposed between the upper face portion of the fuel tank 40 and the lower faces of the tunnel portion 8 and the tunnel member inners 50' and 54'.

Herein, a structure illustrated in FIG. 34 may be used instead of the bottom structure of the fuel tank 40 of FIGS. 32 and 33. Namely, recess portions 63, 63 (only one of them is illustrated in FIG. 34) are formed at portions corresponding to the lower tunnel members 52' and 56' of the fuel tank 40, and these recess portions 63, 63 are supported by the lower tunnel members 52' and 56'. And, the lower tunnel members 52' and 56' is configured so as not to project downward from the lower deck of the fuel tank 40, so that the manufacturing of the lower tunnel members 52' and 56' can be facilitated and the rigidity of the fuel tank 40 itself can be increased. Namely, providing the recess portion 63 can form recessed ribs extending the vehicle width direction at the recess portion 63, thereby increasing the tank rigidity.

Herein, reference numeral 64 denotes a dash cross member in FIG. 27, and reference numeral 65 denotes a center pillar which is attached to the side sill 20 at a portion corresponding to the cross member 31 (so-called No. 2.5 cross member) in FIG. 29.

As described above, according to the present embodiment, there is provided the floor flame 18" which extends in the longitudinal direction of the vehicle at the floor panel 4, the floor frame 18" includes the connecting portion 18a which is connected with the tunnel portion 8, and the support portion 40G of the fuel tank 40 is attached to the connecting portion 18a of the floor frame 18".

According to this structure, since the floor frame 18" extending in the longitudinal direction as the vehicle-body rigidity is connected with the tunnel portion 8 via the connecting portion 18a, the rigidity of the tunnel portion 8 can be endured. Also, since the support portion 40G of the fuel tank 40 is attached to the connecting portion 18a, the support rigidity of the fuel tank 40 can be ensured. Namely, both the rigidity of the tunnel portion 8 and the support rigidity of the fuel tank can be ensured.

Also, the floor frame 18" includes the extended portion 18c which extends in the longitudinal direction of the vehicle along the side portion of the tunnel portion 8 with a specified length, the plural support portions 40G and 40H of the fuel tank 40 are provided separately from each other in the longitudinal direction, and the plural support members 40G and 40H are attached to the extended portion 18c of the floor frame 18". According to this structure, since the plural support portions 40G and 40H of the fuel tank 40 provided separately from each other in the longitudinal direction are attached to the extended portion 18c of the floor frame 18", the fuel tank 40 can be supported at the plural portions longitudinally, thereby increasing the tank-support rigidity.

Further, the tunnel portion 8 includes the relatively wide front portion (see the wide portion 8a) and the relatively narrow rear portion (see the narrow portion 8c), the fuel tank 40 has the contour which corresponds to the shape of the tunnel portion 8 in the vehicle width direction, and the floor frame 18" is connected over the relatively wide front portion and relatively narrow rear portion of the tunnel portion 8. According to this structure, by the proper shape of the fuel tank 40 and tunnel portion 8, the sufficient volume of the fuel tank 40 can be ensured, making the height of the fuel tank as lower as possible, and also the roomy cabin 2 in the vertical direction can be obtained and the rigidity of the tunnel 8 can be ensured by a structure of the floor frame 18". Further, since the height of the tunnel portion 8 can be made as lower as possible by the proper shape of the tunnel portion 8 and fuel tank 40, the walk-through arrangement in the vehicle width direction can be facilitated.

Further, the support portion 40G of the fuel tank 40 is attached to the vehicle body via the lower tunnel member 52' which interconnects both portions at the lower open side of the tunnel portion 8 in the vehicle width direction. According to this structure, since the support portion 40G of the fuel tank 40 is attached to the vehicle body via the lower tunnel member 52', both the rigidity of the tunnel portion 8 and the tank-support rigidity can be increased.

Additionally, there is provided the cross member 30 on the floor panel 4 so as to extend in the vehicle width direction and perpendicularly to the tunnel portion 8, and the support portion 40G of the fuel tank 40 is connected with the cross member 30. According to this structure, since the support portion 40G of the fuel tank 40 is connected with the cross member 30 as the vehicle-body rigidity, the rigidity against the vehicle side crash, the vehicle-body rigidity and the tank-support rigidity can be increased.

Also, the plural cross members 30 and 31 are disposed separately from each other in the longitudinal direction of the vehicle, and the plural support portions 40G and 40H of the fuel tank 40 are connected with the plural cross members 30 and 31. According to this structure, even if the fuel tank 40 is relatively long in the longitudinal direction of the vehicle, the fuel tank 40 can be directly supported by the plural cross members 30 and 31, and thus this support can be made stable.

Further, there is provided the rear seat 10 for the rear seat passenger at the portion on the floor panel 4 which corresponds to the extension portion 18d of the floor frame 18". According to this structure, since the rear seat 10 is attached to the portion corresponding to the extension portion 18d of the floor frame 18", the support rigidity of the rear seat 10 can be ensured along with the tank-support rigidity.

Additionally, the front end of the floor frame 18" is connected with the rear end of the front side frame 17, and the branch frame 20' which branches off from the connecting portion a of the floor frame 18" with the front side frame 17 is connected with the side sill 20. According to this structure, since the branch frame 20' of the floor frame 18" is connected with the side sill 20, the floor rigidity and the vehicle-body torsion rigidity can be increased. Since the impact load during the vehicle frontal crash or the vehicle frontal-offset crash is conveyed the side sill 20 via the front side frame 17 and branch frame 20, this structure becomes advantages against the vehicle frontal crash as well.

Herein, by arranging such that the floor panel is formed of a plurality of split tunnel portion and split flat portion, even a relatively large and complex floor panel can be formed properly. Also, by arranging such that the fuel tank is preassembled to the tunnel portion as a module, the assembling of the fuel tank to the floor panel can be improved. Hereinafter, further another embodiment with such a structure will be described referring to FIGS. 35 through 51. The same components/structures are denoted in these figures by the same reference characters as those in the previous embodiments, and their detailed descriptions will be omitted.

Figures illustrate a lower vehicle body of the vehicle and a assembling process thereof, and a lower vehicle body structure of the vehicle will be described first.

Figure 35:
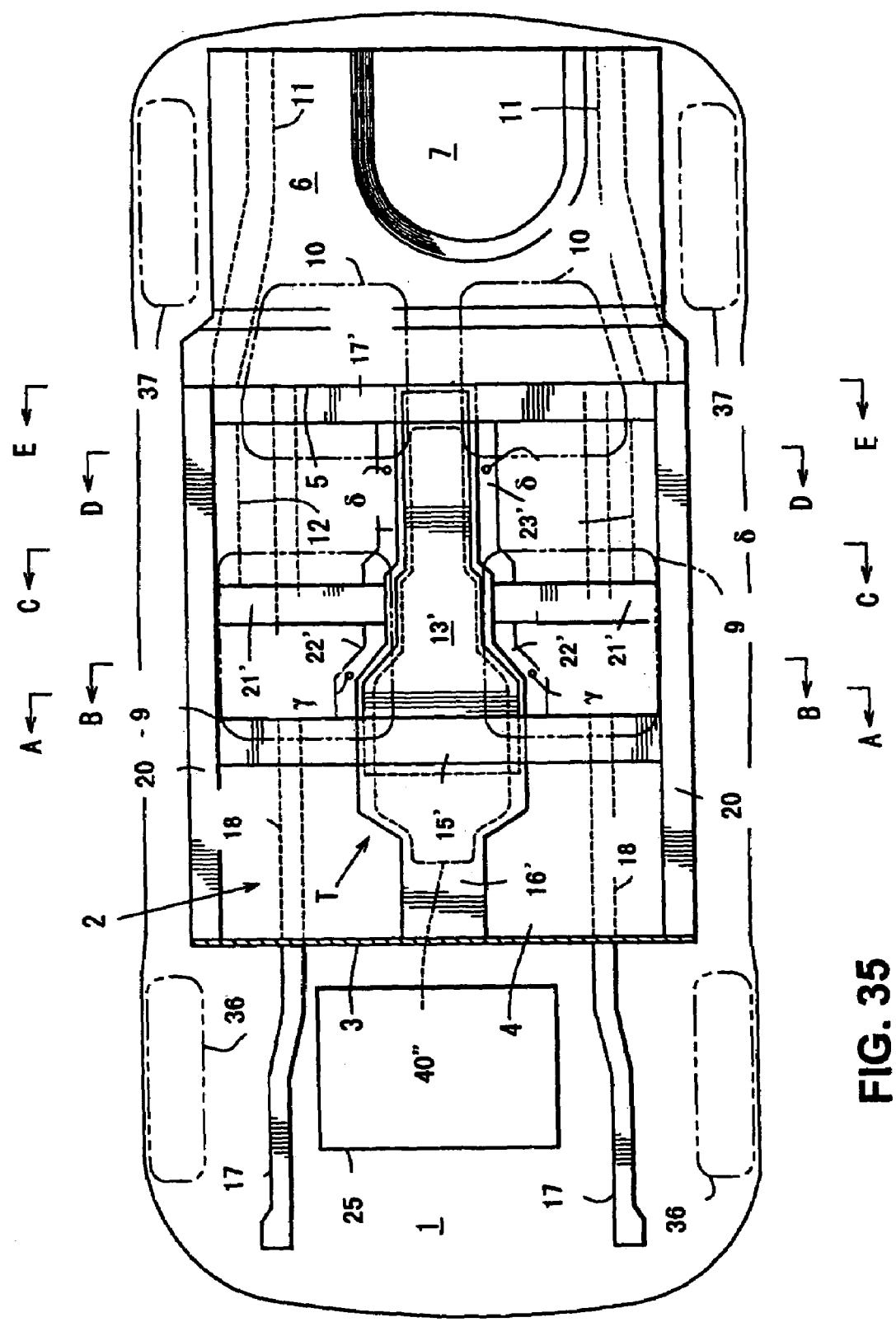
FIG. 35 is a plan view illustrating further another fuel tank disposition structure according to further another embodiment of the present invention.
Figure 36:
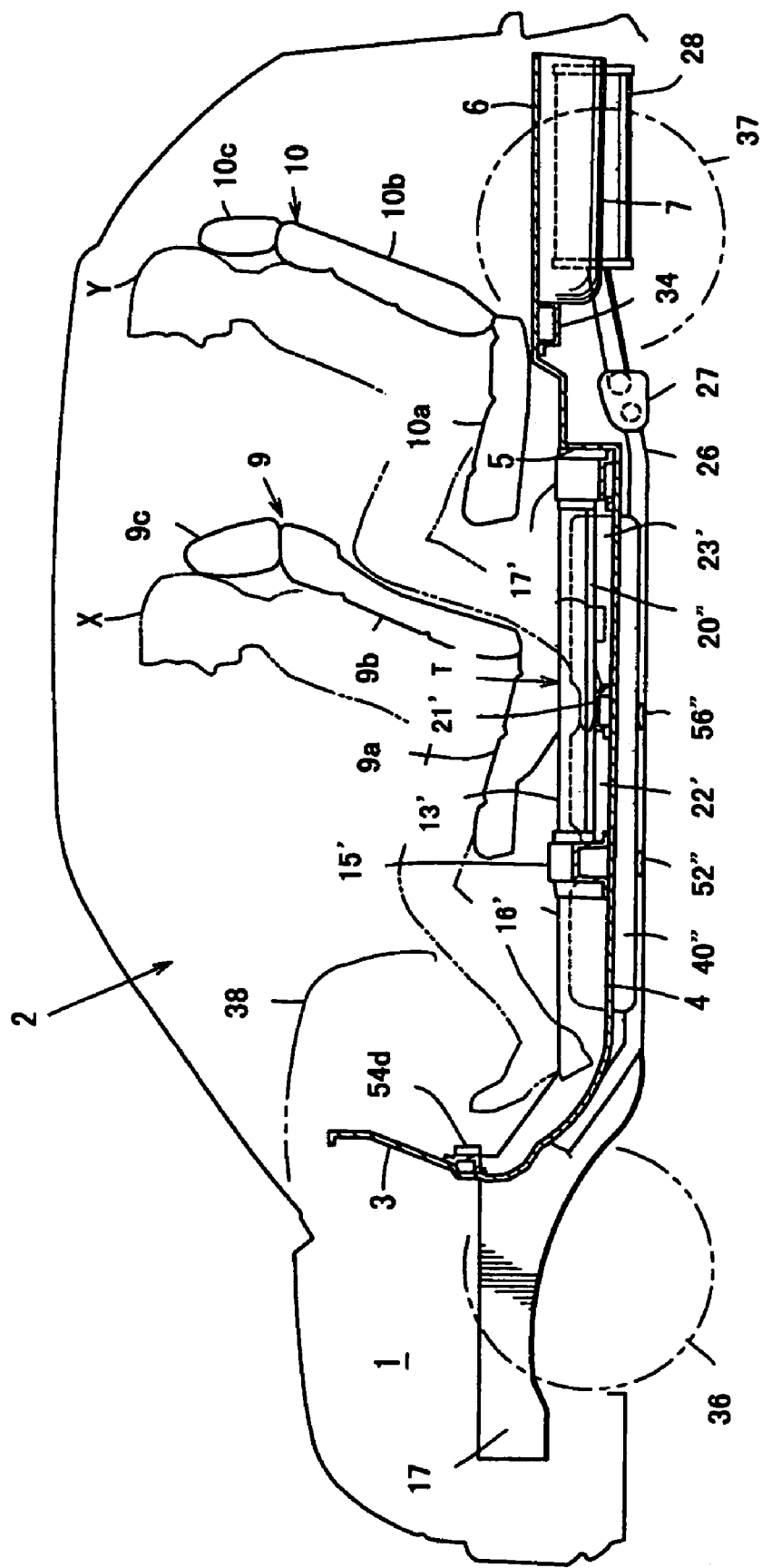
FIG. 36 is a side view illustrating the fuel tank disposition structure according to present embodiment.

In FIGS. 35 and 36, there are provided the side sills 20, 20 which extend in the longitudinal direction at both sides of the floor panel 4, and the floor frames 18, 18 are fixed to the bottom face of the floor panel 4, extending in the longitudinal direction. Also, there are provided a pair of right and left front side frames (front frame) 17, 17 as vehicle-body rigidity members, which extend forward from the dash lower panel 3, at both sides in the engine room 1. The front side frames 17, 17 are respectively provided along a lower face of the dash lower panel 3, and a pair of floor frames 18, 18 are integrated or integrally connected with rear ends of these front side frames 17, 17.

Further, a par of rear side frames 11, 11 are connected to both sides below the lower face of the rear floor panel 6 so as to extend in the longitudinal direction, and front end portions of the rear side frames are connected with the rear end portions of the side sills 20.

There are provided a pair of rear floor frames 12, 12 (see FIGS. 35 and 43) at the lower face of the floor panel 4 below the along the side sills 20, 20 between a cross member 21' and a cross member 17, which are described below, to increase the vehicle-body rigidity.

Figure 37:
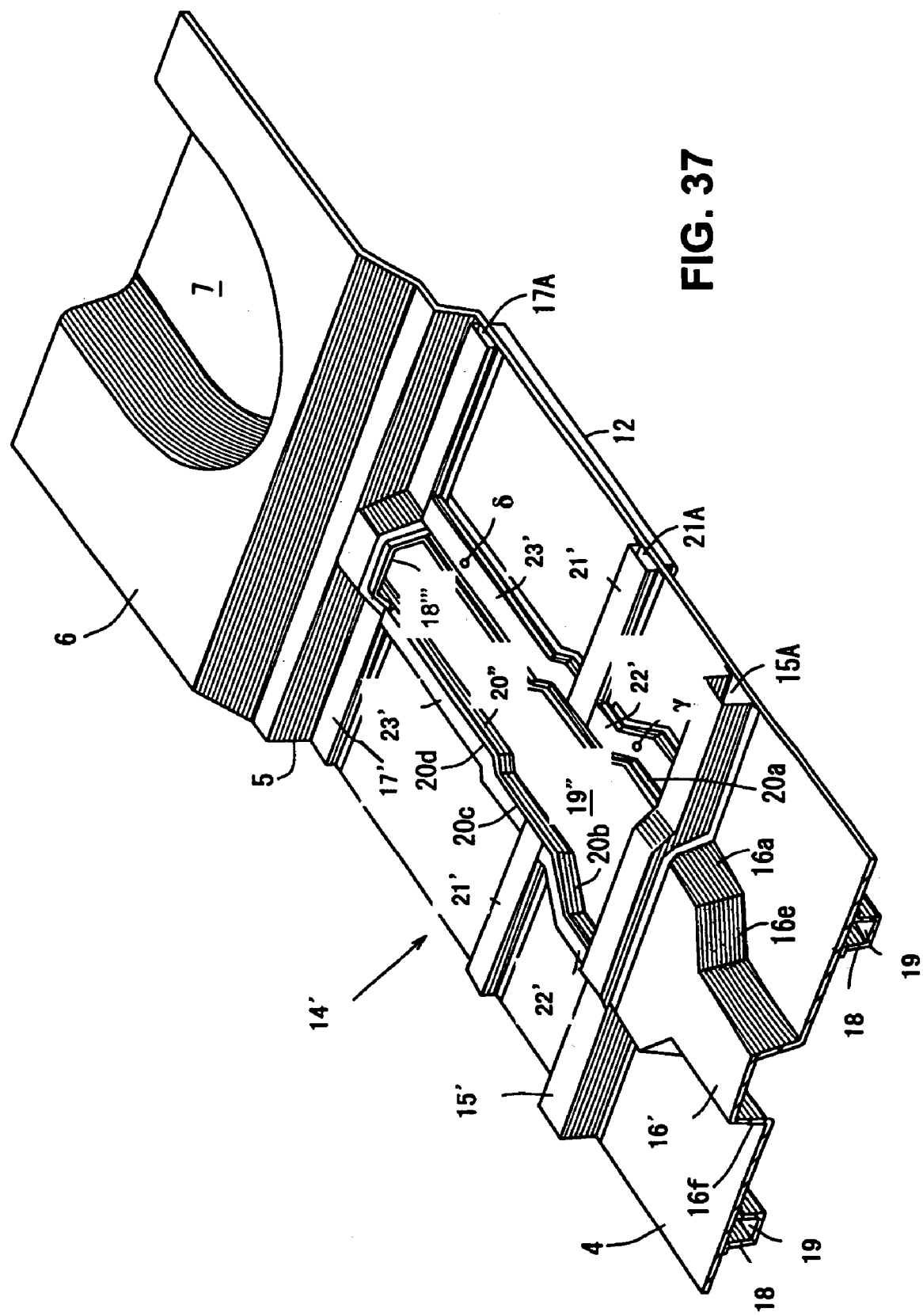
FIG. 37 is a perspective view of a flat portion of the present embodiment.

Herein, the above-described side sill 20, floor frame 18, front side frame 17, rear side frame 11, rear floor frame 12 are all vehicle-body rigidity members. There is provided a tunnel T projecting toward the inside of the cabin at the central portion of the floor panel 4 forming the lower face of the cabin 2. In the preset embodiment, as illustrated in FIGS. 37 and 38, the floor panel 4 includes a plurality of split tunnel portion 13' (see FIG. 38) and split flat portion 14' (see FIG. 37), which are split separately from each other.

First, a structure of the flat portion 14' will be described referring to FIG. 37. A floor tunnel 16' which has a top-deck face is formed integrally with a portion of the floor panel 4 between the dash lower panel 3 and a rear end of the cross member (so-called No. 2 cross member) 15'. And, a floor tunnel 18''' which has a top-deck face is formed integrally with a portion of the floor panel 4 which corresponds to a cross member (so-called No. 3 cross member) 17'.

Figure 38:
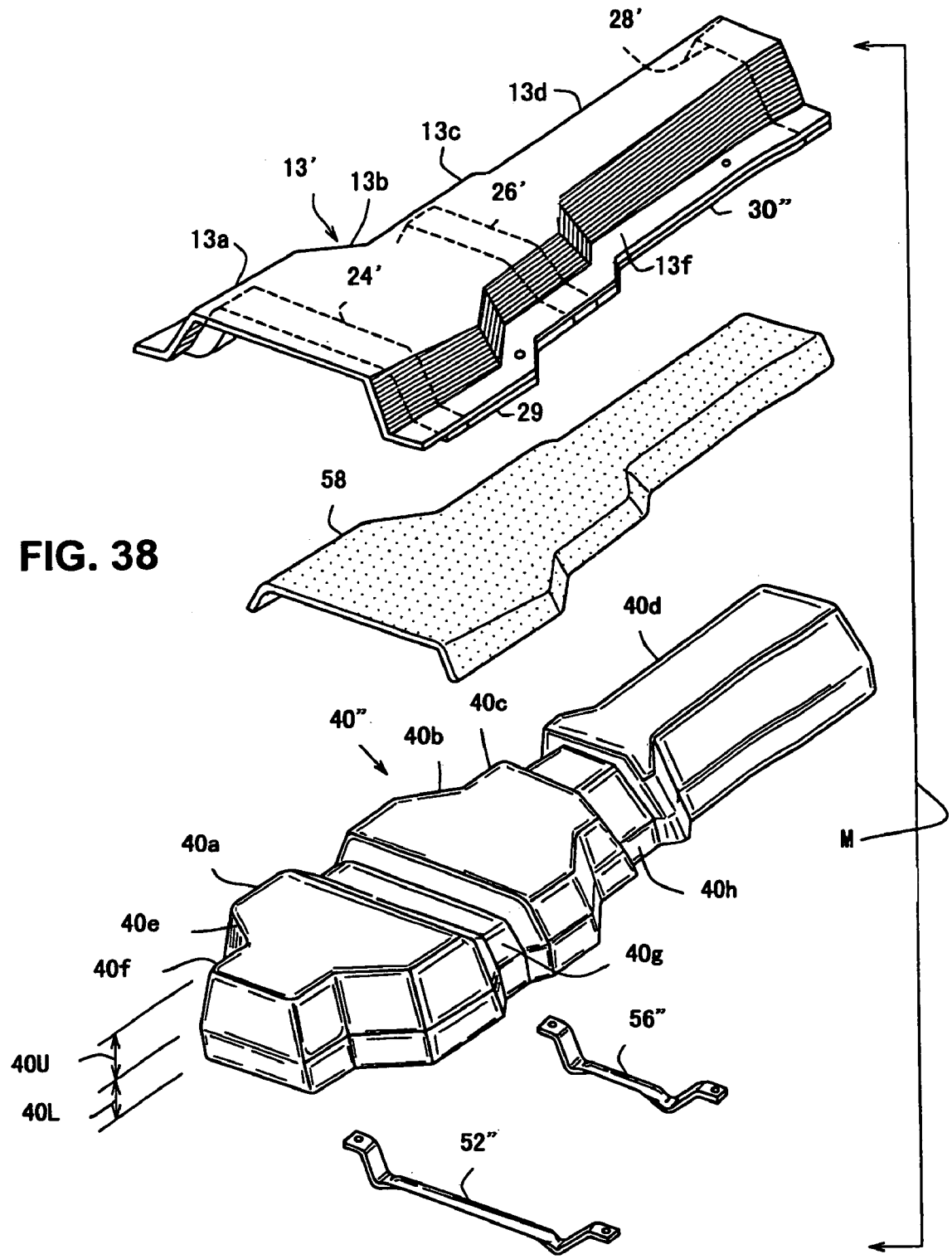
FIG. 38 is an exploded perspective view of a module including the tunnel portion of the fuel tank of the present embodiment.

And, between the front and rear floor tunnel 16' and 18''' are formed an opening portion 19'' which has its opening shape corresponding to a tunnel portion 13' illustrated in FIG. 38 and an opening edge portion 20'' which projects slant upward by a specified distance. The front floor tunnel 16', opening edge portion 20'' and rear floor tunnel 18''' extend in the longitudinal direction of the vehicle from the dash lower panel 3 to the kickup portion 5, and comprise wide portions 16a and 20a at a front portion thereof which is relatively wide, a narrow portion 20c which is relatively narrow, which is connected via a slant portion 20b whose width becomes gradually narrower toward the rear, and a slim portion 20d which is narrower than the narrow portion 20c.

Also, the front tunnel 16' comprises a slant portion 16e which is located before the wide portion 16a and whose width becomes gradually narrower, and a slim portion 16f which extends forward by a specified distance.

The cross member 15' is provided so as to extend in the vehicle width direction beyond the floor tunnel 16' at the portion corresponding to the wide portion 16a and reach the both side sills 20, 20 on the floor panel 4. Namely, the cross member 15' is provided so as to overlapped with the flat portion 14' illustrated in FIG. 37 and the tunnel portion 13' illustrated in FIG. 38 of the floor panel 4.

Further, at a portion which is away from the cross member 15' in the longitudinal direction on the floor panel 4, or at a portion which corresponds to the narrow portion 20c of the opening edge portion 20'' are provided cross members 21', 21' (so-called No. 2.5 cross member) as a vehicle-rigidity member which interconnect the side sill inners 21, 21 (see FIG. 41) of the right and left side sills 20, 20 and the narrow portions 20c, 20c.

The above-described cross member 17' (No. 3 cross member) is provided so as to extend in the vehicle width direction beyond the floor tunnel 18''' at the portion corresponding to the floor tunnel 18''' at the rear end of the slim portion 20d and reach the both side sills 20, 20 on the floor panel 4. Namely, the cross member 17' is provided so as to overlapped with the flat portion 14' and the tunnel portion 13' of the floor panel 4.

Herein, the respective cross members 15', 21' and 17' have a reverse U-shaped cross section respectively, and there are respectively formed closed cross sections 15A, 21A and 17A between the cross members 15', 21' and 17' and the floor panel 4, which extend in the vehicle width direction.

Also, there are provided a pair of tunnel side members 22' and 22' (so-called tunnel side member uppers) along the both sides of the opening edge portion 20'' between the font and rear cross members 15' and 21' (No. 2 cross member 15', No. 2.5 cross member 21'). These tunnel side members 22' and 22' are connected and fixed to the floor panel 4 and the opening edge portion 20''.

Next, a structure of the tunnel portion 13' will be described referring to FIG. 38. The tunnel portion 13' comprises, as illustrated in this figure, a wide portion 13a at a front portion thereof which is relatively wide, a narrow portion 13c which is relatively narrow, which is connected via a slant portion 13b whose width becomes gradually narrower toward the rear, and a slim portion 13d which is narrower than the narrow portion 13c. And, flange portions 13f are formed integrally with both side lower end portions of the tunnel portion 13'.

A tunnel front member 24' (so-called tunnel member inner) with a U-shaped cross section is connected at a front portion of the lower face of wide portion 13a of the tunnel portion 13'. This tunnel front member 24' is a member to extend in the vehicle width direction so as to connect the both flange portions 13f, 13f at a portion of the opening side of the tunnel portion 13' which corresponds to the cross member 15'. Between the tunnel portion 13' and the tunnel front member 24' is formed a closed cross section 25' which extends in the vehicle direction (see FIG. 39).

A tunnel middle member 26' (so-called tunnel member inner) with a U-shaped cross section is connected at a middle portion of the lower face of narrow portion 13c of the tunnel portion 13'. This tunnel middle member 26' is a member to extend in the vehicle width direction so as to connect the both flange portions 13f, 13f at a portion of the opening side of the tunnel portion 13' which corresponds to the cross member 21'. Between the tunnel portion 13' and the tunnel middle member 26' is formed a closed cross section 27' which extends in the vehicle direction (see FIG. 41).

A tunnel rear member 28' (so-called tunnel member inner) with a U-shaped cross section is connected at a rear portion of the lower face of slim portion 13d of the tunnel portion 13'. This tunnel rear member 28' is a member to extend in the vehicle width direction so as to connect the both flange portions 13f, 13f at a portion of the opening side of the tunnel portion 13' which corresponds to the cross member 17'. Between the tunnel portion 13' and the tunnel rear member 28' is formed a closed cross section which extends in the vehicle direction.

Figure 40:
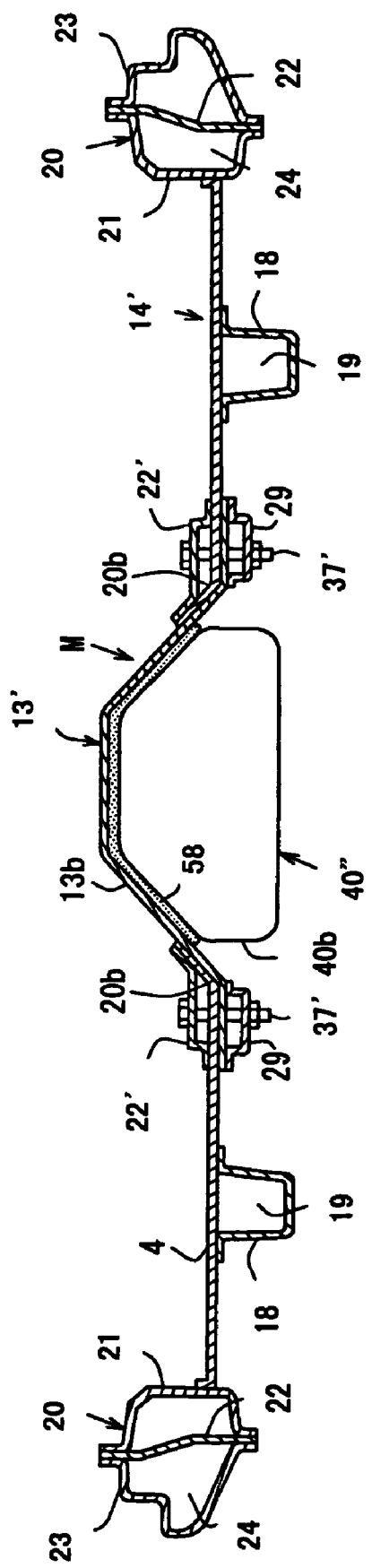
FIG. 40 is a sectional view taken along line B—B of FIG. 35.

Also, there are provided a pair of tunnel side members 29, 29 (so-called tunnel side member lower) at the side of the tunnel portion 13' along the lower face of the right and left flange portions 13f, 13f between the tunnel front member 24' and the tunnel middle member 26' which are disposed longitudinally (see FIG. 40). These tunnel side members 29, 29 are connected to the flange portions 13f, 13f, respectively.

Figure 42:
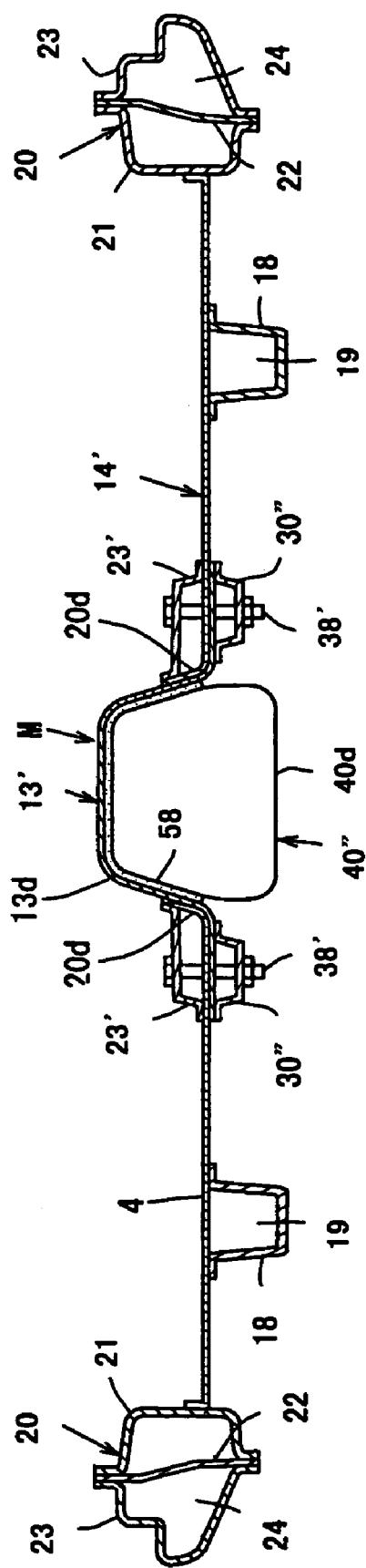
FIG. 42 is a sectional view taken along line D—D of FIG. 35.

Likewise, there are provided a pair of tunnel side members 30", 30" (so-called tunnel side member lower) at the side of the tunnel portion 13' along the lower face of the right and left flange portions 13f, 13f between the tunnel middle member 26' and the tunnel rear member 28' which are disposed longitudinally (see FIG. 42). These tunnel side members 30", 30" are connected to the flange portions 13f, 13f, respectively.

Below the tunnel portion 13' constituted above is supported a fuel tank 40" via the seal member 58 which is made of the heat-resistant fiber material.

The fuel tank 40" comprises, like the previous embodiments, as illustrated in FIG. 38, the wide portion 40a at its front portion which is relatively wide, the narrow portion 40c which is relatively narrow, which is connected via the slant portion 40b whose width becomes gradually narrower toward the rear, and the slim portion 40d which is narrower than the narrow portion 40c.

Also, the fuel tank 40" further comprises another slant portion 40e which is located before the wide portion 40a and whose width becomes gradually narrower, and another slim portion 40f which extends forward by a specified distance. Thus, since the fuel tank 40" is formed so as to correspond to the shape of the tunnel portion 13' in the vehicle width direction, a sufficient volume can be ensured even if its height is not so great.

Also, the fuel tank 40" includes recess portions 40g and 40h which are formed respectively corresponding to the tunnel front member 24' and the tunnel middle member 26'. There are also provided lower tunnel members 52" and 56" corresponding to the tunnel front member 24' and tunnel middle member 26' in order that the fuel tank 40" is detachably supported at the lower face of the tunnel portion 13' via the seat member 58 for a easy maintenance.

Figure 39:
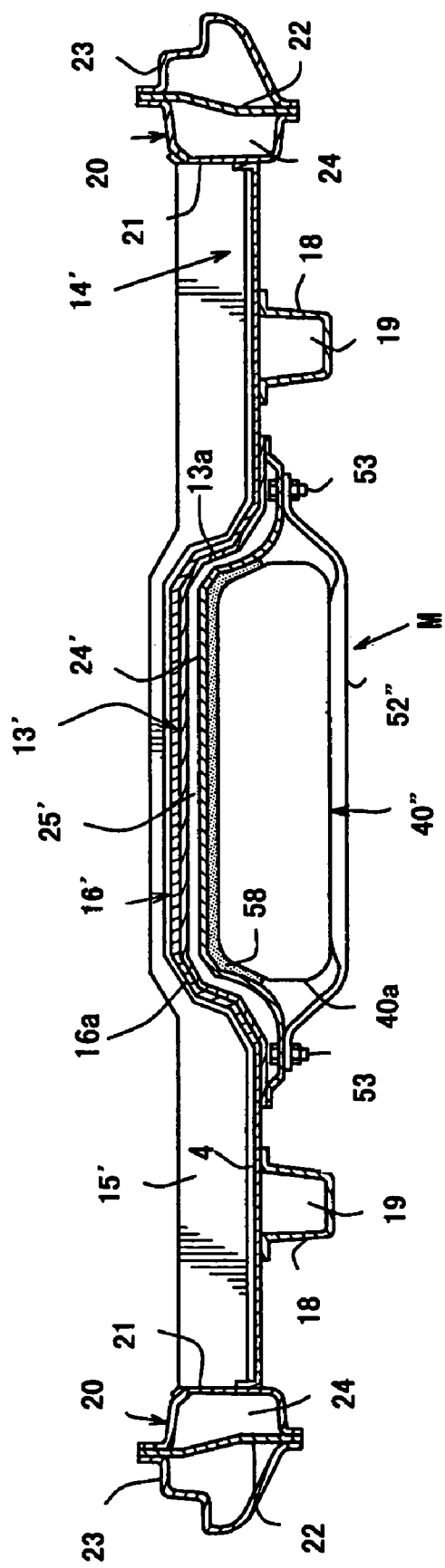
FIG. 39 is a sectional view taken along line A—A of FIG. 35.
Figure 41:
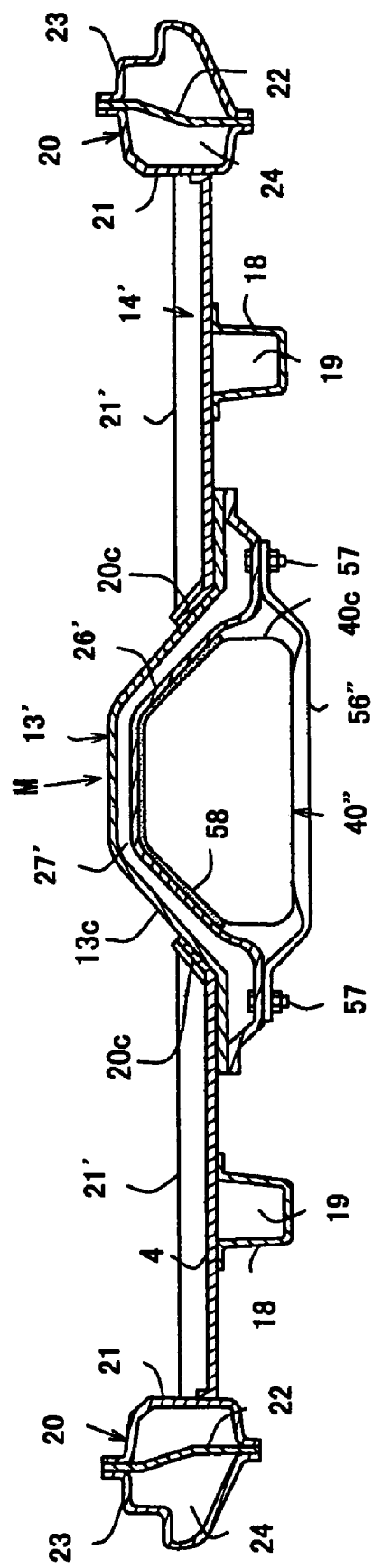
FIG. 41 is a sectional view taken along line C—C of FIG. 35.

These lower tunnel members 52" and 56" are formed in a substantially recess shape, when viewed from the front. The wide portion 40a of the fuel tank 40" is, as illustrated in FIG. 39, supported at the tunnel portion 13' by the front-side lower tunnel member 52" and the attaching members 53, 53 such as bolts and nuts. Meanwhile, the narrow portion 40c of the fuel tank 40" is, as illustrated in FIG. 41, supported at the tunnel portion 13' by the rear-side lower tunnel member 56" and the attaching members 57, 57 such as bolts and nuts.

Herein, the above-described lower tunnel members 52" and 56" are members to interconnect respectively both sides of the lower outside portion of the tunnel portion 13' in the vehicle width direction via respective members 24' and 26'. The support rigidity of the fuel tank 40" is increased by the plural lower tunnel members 52" and 56" which are separately from each other in the longitudinal direction. Herein, the tunnel portion 13' comprising the tunnel front member 24', tunnel middle member 26', tunnel rear member 28' and front and rear tunnel side member 29 and 30"; the seal member 58; the fuel tank 40"; and the lower tunnel members 52" and 56", which are illustrated in a perspective view of FIG. 38 are preassembled as a module M (see FIGS. 46 through 49).

This module M is detachably attached to attaching portions γ and δ at the flat portion 14' illustrated in FIG. 37. Namely, as illustrated in FIGS. 40 and 42, the module M is attached to the floor tunnel 16', opening edge portion 20" and floor tunnel 18'" of the flat portion 14' airtightly.

Figure 44:
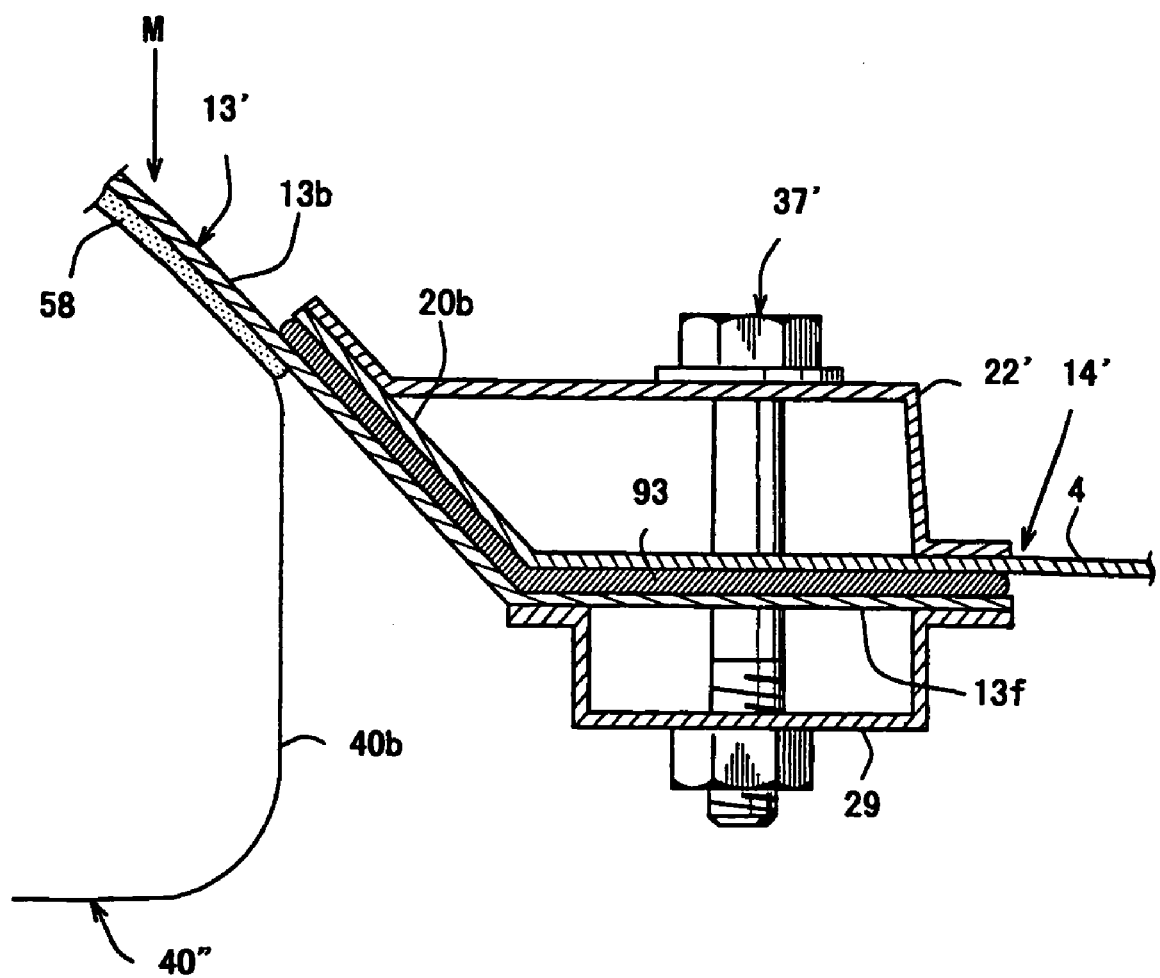
FIG. 44 is a partially enlarged view of FIG. 40.

In this case, there is provided a seal member 93 between the lower feces of the floor panel 4 and the respective elements 16', 20", 18'" and the corresponding portions of the tunnel portion 13' to ensure the sealing therebetween as illustrated in FIG. 44.

Also, the fuel tank 40" is disposed in such a manner that its upper-side large part portion 40U (see FIG. 38) is located in the tunnel portion 13' and its lower-side part portion 40L (see FIG. 38) is located at the outside of the tunnel portion 13' below the lower face of the floor panel 4. Herein, the front seats 9, 9 for the front seat passenger X are disposed above the cross member 21' (so-called No. 2.5 cross member) as illustrated in FIGS. 35 and 36, and the rear seats 10, 10 for the rear seat passenger Y are disposed above the cross member 17' (so-called No. 3 cross member). These seats 9 and 10 are separate seats which respectively include seat cushions 9a, seat backs 9b and headrests 9c. A foot space of the front seat passenger X is provided beside the slant portion 16e and slim portion 16f of the floor tunnel 16', and a foot space of the rear seat passenger Y is provided beside the narrow portion 20c and the narrow portion 20c and slim portion 20d of the opening edge portion 20".

Figure 43:
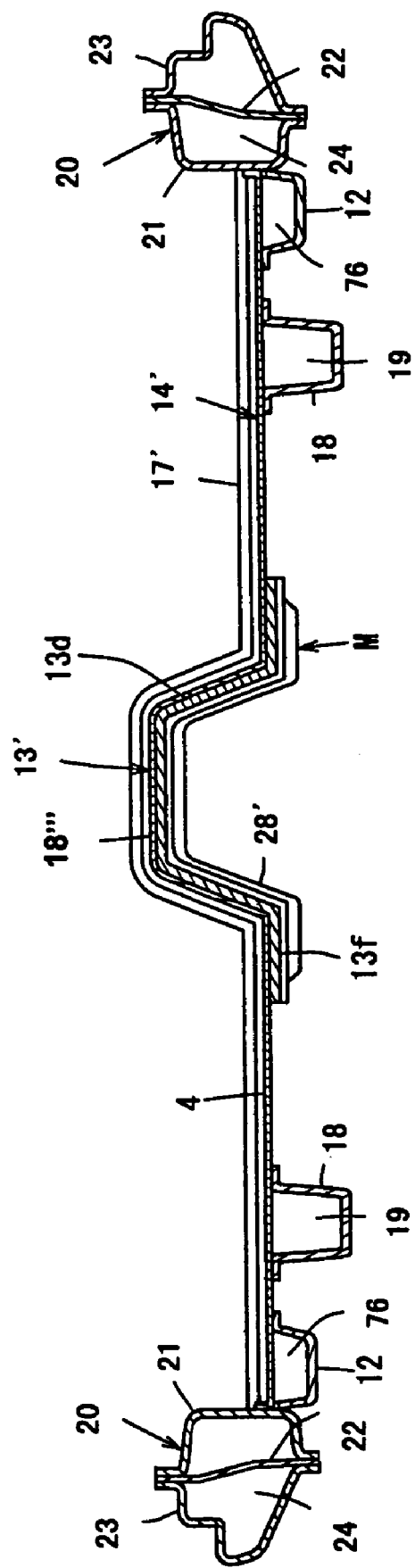
FIG. 43 is a sectional view taken along line E—E of FIG. 35.

FIG. 39 is a sectional view taken along line A—A of FIG. 35. FIG. 40 is a sectional view taken along line B—B of FIG. 35. FIG. 41 is a sectional view taken along line C—C of FIG. 35. FIG. 42 is a sectional view taken along line D—D of FIG. 35. FIG. 43 is a sectional view taken along line E—E of FIG. 35. The above-described side sills 20, 20 connected to the both sides of the floor panel 4 are formed respectively by connecting the side sill inner 21, side sill reinforcement 22 and side sill outer 23, and the side sill closed cross section 24 is formed between the side sill inner 21 and the side sill outer 23 so as to extend in the longitudinal direction of the vehicle.

Also, a closed cross section 19 extending in the longitudinal direction is formed between the floor frame 18 and the lower face of the floor panel 4. And, a closed cross section 76 extending in the longitudinal direction is formed between the floor frame 12 and floor panel 4.

Figure 45:
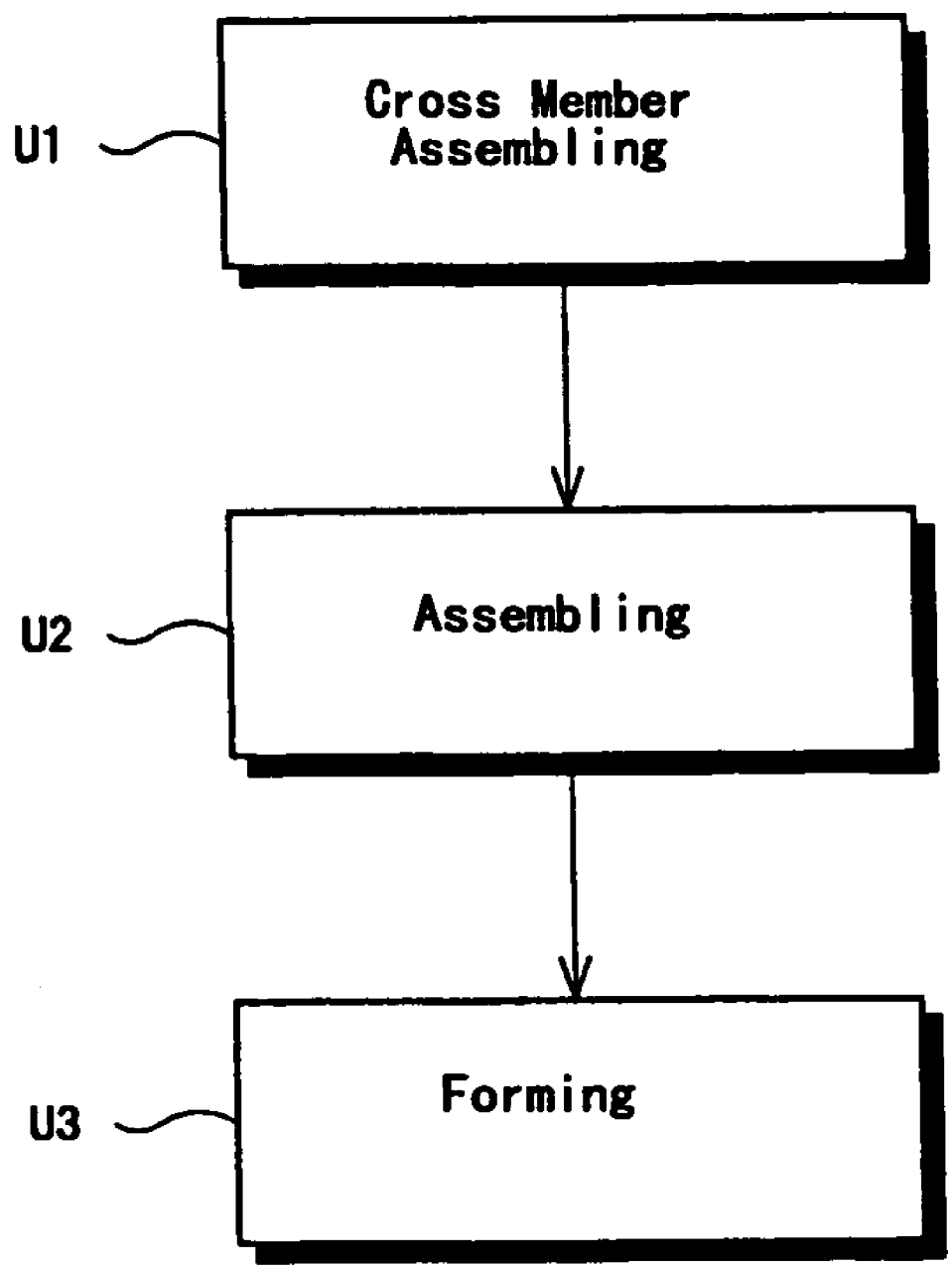
FIG. 45 is a flowchart of a process for assembling a lower vehicle body of the present embodiment.

Next, a process for assembling the lower vehicle body will be described. FIG. 45 illustrates the assembling process. In step U1 of a cross member assembling of FIG. 45, the cross members 15', 21' and 17' are assembled respectively to the flat portion 14' which is one of split members of the tunnel portion 13' (see FIG. 38) and the flat portion 14' (see FIG. 37; herein, the flat portion 14' is a flat portion without any cross members 15', 21' and 17' assembled thereto).

Figure 46:
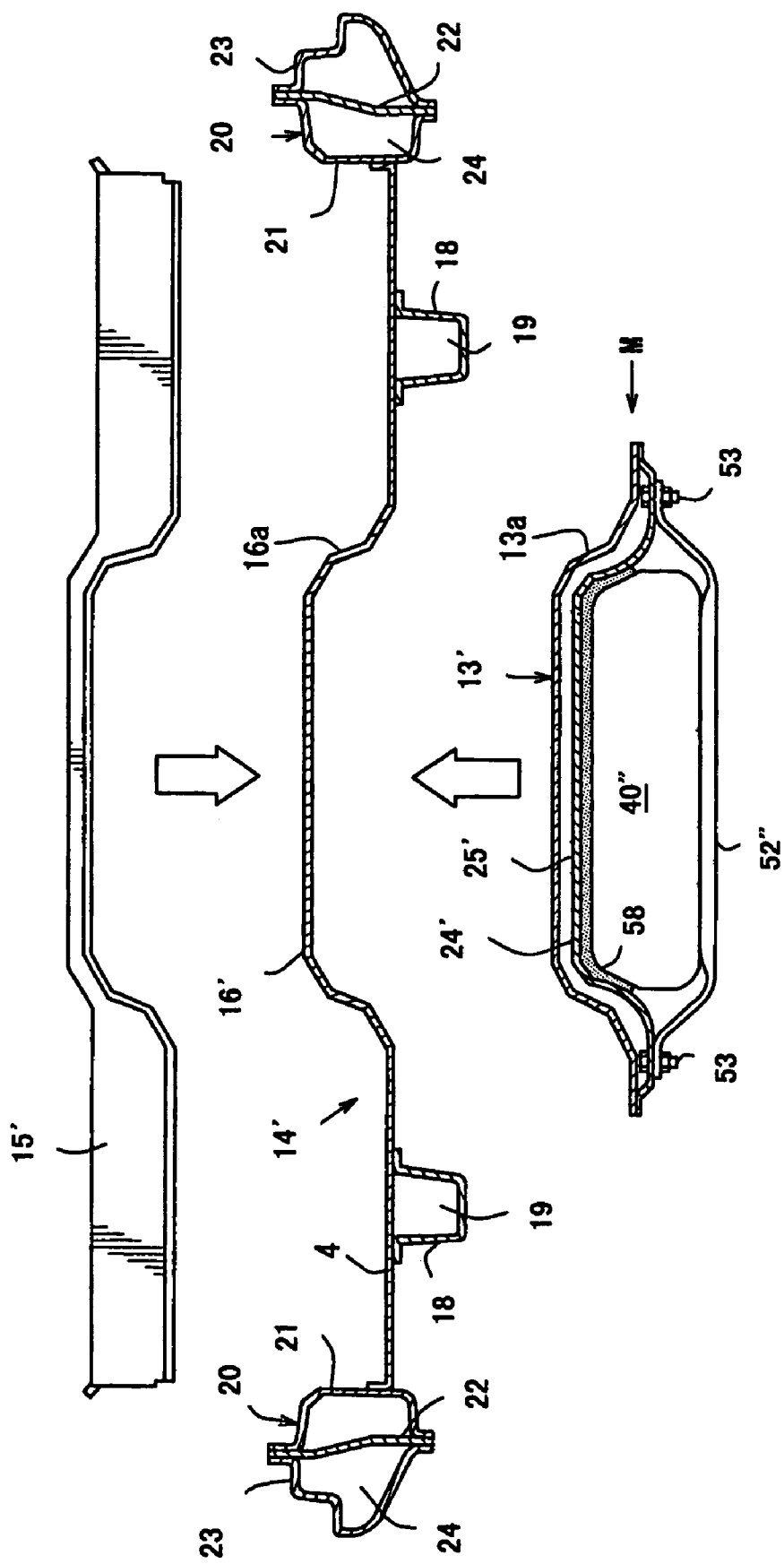
FIG. 46 is a sectional view illustrating a state prior to assembling the module and a cross member of FIG. 39.
Figure 48:
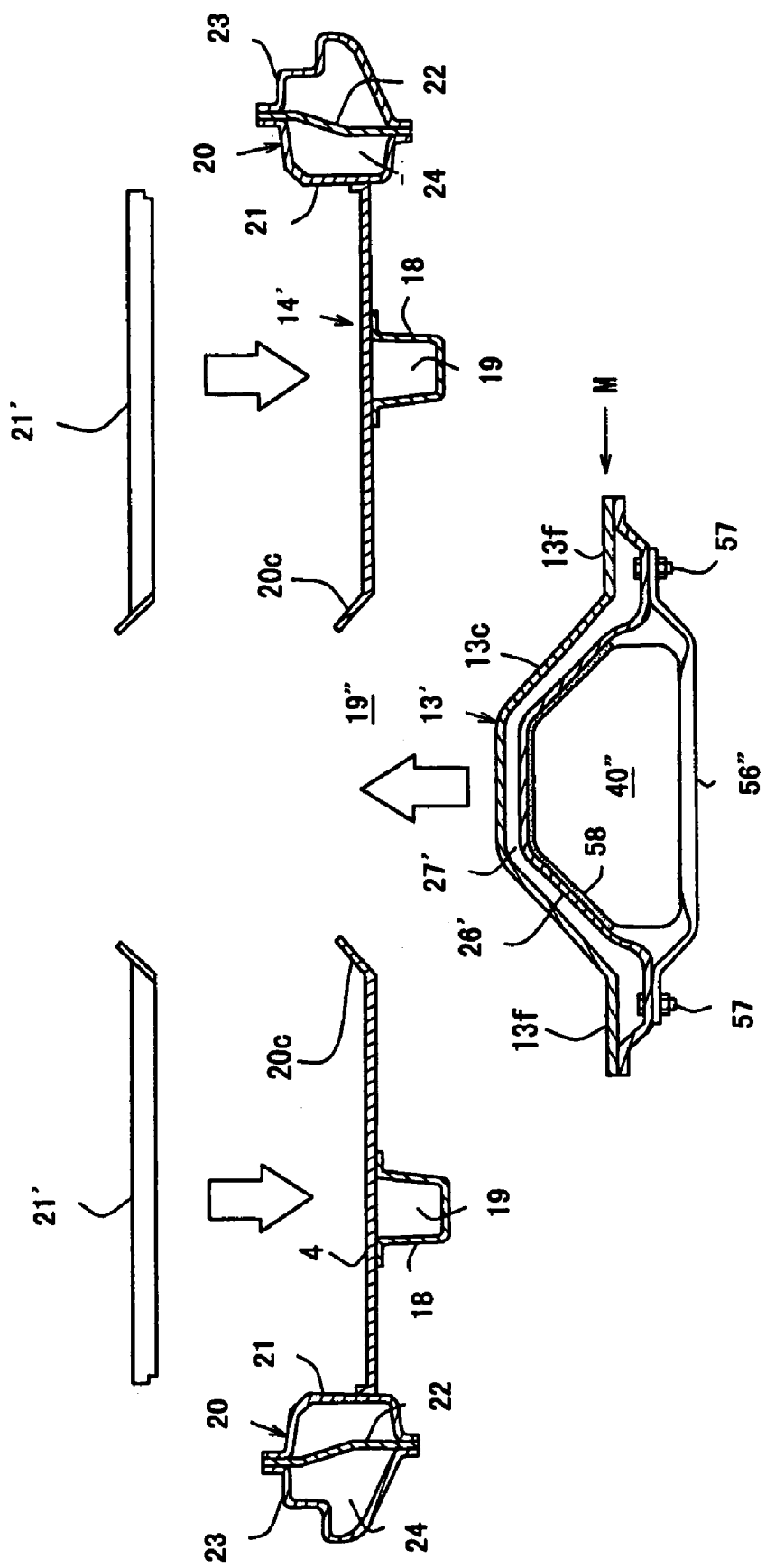
FIG. 48 is a sectional view illustrating a state prior to assembling the module and the cross member of FIG. 41.
Figure 49:
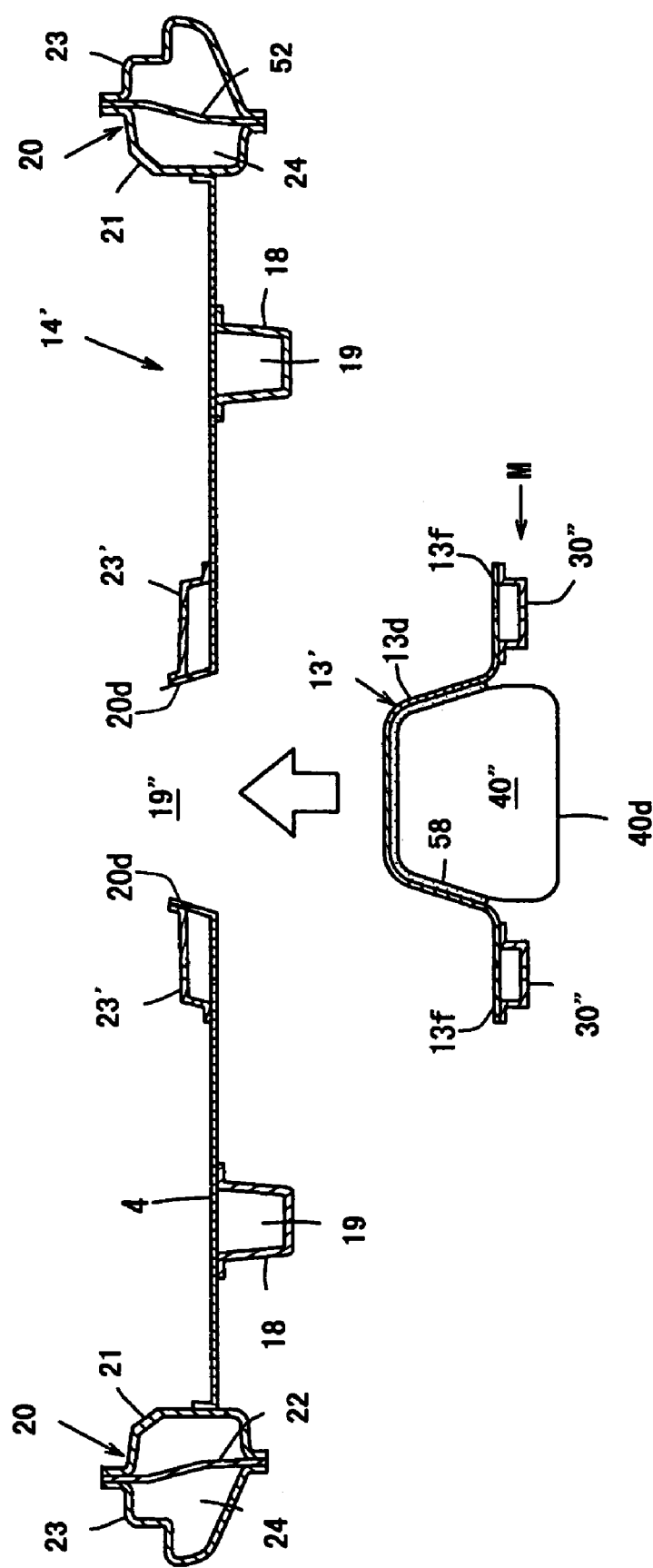
FIG. 49 is a sectional view illustrating a state prior to assembling the module of FIG. 42.
Figure 50:
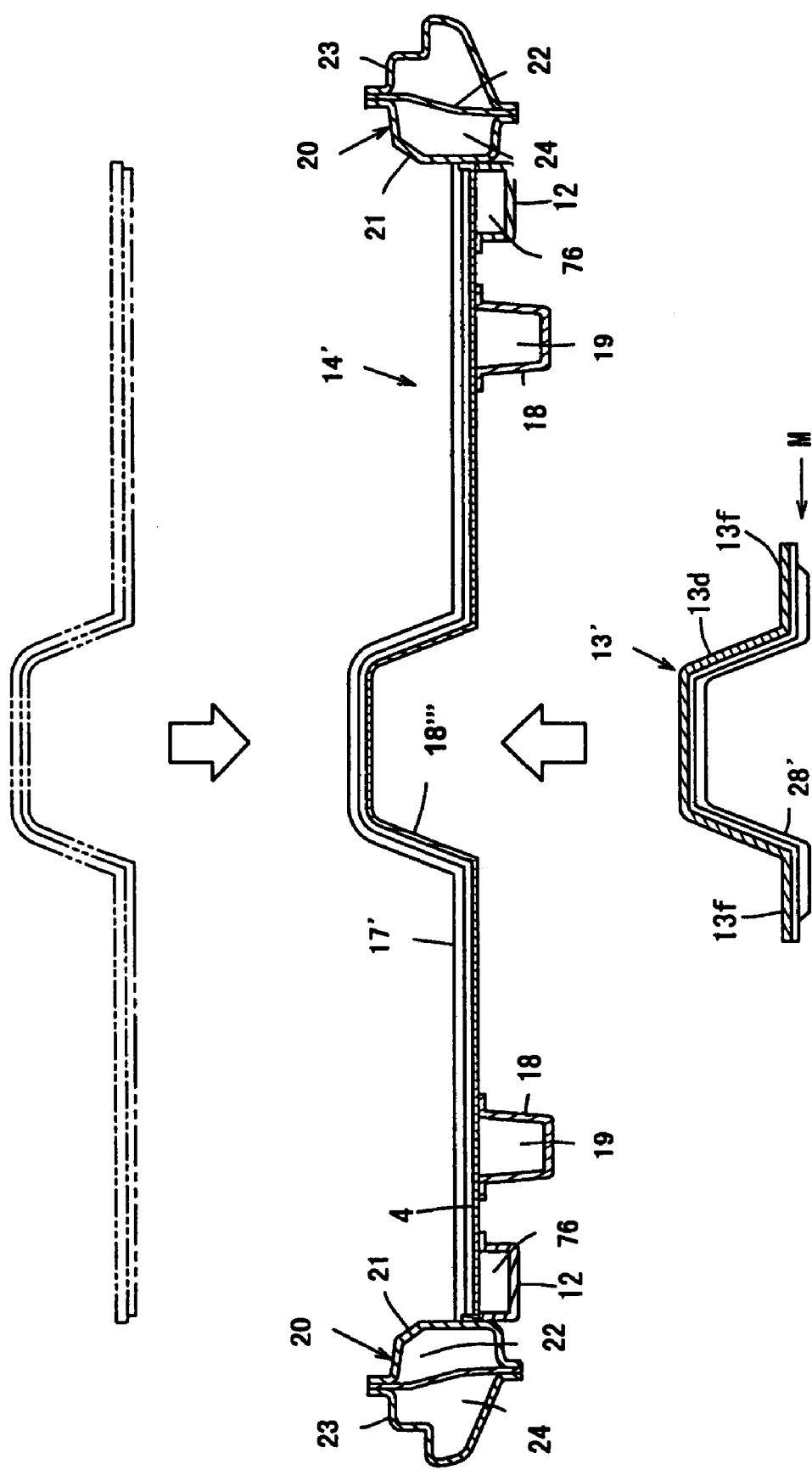
FIG. 50 is a sectional view illustrating a state prior to assembling the module of FIG. 43.

Namely, as illustrated in FIGS. 46, 48 and 50, the cross member 15' (so-called No. 2 cross member) is set so as to correspond to the wide portion 16a of the floor tunnel 16', and then it is connected with the floor panel 4 and the floor tunnel 16'. Also, the cross members 21', 21' (so-called No. 2.5 cross member) are set so as to correspond to the narrow portion 20c of the opening edge portion 20", and they are connected with the floor panel 4. Further, the cross member 17' (so-called No. 3 cross member) is set so as to correspond to the floor tunnel 18'", and it is connected with the floor panel 4 and the floor tunnel 18'". Additionally, the tunnel side members 22' and 23' at the side of the floor are connected with the floor panel 4 along the both sides of the opening edge portion 20".

Particularly, the cross members 15' and 17' are provided in the vehicle width direction beyond the floor tunnels 16' and 18'" so as to overlapped with the flat portion 14' and the tunnel portion 13', respectively.

Figure 47:
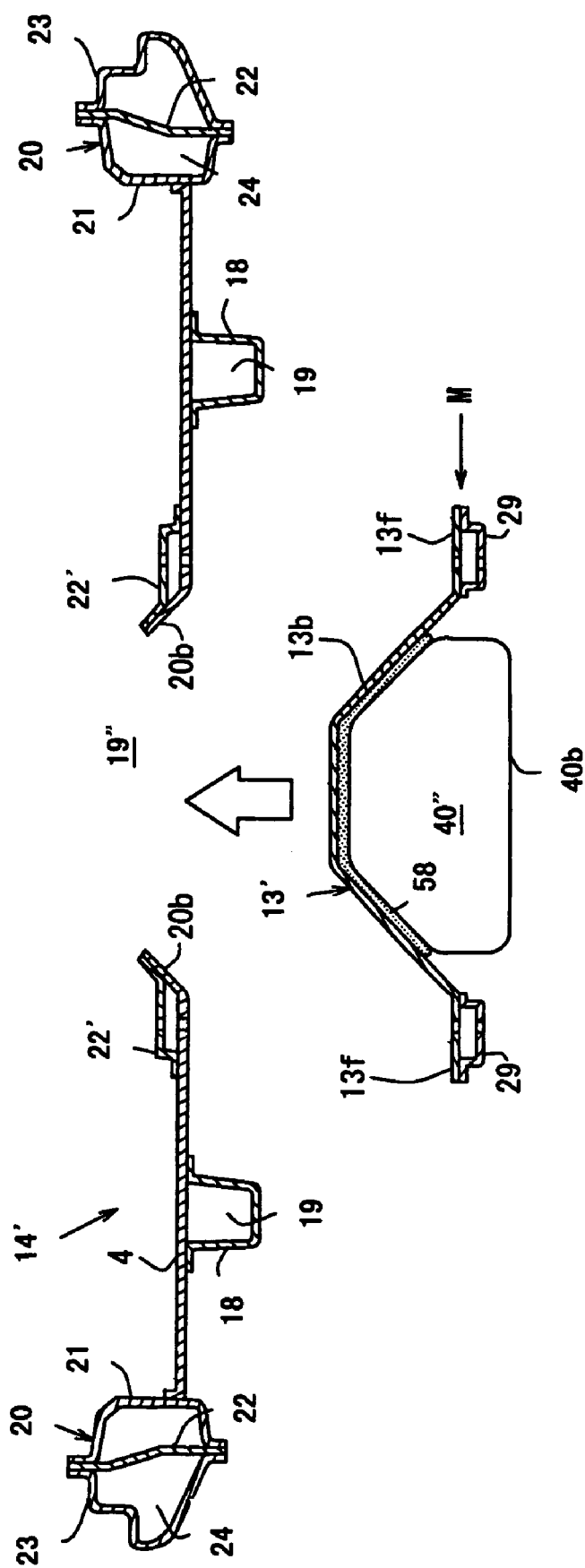
FIG. 47 is a sectional view illustrating a state prior to assembling the module of FIG. 40.

Subsequently, in step U2 of assembling of FIG. 47, the fuel tank 40" is assembled to the tunnel portion 13' to form the module M which comprises the respective elements 13', 24', 26', 28', 29, 30", 58, 40", 52", 56", 53 and 57 as illustrated in FIGS. 46 through 49.

Then, in step U3 of forming of FIG. 47, the module M in which the fuel tank 40" are preassembled to only the tunnel portion 13' is connected with the flat portion 14' as illustrated in FIGS. 39 through 43 to form the floor panel 4. Herein, as illustrated in FIG. 44, the seal member 58 is provided between the lower faces of the floor panel 4 and respective elements 16', 20" and 18'" and the corresponding portion of the module M, and the module M is detachably attached to the attaching portions γ and δ illustrated in FIG. 37 by use of the attaching members 37' and 38' which are illustrated in FIGS. 40 and 42.

In this way, the module M is assembled to the flat portion 14', and the tunnel portion T illustrated in FIGS. 35 and 36 is formed. Herein, reference numeral 54*d* denotes the dash cross member, reference numeral 38 denotes the instrument panel, and reference numeral 34 denotes the rear cross member (so-called No. 4 cross member) extending in the vehicle width direction between the right and left rear side frames 11, 11 at the lower face of the rear floor 6.

Figure 51:
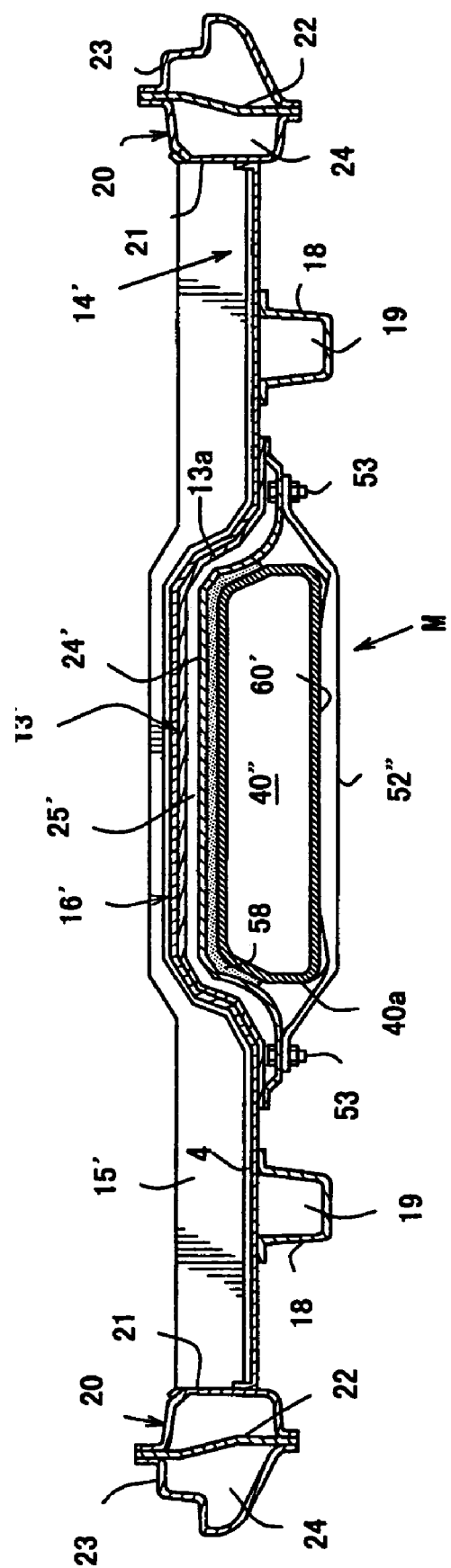
FIG. 51 is a side view illustrating further another modified supporting structure of the fuel tank.

Herein, a structure illustrated in FIG. 51 may be used instead of the bottom structure of the fuel tank 40" of FIG. 39 (and/or FIG. 41). Namely, recess portions 60', 60' (only one of recess portions is illustrated) are formed at portions corresponding to the lower tunnel members 52" and 56" of the fuel tank 40", and these recess portions 60', 60' are supported by the lower tunnel members 52" and 56". And, a lower deck of the fuel tank 40" is located substantially at the same level as a lowermost portion of the lower tunnel members 52" and 56", so that the volume of fuel tank and the rigidity of tank can be increased further.

As described above, according to the present embodiment, the floor panel 4 is formed of a plurality of split tunnel portion 13' and split flat portion 14', and the fuel tank 40" is configured so as to be preassembled to the tunnel portion 13' as a module.

According to this structure, since the floor panel 4 is formed of the plural split tunnel portion 13' and split flat portion 14', the tunnel portion 13' and flat portion 14' can be formed separately and thus even a relatively large and complex floor panel 4 forming the lower face of the cabin 2 can be formed properly, ensuring an appropriate forming of the tunnel T. Also, since the fuel tank 40" is configured so as to be preassembled to the tunnel portion 13' as the module M, the assembling of the fuel tank 40" to the floor panel 4 can be improved.

Further, the split tunnel portion 13' includes the relatively wide front portion (see wide portion 13*a*) and the relatively narrow rear portion (see narrow portion 13*c*), and the fuel tank 40" includes the relatively wide front portion (see wide portion 40*a*) and the relatively narrow rear portion (see narrow portion 40*c*) so as to have the contour which corresponds to the shape of the split tunnel portion 13' in the vehicle width direction. According to this structure, since the floor panel 4 is split into the tunnel portion 13' and the flat portion 14', even the fuel tank 40" with a complex shape can be formed properly. Also, by the proper shape of the tunnel portion 13' and the fuel tank 40", the sufficient volume of the fuel tank 40" can be ensured, making the height of the fuel tank as lower as possible, and also the roomy cabin 2, especially in the vertical direction, can be obtained.

Also, there is provided the cross member 15' which extends in the vehicle width direction beyond the floor tunnel 16' on the floor panel 4 so as to be overlapped with the flat portion 14' and the tunnel portion 13'. According to this structure, even if the floor panel 4 is split into the flat portion 14' and the tunnel portion 13', since the cross member 15' is overlapped with these 13' and 14', the vehicle-body rigidity can be ensured properly.

The present invention should not limited to the above-described embodiments, but any other modifications and improvements may be applied within the scope of a sprit of the present invention. For example, the flat portion 14' illustrated in FIG. 37 may be formed integrally with the rear floor 6, or the rear floor 6 may be formed separately from the flat portion 14' and they are connected. Further, in the above-described embodiment, the tunnel side members 22' and 23' are provided between the cross members 15' and 21' and between the cross members 21' and 17' including the attaching portions γ and δ, and the tunnel side members 29 and 30'" are between the members 24' and 26' and between the members 26' and 28' at the side of the tunnel portion 13'. Instead, the structure that brackets are provided at only attaching portions of the attaching members 37' and 38' may be applied.

What is claimed is:

1. A fuel tank disposition structure of a vehicle, in which a plurality of passenger seats are disposed longitudinally in a cabin, comprising:

a tunnel portion provided so as to project upward toward an inside of the cabin at a central portion of a floor panel forming a lower face of the cabin in a vehicle width direction, the tunnel portion including a relatively wide front portion and a relatively narrow rear portion;

a fuel tank disposed in said tunnel portion below the floor panel, the fuel tank including a relatively wide front portion and a relatively narrow rear portion so as to correspond to said tunnel portion, wherein a front seat of the passenger seats is disposed above said relatively wide front portion of the tunnel portion, and a rear seat of the passenger seats is disposed above said relatively narrow rear portion of the tunnel portion.

2. The fuel tank disposition structure of a vehicle of claim 1, wherein said relatively narrow rear portion of the tunnel portion provides a foot space of a passenger on the rear seat.

3. The fuel tank disposition structure of a vehicle of claim 2, wherein said foot space of the passenger on the rear seat is formed beside said relatively narrow rear portion of the tunnel portion and between an upper face of the floor panel and a lower portion of a seat cushion of the front seat.

4. The fuel tank disposition structure of a vehicle of claim 1, wherein said tunnel portion includes a slant portion at a front end portion thereof whose width becomes gradually narrower toward the front thereof, and a foot space of a front seat passenger is formed beside said slant portion.

5. The fuel tank disposition structure of a vehicle of claim 1, wherein a fuel supply pipe is coupled to a rear end portion of said fuel tank.

6. The fuel tank disposition structure of a vehicle of claim 1, wherein a canister is provided at a front end portion of said fuel tank.

7. The fuel tank disposition structure of a vehicle of claim 1, wherein a floor frame is provided so as to extend in a longitudinal direction of the vehicle along the floor panel between said tunnel portion and a side sill which extends in the longitudinal direction of the vehicle at a side end of the floor panel, and an exhaust passage is provided between said floor frame and said tunnel portion so as to extend in the longitudinal direction of the vehicle.

8. The fuel tank disposition structure of a vehicle of claim 1, further comprising a cross member which is provided on the floor panel so as to extend in the vehicle width direction and perpendicularly to said tunnel portion, and a lower tunnel member which interconnects both side portions of said tunnel portion at a lower open side of said tunnel portion in the vehicle width direction corresponding to said cross member, wherein said fuel tank is supported by said lower tunnel member.

9. The fuel tank disposition structure of a vehicle of claim 8, wherein a plurality of said cross members are disposed separately from each other in a longitudinal direction of the vehicle, there are provided a plurality of tunnel members so as to correspond to said cross members, and said fuel tank is supported by said tunnel members which are located separately from each other in the longitudinal direction of the vehicle.

10. The fuel tank disposition structure of a vehicle of claim 8, wherein said tunnel portion includes a relatively wide front portion and a relatively narrow rear portion, and said fuel tank has a contour which corresponds to a shape of said tunnel portion in the vehicle width direction.

11. The fuel tank disposition structure of a vehicle of claim 10, wherein said cross member is provided at least so as to correspond to said relatively wide front portion of the tunnel portion.

12. The fuel tank disposition structure of a vehicle of claim 10, wherein said cross member is provided so as to correspond to said relatively narrow rear portion of the tunnel portion.

13. The fuel tank disposition structure of a vehicle of claim 8, wherein said front seat is attached to said cross member.

14. The fuel tank disposition structure of a vehicle of claim 1, wherein an attaching member to attach said fuel tank is provided between said fuel tank and said tunnel portion, and said attaching member is configured so as to allow said fuel tank to move out from an inner space of said tunnel portion when the vehicle has a side crash.

15. The fuel tank disposition structure of a vehicle of claim 14, wherein said attaching member includes an upper attaching member which is provided below a lower face of said tunnel portion and a lower attaching member which is provided at an open side of said tunnel portion to support said fuel tank, and said lower attaching member is configured so as to be deformed downward by a load from a side.

16. The fuel tank disposition structure of a vehicle of claim 15, wherein said upper attaching member is configured so as to be deformed in such a manner that a width thereof reduces when the vehicle has the side crash, whereby said fuel tank can be moved downward.

17. The fuel tank disposition structure of a vehicle of claim 14, said fuel tank includes a taper portion at an upper portion of thereof so as to gradually reduce a width thereof upward.

18. The fuel tank disposition structure of a vehicle of claim 14, wherein there is provided a cross member on the floor panel so as to extend in the vehicle width direction and perpendicularly to said tunnel portion.

19. The fuel tank disposition structure of a vehicle of claim 18, wherein a plurality of said cross members are disposed separately from each other in a longitudinal direction of the vehicle, and a plurality of said attaching members are provided so as to correspond to said cross members.

20. The fuel tank disposition structure of a vehicle of claim 15, wherein said lower attaching member is configured such that connection between said lower attaching member and a vehicle body is ensured when a side-crash load acts.

21. The fuel tank disposition structure of a vehicle of claim 14, wherein said tunnel portion includes a relatively wide front portion and a relatively narrow rear portion, and said fuel tank has a contour which corresponds to a shape of said tunnel portion in the vehicle width direction.

22. The fuel tank disposition structure of a vehicle of claim 1, further comprising a cross member which is provided below the floor panel so as to extend in the vehicle width direction crossing said tunnel portion, wherein said fuel tank is supported by said cross member.

23. The fuel tank disposition structure of a vehicle of claim 22, wherein there are provided side sills which extend in a longitudinal direction of the vehicle at both end portions of the floor panel, and both end portions of said cross member are connected with said side sills.

24. The fuel tank disposition structure of a vehicle of claim 22, wherein a plurality of said cross members are disposed separately from each other in a longitudinal direction of the vehicle, and said fuel tank is supported by said cross members which are located separately from each other in the longitudinal direction of the vehicle.

25. The fuel tank disposition structure of a vehicle of claim 22, wherein said tunnel portion includes a relatively wide front portion and a relatively narrow rear portion, and said fuel tank has a contour which corresponds to a shape of said tunnel portion in the vehicle width direction.

26. The fuel tank disposition structure of a vehicle of claim 25, wherein said cross member is provided at least so as to correspond to said relatively wide front portion of the tunnel portion.

27. The fuel tank disposition structure of a vehicle of claim 25, wherein said cross member is provided so as to correspond to said relatively narrow rear portion of the tunnel portion.

28. The fuel tank disposition structure of a vehicle of claim 22, wherein there is provided an exhaust pipe which extends in a longitudinal direction of the vehicle beside said fuel tank, and said cross member includes a recess portion to avoid an interference with said exhaust pipe at a middle portion thereof in the vehicle width direction.

29. The fuel tank disposition structure of a vehicle of claim 22, wherein said fuel tank includes a recess portion which extends in the vehicle width direction at a cross-member disposition portion of a bottom thereof, and said cross member is disposed at said recess portion so as to extend straightly in the vehicle width direction.

30. The fuel tank disposition structure of a vehicle of claim 22, wherein said both end portions of the cross member are detachably connected with said side sills.

31. The fuel tank disposition structure of a vehicle of claim 1, wherein there is provided a floor frame which extends in a longitudinal direction of the vehicle at the floor panel, said floor frame includes a connecting portion which is connected with the tunnel portion, and a support portion of said fuel tank is attached to said connecting portion of the floor frame.

32. The fuel tank disposition structure of a vehicle of claim 31, wherein said floor frame includes an extended portion which extends in the longitudinal direction of the vehicle along the side portion of said tunnel portion with a specified length, a plurality of said support portions of the fuel tank are provided separately from each other in the longitudinal direction, and said plural support members are attached to said extended portion of the floor frame.

33. The fuel tank disposition structure of a vehicle of claim 31, wherein said tunnel portion includes a relatively wide front portion and a relatively narrow rear portion, said fuel tank has a contour which corresponds to a shape of said tunnel portion in the vehicle width direction, and said floor frame is connected over said relatively wide front portion and relatively narrow rear portion of the tunnel portion.

34. The fuel tank disposition structure of a vehicle of claim 31, wherein said support portion of the fuel tank is attached to a vehicle body via a tunnel member which interconnects both portions at a lower open side of said tunnel portion in the vehicle width direction.

35. The fuel tank disposition structure of a vehicle of claim 31, wherein there is provided a cross member on the floor panel so as to extend in the vehicle width direction and perpendicularly to said tunnel portion, and said support portion of the fuel tank is connected with said cross member.

36. The fuel tank disposition structure of a vehicle of claim 35, wherein a plurality of said cross members are disposed separately from each other in a longitudinal direction of the vehicle, and a plurality of said support portions of the fuel tank are connected with said plural cross members.

37. The fuel tank disposition structure of a vehicle of claim 31, wherein there is provided the passenger seat at a portion on the floor panel which corresponds to an extension portion of said floor frame.

38. The fuel tank disposition structure of a vehicle of claim 31, wherein a front end of said floor frame is connected with a rear end of a front frame, and a branch portion which branches off from a connecting portion of said floor frame with said front frame is connected with a side sill.

39. The fuel tank disposition structure of a vehicle of claim 1, wherein said floor panel is formed of a plurality of split tunnel portion and split flat portion, and said fuel tank is configured so as to be preassembled to the tunnel portion as a module.

40. The fuel tank disposition structure of a vehicle of claim 39, wherein said split tunnel portion includes a relatively wide front portion and a relatively narrow rear portion, and said fuel tank has a contour which corresponds to a shape of said split tunnel portion in the vehicle width direction.

41. The fuel tank disposition structure of a vehicle of claim 39, wherein there is provided a cross member which extends in the vehicle width direction beyond said tunnel portion on the floor panel so as to be overlapped with said split flat portion and split tunnel portion.

* * * * *